US009786945B2

United States Patent
Sakata et al.

(10) Patent No.: US 9,786,945 B2
(45) Date of Patent: Oct. 10, 2017

(54) METHOD AND APPARATUS FOR MANUFACTURING ELECTRODE ASSEMBLY FOR RECTANGULAR BATTERY

(71) Applicant: ELIIY POWER CO., LTD., Tokyo (JP)

(72) Inventors: Takuya Sakata, Tokyo (JP); Ayumi Yoshida, Tokyo (JP); Hiroshi Sato, Tokyo (JP)

(73) Assignee: ELIIY POWER CO., LTD., Tokyo (JP)

( * ) Notice: Subject to any disclaimer, the term of this patent is extended or adjusted under 35 U.S.C. 154(b) by 400 days.

(21) Appl. No.: 14/529,877

(22) Filed: Oct. 31, 2014

(65) Prior Publication Data

US 2015/0207169 A1 Jul. 23, 2015

Related U.S. Application Data

(62) Division of application No. 12/328,176, filed on Dec. 4, 2008, now Pat. No. 8,926,715.

(30) Foreign Application Priority Data

| Dec. 6, 2007 | (JP) | 2007-316308 |
| Dec. 27, 2007 | (JP) | 2007-335646 |
| Feb. 20, 2008 | (JP) | 2008-039302 |

(51) Int. Cl.
  *H01M 2/18* (2006.01)
  *H01M 10/04* (2006.01)
  *B32B 38/18* (2006.01)

(52) U.S. Cl.
  CPC ..... *H01M 10/0409* (2013.01); *B32B 38/1808* (2013.01); *H01M 2/18* (2013.01);
  (Continued)

(58) Field of Classification Search
  None
  See application file for complete search history.

(56) References Cited

U.S. PATENT DOCUMENTS

| 2,697,991 A | 12/1954 | Hay |
| 2004/0154160 A1 | 8/2004 | Hong |

FOREIGN PATENT DOCUMENTS

| JP | 01-100871 | 4/1989 |
| JP | 01100871 | 4/1989 |

(Continued)

*Primary Examiner* — Daniel Gatewood
(74) *Attorney, Agent, or Firm* — Young & Thompson

(57) ABSTRACT

In a method of manufacturing an electrode assembly for a rectangular battery, in which positive electrodes and negative electrodes are alternately laminated so that a separator exists between the respective positive and negative electrodes, the manufacturing method includes the steps of: arranging a plurality of guide members in zigzag form in a perpendicular direction; inserting a continuous member of the separator between one and another one rows of the guide members; folding, into zigzag form, the continuous member by intersecting the rows of the guide members in a horizontal direction; inserting alternately the positive electrodes and the negative electrodes in respective valley grooves of the zigzag-folded continuous member; withdrawing the guide members from the respective valley grooves of the continuous member; and pressing, thereafter, the continuous member in the zigzag direction so as to make flat the continuous member.

20 Claims, 45 Drawing Sheets

(52) U.S. Cl.
CPC ..... *H01M 10/049* (2013.01); *H01M 10/0431* (2013.01); *H01M 10/0459* (2013.01); *B32B 2457/10* (2013.01); *Y02E 60/12* (2013.01); *Y10T 29/49108* (2015.01); *Y10T 29/53139* (2015.01); *Y10T 156/1051* (2015.01)

(56) References Cited

FOREIGN PATENT DOCUMENTS

| | | |
|---|---|---|
| JP | 01-122572 | 5/1989 |
| JP | 01122572 | 5/1989 |
| JP | 07-6723 | 1/1995 |
| JP | 2000-223109 | 8/2000 |
| JP | 2002-329530 | 11/2002 |
| JP | 2004-22449 | 1/2004 |
| JP | 2006-190531 | 7/2006 |

METHOD AND APPARATUS FOR MANUFACTURING ELECTRODE ASSEMBLY FOR RECTANGULAR BATTERY

BACKGROUND OF THE INVENTION

Field of the Invention

The present invention relates to method of and apparatus for manufacturing an electrode assembly adapted for a battery having a rectangular structure, called "rectangular battery" hereinlater.

Related Art

An electrode assembly in a battery such as lithium ion secondary battery or cell is formed by alternately laminating positive electrodes and negative electrodes with a separator being disposed between a positive electrode and a negative electrode. Such electrode assembly may be manufactured by the following typical methods.

(1) Laminate Method: a separator, a positive electrode and a negative electrode, which are all formed in shape of sheet, are laminated such that the separator is disposed between the positive electrode and the negative electrode (for example, refer to the following Patent Document 5).

(2) Wind-up Method: a separator, a positive electrode and a negative electrode, which are all formed continuously, are wound up in form of eddy-shape such that the separator is disposed between the positive electrode and the negative electrode (for example, refer to the following Patent Documents 5, 6 and 7).

(3) Zigzag-Stack Method: a continuous member of a separator, or a laminated member of a continuous member of the separator and a continuous member of a negative electrode is folded in zigzag shape, and then, both sheet-shaped positive electrode and negative electrode or only a positive electrode is inserted into a valley groove of the laminated member, which is then crushed in flat shape (for example, refer to the following Patent Documents 1, 2, 3 and 4).

[Patent Document 1] Japanese Patent Laid-open Publication No. 2004-22449
[Patent Document 2] Japanese Patent Laid-open Publication No. HEI 1-122572
[Patent Document 3] Japanese Patent Laid-open Publication No. HEI 1-100871
[Patent Document 4] Japanese Patent Laid-open Publication No. 2006-190531
[Patent Document 5] Japanese Patent Laid-open Publication No. 2002-329530
[Patent Document 6] Japanese Patent Laid-open Publication No. 2000-223109
[Patent Document 7] Japanese Patent Laid-open Publication No. HEI 7-6783

In the laminate-method of the above (1), however, it is difficult to ensure the positional performance of the positive and negative electrodes and the separator, and in an adverse case in which their positions are shifted, the positive and negative electrodes may be short-circuited. When precise positional arrangement is made to prevent such short-circuiting, it may result in delay of takt time (manufacturing speed per one electrode assembly), which may result in reduction of productivity of the electrode assembly, i.e., batteries.

In the wind-up method of the above (2), if the electrode assembly is wound up in too many turns, a space between the electrode assembly and a corner portion of a battery case may provide a dead space and electric capacity may be reduced, thus providing a problem.

The zigzag-stack method of the above (3) has merits such that in comparison with the above laminate-method, the positional performance between the positive and negative electrodes and the separator can be improved and the takt time can be reduced, and in addition, in comparison with the above wind-up method, the dead space can be reduced and the electric capacity can be increased.

In the conventional zigzag-stack method, for example, in the structure of the above Patent Document 1, however, a continuous separator is pinched by a pair of rollers and the paired rollers are reciprocated in the horizontal direction to thereby fold the separator in zigzag form and the positive and negative electrodes are alternately overlapped on the separator each time of the reciprocal motion of the paired rollers. This operation makes delay the takt time, which results in reduction of productivity, thus providing a problem.

Furthermore, in this zigzag-stack method, since it is intended to fold the separator in zigzag form on curved surfaces of the rollers, it is difficult to accurately fold the separator in the zigzag form and, hence, the separator, i.e., the electrode assembly, likely become warped, which may result in deterioration of performance of the battery. In addition, when the separator is folded in the zigzag form, the separator is moved in a meandering manner and, hence, is not accurately folded.

In the technology disclosed in the above Patent Document 2, it is intended to form the electrode assembly by clamping the continuous separator in the zigzag form between the hard positive electrode and negative electrode held with a constant interval, so that it may pose a problem such that the separator is likely broken by a large tension (load) applied to the separator, and in a case that the electrode is thin and soft, its manufacture is made difficult, thus also providing a problem.

In the structure disclosed in the above Patent Document 3, the zigzag-shaped separator is manufactured by placing the continuous separator on a saw-teeth shaped female mold half and sequentially inserting a male mold half having a shape corresponding to one groove into respective grooves. Next, the positive electrodes and the negative electrodes are respectively alternately inserted into the respective valley grooves of the separator, and finally, the separator is pressed together with the positive and negative electrodes to make the separator to provide a flat shape. In such method, the takt time is elongated and it is difficult to enhance the productivity.

In the structure disclosed in the above Patent Document 4, it is intended to manufacture the electrode assembly by pressing, in form of zigzag shape with a saw-teeth shaped male and female molds, a member in which the continuous separator is sandwiched between the continuous positive and negative electrodes and then pressing the thus formed zigzag-shaped laminated member. Therefore, in this manufacturing method, the zigzag-folding of the electrode assembly is made fine and the electric capacity is hence reduced, thus providing a problem. In addition, both the positive and negative electrodes are mutually contacted at certain positions, so that the positive electrodes and the negative electrodes may include portions not contributing to power generation, thus also providing a problem.

SUMMARY OF THE INVENTION

The present invention was conceived in consideration of the circumstances encountered in the prior art mentioned above, and hence, an object of the present invention is to provide method of and apparatus for accurately manufacturing an electrode assembly for a rectangular battery or cell with high performance and with short takt time.

The above and other objects of the present invention will be achieved by providing, in one aspect, a method of manufacturing an electrode assembly for a rectangular battery, in which positive electrodes and negative electrodes are alternately laminated so that a separator exists between the respective positive and negative electrodes, the manufacturing method comprising the steps of:

arranging a plurality of guide members in zigzag form in a perpendicular direction;

inserting a continuous member of the separator between one and another one rows of the guide members;

folding, into zigzag form, the continuous member by intersecting the rows of the guide members in a horizontal direction;

inserting alternately the positive electrodes and the negative electrodes in respective valley grooves of the zigzag-folded continuous member;

withdrawing the guide members from the respective valley grooves of the continuous member; and pressing, thereafter, the continuous member in the zigzag direction so as to make flat the continuous member.

According to this aspect, it is possible to form necessary number of the valley grooves for one electrode assembly simultaneously to the continuous member of the separator, and accordingly, the takt time can be remarkably reduced. In addition, the separator is zigzag-folded by intersecting the rows of the guide members with each other, so that deep valley grooves can be formed, and the positive electrodes and the negative electrodes can be made large to thereby form a large electrode assembly having large electric capacity. Furthermore, even if the positive and negative electrodes are made of thin and soft material, they can be smoothly inserted into the valley grooves of the separator.

In the above aspect, the positive electrodes and the negative electrodes may be alternately inserted into the respective valley grooves of the continuous member while folding the continuous member by intersecting the respective rows of the guide members.

According to this embodiment, the zigzag-folding of the continuous member and the insertion of the positive and negative electrodes can be simultaneously performed, so that the takt time can be further reduced.

In another aspect of the present invention, there is provided a method of manufacturing an electrode assembly for a rectangular battery, in which positive and negative electrodes are alternately laminated so that a separator exists between the respective positive and negative electrodes, the manufacturing method comprising the steps of:

arranging a plurality of guide members in zigzag form in a perpendicular direction;

inserting an laminated member, in which a continuous member of the negative electrode is sandwiched between two rows of a continuous member of the separator, between one and another rows of the guide members;

folding, into zigzag form, the laminated member by intersecting the rows of the guide members in a horizontal direction;

inserting the positive electrodes in respective valley grooves of the zigzag-folded continuous member;

withdrawing the guide members from the respective valley grooves of the laminated member; and pressing, thereafter, the laminated member in the zigzag direction so as to make flat the laminated member.

According to the invention of this aspect, the valley grooves necessary for one electrode assembly can be simultaneously formed to the laminated member, so that the takt time can be remarkably reduced.

In addition, according to this aspect, the electrode assembly of the same layer numbers as that of the first aspect mentioned above can be manufactured by the guide members of the number less than that of the above-mentioned first aspect, or by using the same number of the guide members as that of the first aspect, the electrode assembly having the twice layer number can be manufactured in comparison with the invention of the first aspect.

Furthermore, since the laminated member is folded into zigzag form by intersecting the rows of the guide members, the valley grooves having deep depth can be manufactured, and accordingly, the electrode assembly having large positive electrode and large electric capacity.

In an embodiment according to the above another aspect, the positive electrodes may be inserted into the respective valley grooves of the laminated member while folding the laminated member by intersecting the respective rows of the guide members.

According to this embodiment, the zigzag-folding of the laminated member and the insertion of the positive electrodes can be simultaneously performed, and accordingly, the takt time can be further reduced. In addition, as mentioned above, in comparison with the embodiment of the first aspect mentioned above, the electrode assembly having the large number of layers can be manufactured, or by using the same number of the guide members, the electrode assembly having the twice layer number can be manufactured in comparison with the invention of the above embodiment of the first aspect.

In an embodiment of the above one (first) and another aspects, a distance between the rows of the guide members is narrowed after insertion of both the positive and negative electrodes or only the positive electrodes into the valley grooves of the continuous member or laminated member in the zigzag form.

According to this embodiment, each of the valley grooves can be formed to have a large opening so that the positive and negative electrodes are easily inserted, and after the insertion, by narrowing the distance between the respective rows of the guide members, the zigzag-shaped continuous member or laminated member can be easily made flat.

In an embodiment of the above aspects, both the positive and negative electrodes or only the positive electrodes inserted into the valley grooves of the continuous member or laminated member may be pressed in an extending direction of the valley grooves.

According to this embodiment, the positive electrodes and the negative electrodes inserted into the respective valley grooves of the continuous member or laminated member can be accurately positioned in the longitudinal direction thereof.

In an embodiment of the above aspects, when the guide members are withdrawn from the respective valley grooves of the continuous member or laminated member, the continuous member or laminated member may be pressed in the zigzag direction.

According to this embodiment, the zigzag-shaped continuous member or laminated member is not deformed at the time of withdrawing the guide members.

In an embodiment of the above aspects, after the guide members are withdrawn from the respective valley grooves of the continuous member or laminated member, the positive and negative electrodes may be further pushed into the respective valley grooves before the pressing of the continuous member or laminated member into a flat shape.

According to this embodiment, the positive and negative electrodes are moved to the positions in the valley grooves of the continuous member or laminated member at which the guide members existed. Accordingly, the area overlapped by the positive and negative electrodes is increased, resulting in the increasing of the electric capacity and improvement of the battery. In addition, the separator can be more effectively used.

In an embodiment of the above aspects, the guide members may be constructed as guide rods.

According to this embodiment, the guide members can be made compact and light.

In the above embodiment, the guide rods may be formed as rotatable guide rollers.

According to this embodiment, when the continuous member or laminated member is zigzag-folded, tension applied to the continuous member or laminated member can be loosened to thereby prevent them from being broken.

Further, in the above embodiment, the guide rods may be formed as semicircular cylindrical members.

According to this embodiment, the guide rods can be made light-weighted.

In an example of the above one and another aspects, when the rows of the guide members are intersected with each other, air may be ejected from surfaces of the guide members toward the continuous member or laminated member.

According to this embodiment, when the continuous member or laminated member is zigzag-folded, friction between the continuous member or laminated member and the guide members is reduced and tension applied to the continuous member or laminated member is loosened to thereby shorten the time required for the zigzag folding and properly prevent them from being broken.

In an embodiment of the above aspects, friction reducing material layers may be formed to surfaces of the guide members contacting to the continuous member or laminated member.

According to this embodiment, when the continuous member or laminated member is zigzag-folded, friction between the continuous member or laminated member and the guide members is reduced and tension applied to the continuous member or laminated member is loosened to thereby shorten the time required for the zigzag folding and properly prevent them from being broken.

In an embodiment of the above aspects, the guide members may be formed as guide plates.

According to this embodiment, even if the positive and negative electrodes are thin and soft, they can be smoothly inserted into the valley grooves of the separator.

In the above embodiment, the guide plates are formed to inclining plates inclining toward intersecting side front ends thereof.

According to this embodiment, in the case where the guide plates are formed to the inclining plates inclining toward the intersecting side front end thereof, the guide plates can be easily inserted into the respective valley grooves of the continuous member or laminated member, the guide plates can be easily withdrawn from the respective valley grooves, and the time required for the zigzag-folding can be shortened.

In an example of the above embodiment, the rotatable rollers may be attached to the intersecting side front ends of the guide plates.

According to this embodiment, when the continuous member or laminated member is zigzag-folded, the tension applied thereto is loosened and they can be prevented from being broken.

In the above embodiment, when the rows of the guide plates are intersected with each other, air may be ejected from surfaces of the rollers toward the continuous member or laminated member.

According to this embodiment, at the time when the continuous member or laminated member is zigzag-folded, the friction between the continuous member or laminated member and the guide plates can be reduced, and the tension applied to the continuous member or laminated member can be further loosened. In addition, the time required for the zigzag-folding can be shortened and the breakage of the continuous member or laminated member can be suitably prevented.

In the above embodiment, a friction reducing material layer may be formed on a surface of at least one of the roller or guide plate contacting to the continuous member or laminated member.

According to this embodiment, at the time when the continuous member or laminated member is zigzag-folded, the friction between the continuous member or laminated member and the guide plates can be reduced, and the tension applied to the continuous member or laminated member can be further loosened. In addition, the time required for the zigzag-folding can be shortened and the breakage of the continuous member or laminated member can be suitably prevented.

In an embodiment of the above aspects, the guide members may be withdrawn from the respective valley grooves of the continuous member or laminated member, folded lines are formed to bottom portions of the respective valley grooves of the continuous member or laminated member, and thereafter, the continuous member or laminated member is pressed in the zigzag direction so as to make flat the continuous member or laminated member.

According to this embodiment, after the forming the folded lines to the bottom portions of the respective valley grooves of the continuous member or laminated member, the continuous member or laminated member is pressed in the zigzag direction so as to make them flat, so that the continuous member or laminated member can be accurately folded into the zigzag form without being formed in a meandering manner, and moreover, the positive electrodes and the negative electrodes can be accurately opposed, thus providing an electrode assembly having preferred performance.

In the above embodiment, the side edges of the continuous member or laminated member may be pressed in the front end direction of the guide members from the time of zigzag-folding the continuous member or laminated member till the time of withdrawing the guide members.

According to this embodiment, meandering movement of the continuous member or laminated member at the zigzag-folding time can be prevented, and in addition, at the time of withdrawing the guide members, the continuous member or laminated member is not deformed, and accordingly, the electrode assembly can be assembled with high performance.

In the above embodiment, a distance of the continuous member or laminated member in the zigzag direction may be narrowed after the withdrawal of the guide members from the respective valley grooves of the zigzag-shaped continuous member or laminated member.

According to this embodiment, the opening of each valley groove can be made large so as to easily insert the positive and negative electrodes, and after the insertion thereof, by narrowing the distance between the respective rows of the guide members, the continuous member or laminated member in the zigzag form can be easily made flat.

In a further aspect of the present invention, there is provided an apparatus for manufacturing an electrode assembly for a rectangular battery in which positive electrodes and negative electrodes are alternately laminated with a separator being interposed therebetween, the apparatus comprising:

a zigzag folding mechanism provided with a plurality of guide members arranged in zigzag form in a perpendicular direction, and configured to fold a continuous member of the separator into zigzag form, by intersecting rows of the guide members in a horizontal direction when the continuous member is inserted between one and another one rows of the guide members;

an electrode inserting mechanism for alternately inserting the positive electrodes and the negative electrodes in the respective valley grooves of the zigzag-folded continuous member;

a guide member withdrawing mechanism for withdrawing the guide members from the respective valley grooves of the continuous member; and a press mechanism for pressing the continuous member in the zigzag direction so as to make flat the continuous member.

According to this aspect, the valley grooves of the numbers necessary for one electrode assembly can be simultaneously formed to the continuous member of the separator, so that the takt time is remarkably shortened. In addition, the separator is zigzag-folded by intersecting the respective rows of the guide members, so that the deep valley grooves can be formed, and the positive and negative electrodes are made large and the electrode assembly having large electric capacity can be provided.

Furthermore, even if the positive and negative electrodes are formed of thin and soft materials, they can be smoothly inserted into the valley grooves of the separator.

In a further aspect of the present invention, there is also provided an apparatus for manufacturing an electrode assembly for a rectangular battery in which positive electrodes and negative electrodes are alternately laminated with a separator being interposed therebetween, the apparatus comprising:

a zigzag folding mechanism provided with a plurality of guide members arranged in zigzag form in a perpendicular direction, and configured to fold a laminated member in which a continuous member of the negative electrode is sandwiched between two rows of a continuous member of the separator into zigzag form, by intersecting rows of the guide members in a horizontal direction when the laminated member is inserted between one and another one rows of the guide members;

an electrode inserting mechanism for inserting the positive electrodes in the respective valley grooves of the zigzag-folded laminated member;

a guide member withdrawing mechanism for withdrawing the guide members from the respective valley grooves of the laminated member; and a press mechanism for pressing the laminated member in the zigzag direction so as to make flat the laminated member.

According to this aspect of the present invention, the valley grooves of the numbers necessary for one electrode assembly can be simultaneously formed to the laminated member, so that the takt time is remarkably shortened.

In addition, the electrode assembly having the same layer number as that of the former embodiment can be formed by the guide members of the number less than that of the above aspect, or by using the guide member of the same number as that of the invention of the above aspect, an electrode assembly having twice number of layers can be formed.

Furthermore, the laminated member is zigzag-folded by intersecting the rows of the guide members, so that the deep valley grooves are formed, and as a result, the positive and negative electrodes having large area can be provided, and the electrode assembly having large electric capacity can be also provided.

In a still further aspect of the present invention, there is provided an apparatus for manufacturing an electrode assembly for a rectangular battery in which positive electrodes and negative electrodes are alternately laminated with a separator being interposed therebetween, the apparatus comprising:

a plurality of guide plates arranged in zigzag form in a perpendicular direction into two rows, in which the positive electrodes are placed on one row thereof and the negative electrodes are placed on another one row thereof, and when a continuous member of the separator is inserted between the one and another one rows of the guide plates, the respective rows are intersected with each other in a horizontal direction to thereby fold the continuous member into zigzag form, and the positive electrodes and the negative electrodes are alternately inserted into the respective valley grooves of the zigzag-folded continuous member;

an electrode holding mechanism for holding the positive and negative electrodes in the respective valley grooves of the continuous member at a time of withdrawing the guide plates from the respective valley grooves of the continuous member; and a press mechanism for pressing the continuous member in the zigzag direction so as to make flat the continuous member.

According to this aspect of the present invention, the valley grooves of the numbers necessary for one electrode assembly can be simultaneously formed to the continuous member of the separator, so that the takt time is remarkably shortened. In addition, the separator is zigzag-folded by intersecting the respective rows of the guide members, so that the deep valley grooves can be formed, and positive and negative electrodes are made large, and the electrode assembly having large electric capacity can be provided. Furthermore, even if the positive and negative electrodes are formed of thin and soft materials, they can be smoothly inserted into the valley grooves of the separator.

In addition, since the positive electrodes and the negative electrodes are alternately inserted into the respective valley grooves by the electrode inserting mechanism while zigzag-folding the continuous member by intersecting the rows of the guide plates in the horizontal direction, the zigzag-folding of the continuous member and the insertion of the positive and negative electrodes can be simultaneously performed, so that the structure of the apparatus can be made simple and the takt time can be further shortened.

In a still further aspect of the present invention, there is also provided an apparatus for manufacturing an electrode assembly for a rectangular battery in which positive electrodes and negative electrodes are alternately laminated with a separator being interposed therebetween, the apparatus comprising:

a plurality of guide plates arranged in zigzag form in a perpendicular direction into two rows, in which the positive electrodes are placed on one and another one rows thereof, and when a laminated member in which a continuous member of negative electrodes is sandwiched between two rows of a continuous member of the separator is inserted between the one and another one rows of the guide plates, the respective rows are intersected with each other in a horizontal direction to thereby fold the laminated member into zigzag form and the positive electrodes are inserted into the respective valley grooves of the zigzag-folded laminated member;

an electrode holding mechanism for holding the positive electrodes in the respective valley grooves of the laminated member at a time of withdrawing the guide plates from the respective valley grooves of the laminated member; and a press mechanism for pressing the laminated member in the zigzag direction so as to make flat the laminated member.

According to this aspect of the present invention, the valley grooves of the numbers necessary for one electrode assembly can be simultaneously formed to the laminated member, so that the takt time is remarkably shortened. In addition, the positive electrodes can be inserted into the valley grooves by the guide plates while zigzag-folding the laminated member by intersecting the respective rows of the guide members in the horizontal direction, so that zigzag-folding of the laminated member and the insertion of the positive electrodes can be simultaneously performed, thus simplifying the structure of the apparatus and further shortening the takt time.

In addition, since the laminated member is zigzag-folded by intersecting the rows of the guide plates, the deep valley grooves can be formed, and the positive and negative electrodes are made large and the electrode assembly having large electric capacity can be provided.

In a still further aspect of the present invention, there is provided an apparatus for manufacturing an electrode assembly for a rectangular battery in which positive electrodes and negative electrodes are alternately laminated with a separator being interposed therebetween, the apparatus comprising:

a zigzag folding mechanism provided with a plurality of guide rods arranged in zigzag form in a perpendicular direction, and configured to fold a continuous member of the separator by intersecting rows of the guide rods in a horizontal direction when the continuous member is inserted between one and another one rows of the guide rods;

an electrode inserting mechanism for alternately inserting the positive electrodes and the negative electrodes in the respective valley grooves of the zigzag-folded continuous member;

a guide rod withdrawing mechanism for withdrawing the guide rods from the respective valley grooves of the continuous member; and a folded line forming mechanism for forming the folded lines to bottom portions of the respective valley grooves of the continuous member after the withdrawal of the guide rods; and a press mechanism for pressing the continuous member, to which the folded lines are formed, in the zigzag direction so as to make flat the continuous member.

According to this aspect of the present invention, the valley grooves of the numbers necessary for one electrode assembly can be simultaneously formed to the continuous member of the separator, so that the takt time is remarkably shortened. In addition, the separator is zigzag-folded by intersecting the respective rows of the guide members, so that the deep valley grooves can be formed, and the positive and negative electrodes are made large and the electrode assembly having large electric capacity can be provided. Furthermore, even if the positive and negative electrodes are formed of thin and soft materials, they can be smoothly inserted into the valley grooves of the separator.

In addition, since the continuous member is pressed in the zigzag direction so as to make it flat after the forming of the folded lines to the bottoms of the respective valley grooves of the continuous member of the separator, the continuous member can be folded accurately into zigzag form without being moved in the meandering manner, and moreover, the positive and negative electrodes can be accurately opposed and the electrode assembly can be manufactured with high performance.

In a still further aspect of the present invention, there is also provided an apparatus for manufacturing an electrode assembly for a rectangular battery in which positive electrodes and negative electrodes are alternately laminated with a separator being interposed therebetween, the apparatus comprising:

a zigzag folding mechanism provided with a plurality of guide rods arranged in zigzag form in a perpendicular direction, and configured to fold a laminated member, in which a continuous member of the negative electrodes are sandwiched between two rows of a continuous member of the separator, by intersecting rows of the guide rods in a horizontal direction when the laminated member is inserted between one and another one rows of the guide rods;

an electrode inserting mechanism for inserting the positive electrodes in the respective valley grooves of the laminated member when the laminated member is zigzag-folded;

a guide rod withdrawing mechanism for withdrawing the guide rods from the respective valley grooves of the laminated member; and a folded line forming mechanism for forming the folded lines to bottom portions of the respective valley grooves of the laminated member after the withdrawal of the guide rods; and a press mechanism for pressing the laminated member, to which the folded lines are formed, in the zigzag direction so as to make flat the laminated member.

According to this aspect of the present invention, the valley grooves of the numbers necessary for one electrode assembly can be simultaneously formed to the laminated member, so that the takt time is remarkably shortened.

In addition, in comparison with the embodiment of the aspect mentioned above, the electrode assembly having the same number of layers can be manufactured with the use of reduced number of guide rods, or by using the same number of the guide members in the above aspect, the electrode assembly having the twice layer number can be manufactured in comparison with the embodiment of the above aspect of the invention.

Furthermore, since the laminated member is zigzag-folded by intersecting the rows of the guide rods, the deep valley grooves can be formed, and accordingly, the positive and negative electrodes are formed so as to have large areas, thus proving the electrode assembly having large electric capacity.

Still furthermore, the positive electrodes are inserted into the respective valley grooves by the electrode inserting mechanism while zigzag-folding the laminated member by intersecting the rows of the guide rods, so that the takt time can be further shortened. In addition, as mentioned above, in comparison with the above-described invention, the electrode assembly having an increased number of layers can be formed by the reduced number of the guide rods, or the electrode assembly having twice number of layers can be manufactured by using the same number of the guide rods.

Furthermore, since the laminated member is made flat by pressing it in the zigzag direction after the formation of the folded lines to the bottom portions of the respective valley grooves of the laminated member, the zigzag-folding can be performed accurately without being meandered, and in addition, the positive and negative electrodes can be accurately opposed and the electrode assembly can be manufactured with high performance.

In an embodiment of the above still further aspects of the present inventions, the electrode inserting mechanism is provided with electrode conveying trays for inserting the electrodes into the respective valley grooves of the continuous member or laminated member, and the folded line forming mechanism is provided with protruded portions formed to front ends of the respective electrode conveying trays and receiving portions forming the folded lines by clamping the continuous member or laminated member together with the protruded portions.

According to this embodiment, the insertion of the electrodes into the respective valley grooves of the continuous member or laminated member and the forming of the folded lines are simultaneously performed, so that the folded lines can be accurately formed to the groove bottoms of the respective valley grooves.

The nature and further characteristic features of the present invention will be made clearer from the following description made with reference to the accompanying drawings.

DESCRIPTION OF THE PREFERRED EMBODIMENTS

Preferred embodiments of the present invention will be described hereunder with reference to the accompanying drawings. Further, it is to be noted that terms "right", "left", "upper", "lower" and the like terms are used herein with reference to the illustrated state of the drawings or in an actual operative state of an apparatus.

First Embodiment

Figure 1:
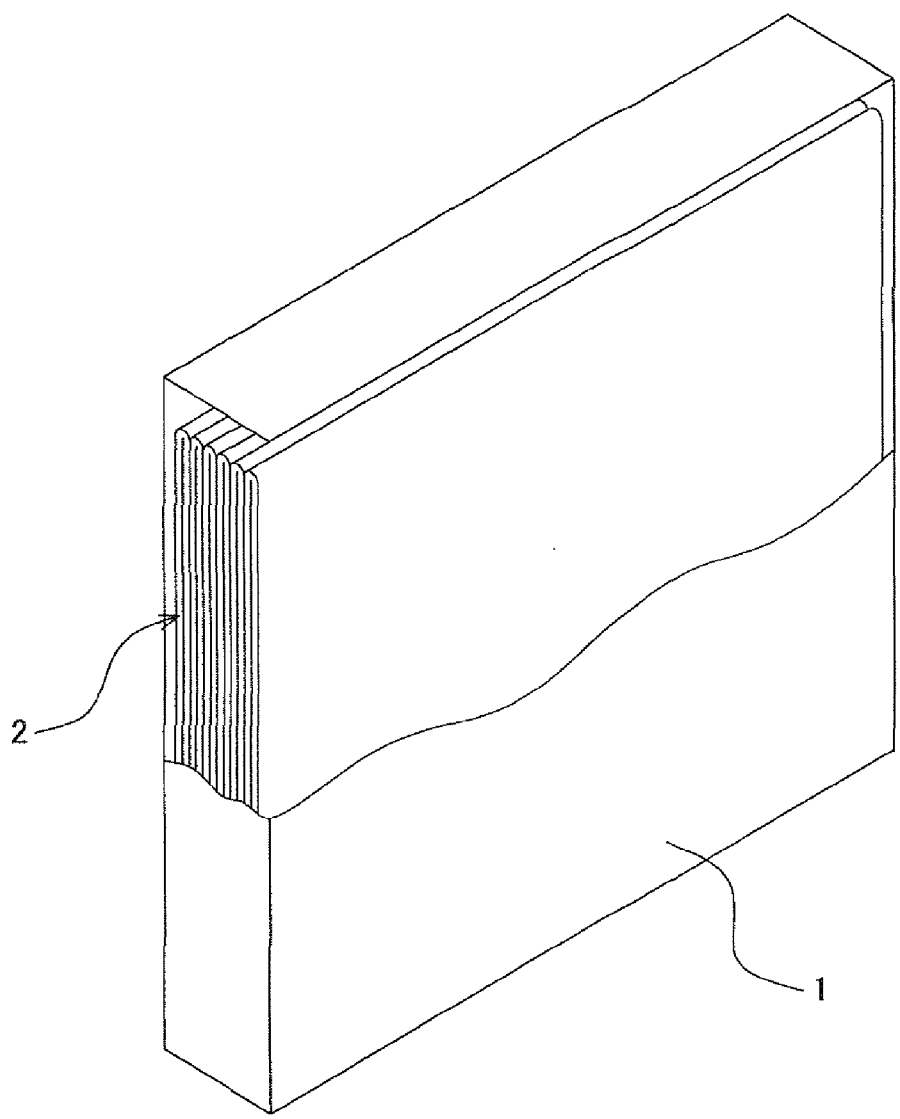
FIG. 1 is a perspective view, partially cut away, of a rectangular battery (or cell) in which an electrode assembly manufactured by method and apparatus according to the present invention is accommodated.

With reference to FIG. 1, reference numeral 1 denotes a rectangular case of a lithium ion secondary battery, reference numeral 2 denotes an electrode assembly accommodated in the rectangular case 1. Positive terminal and negative terminal, both not shown, are provided at predetermined positions of the rectangular case 1. Electrolyte formed by combining organic solvent with lithium salt fills in the rectangular case 1.

Figure 2:
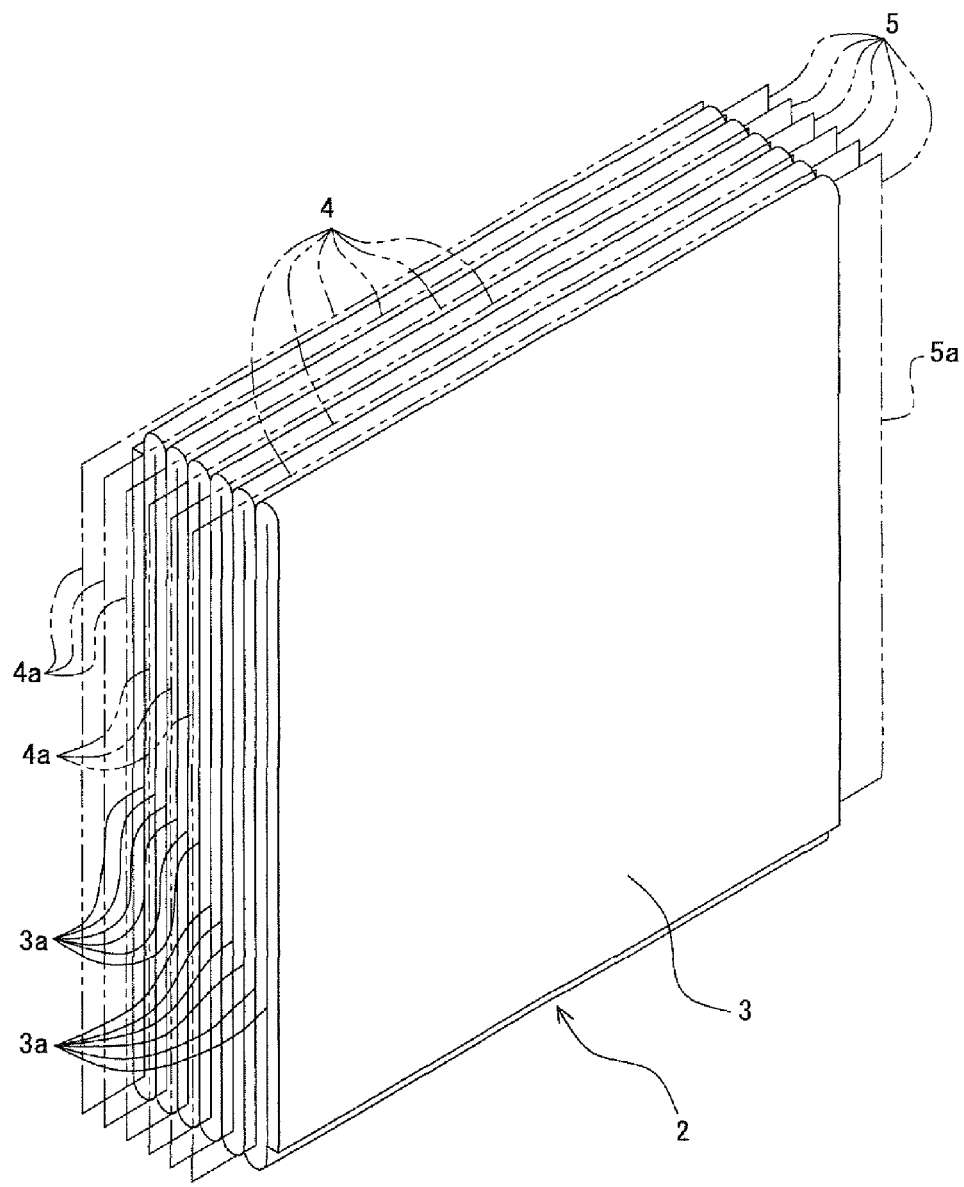
FIG. 2 is a perspective view showing the electrode assembly manufactured by the method and apparatus according to a first embodiment of the present invention.

The electrode assembly 2 is formed, as shown in FIG. 2, as a laminated structure including a continuous member 3 of separator formed in zigzag form (which may be called separator continuous member 3 or merely continuous member 3, hereinlater), and positive electrodes 4 and negative electrodes 5 alternately inserted respectively into valley grooves 3a of the continuous member 3. Further, it is to be noted that the tea as "valley grooves 3a" used herein are portions of the continuous member 3 of the separator which are formed by folded (bent) bottom portions in shape of grooves of valleys when the continuous member 3 of the separator is moved in the zigzag form.

The positive electrodes 4 and the negative electrodes 5 are alternately laminated such that each separator is disposed between adjacent positive electrode 4 and the negative electrode 5, which are folded into a flat shape. The positive electrode 4 and the negative electrode 5 are provided with lead portions 4a and 5a, respectively, so as to project in opposing directions from the separator, and the lead portions 4a and 5a are bundled and connected to the positive and negative battery terminals (not shown), respectively.

The positive electrode 4 is formed by coating positive electrode active material such as lithium transition metal compound oxide on both surfaces of sheet-shaped metal foil such as aluminium foil. On the other hand, the negative electrode 5 is formed by coating negative electrode active material such as carbon material on both surfaces of sheet-shaped metal foil such as copper foil. The continuous member 3 of the separator is formed from a porous film, to which fine holes are formed, of synthetic resin such as polyolefin group resin.

An apparatus for manufacturing the electrode assembly of the structure mentioned above will be described hereunder with reference to FIGS. 3 to 8.

Figure 3:
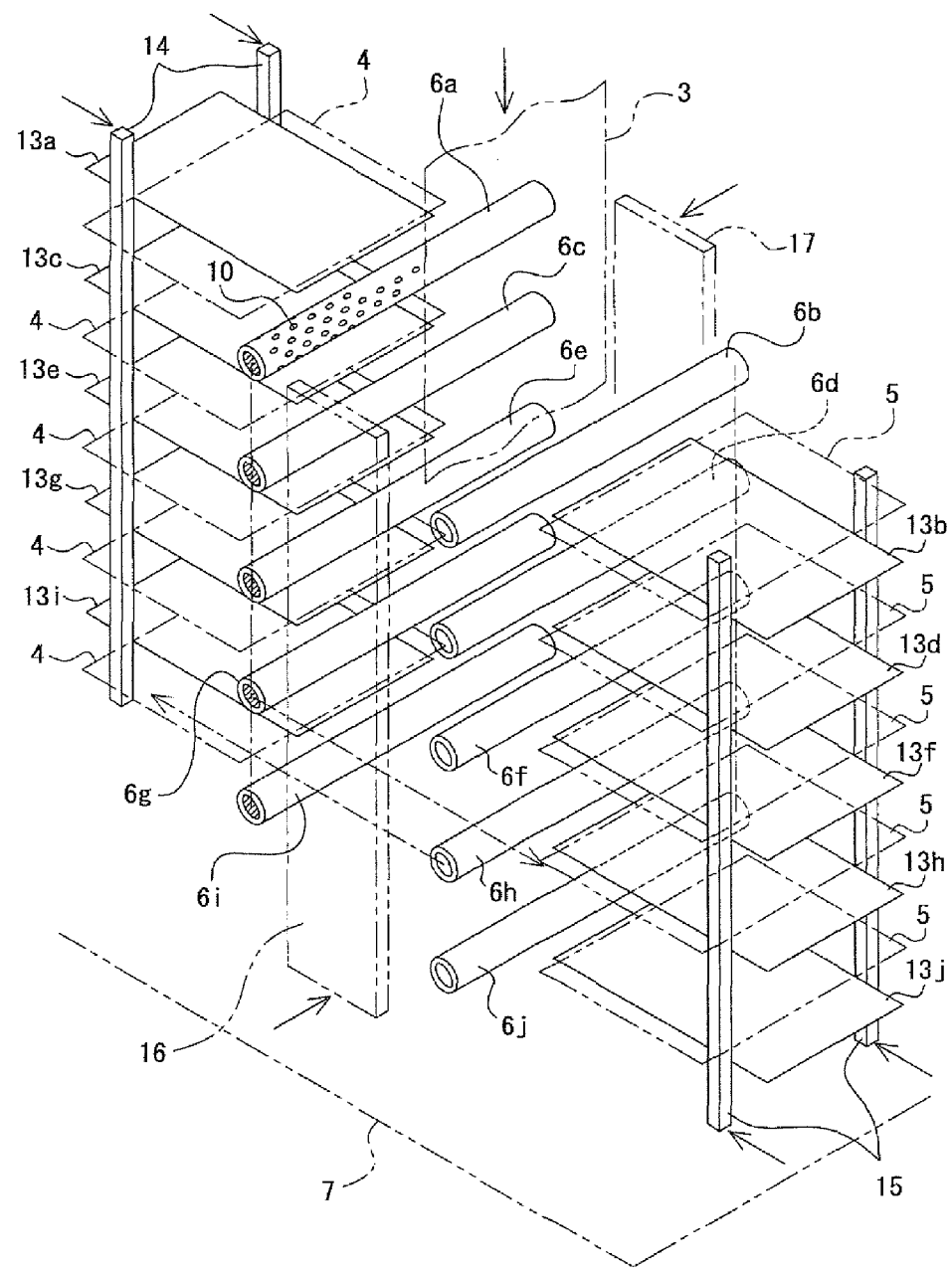
FIG. 3 is a schematic perspective view showing an apparatus for carrying out a method according to the first embodiment of the present invention.

As shown in FIG. 3, an apparatus for manufacturing the electrode assembly 2 includes: a zigzag folding mechanism, including a plurality of guide rods 6a, 6b, 6c, 6d, 6e, 6f, 6g, 6h, 6i and 6j arranged in zigzag form in a perpendicular direction so as to provide two vertical rows of arrangements as shown, for folding, in zigzag form, the continuous member 3 of the separator by intersecting the rows of the guide rods 6a, 6b, 6c, 6d, 6c, 6f, 6g, 6h, 6i and 6j in the horizontal direction when the continuous member 3 of the separator is inserted into a space between one and another rows of these guide rods 6a, 6b, 6c, 6d, 6e, 6f, 6g, 6h, 6i and 6j: an electrode inserting mechanism for inserting the positive electrodes 4 and the negative electrodes 5 alternately in the valley grooves 3a of the zigzag-folded separator 3, respectively; a guide rod withdrawing mechanism for withdrawing the guide rods 6a, 6b, 6c, 6d, 6e, 6f, 6g, 6h, 6i and 6j from the inside of the respective valley grooves 3a of the continuous member 3 of the separator; and a press mechanism for pressing the continuous member 3 of the separator in the zigzag direction so as to make flat the same.

The guide rods 6a, 6b, 6c, 6d, 6e, 6f, 6g, 6h, 6i and 6j of the zigzag folding mechanism are prepared of the numbers same as or more than the numbers of the positive and negative electrodes 4 and 5 supplied to one continuous member 3 of the separator. The guide rods are then arranged respectively horizontally in two rows in the perpendicular direction on a base plate 7 so as to provide the zigzag arrangement between the respective rows of the guide rods.

Figure 4A:
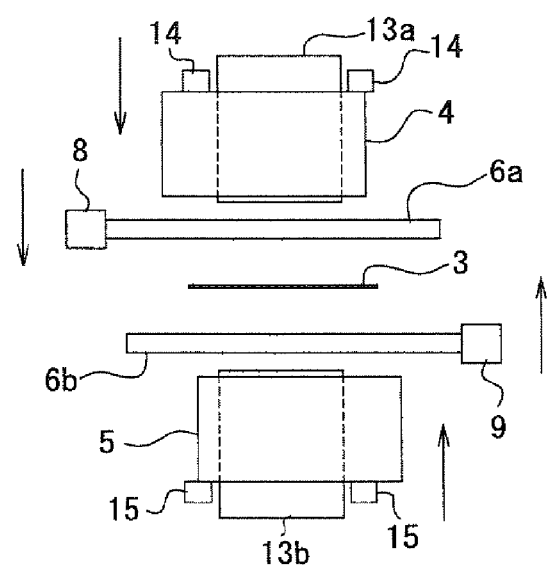
FIGS. 4A, 4B and 4C are plan, front and left-side side views, respectively, representing a first step in the method of the first embodiment of the present invention.
Figure 4B:
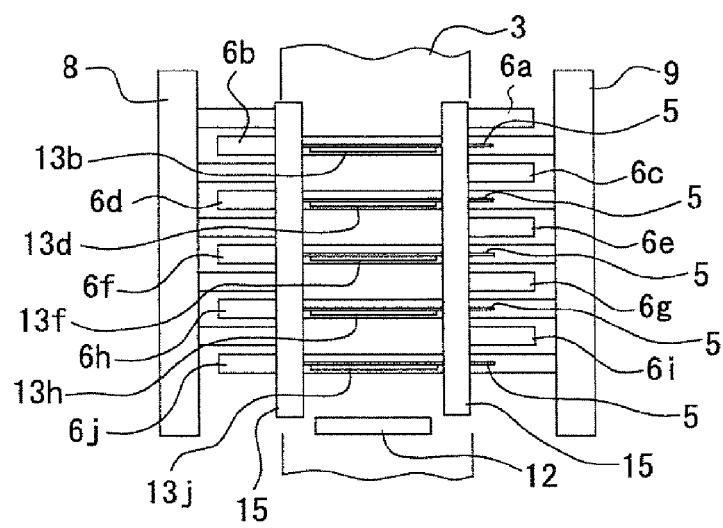
Figure 4C:
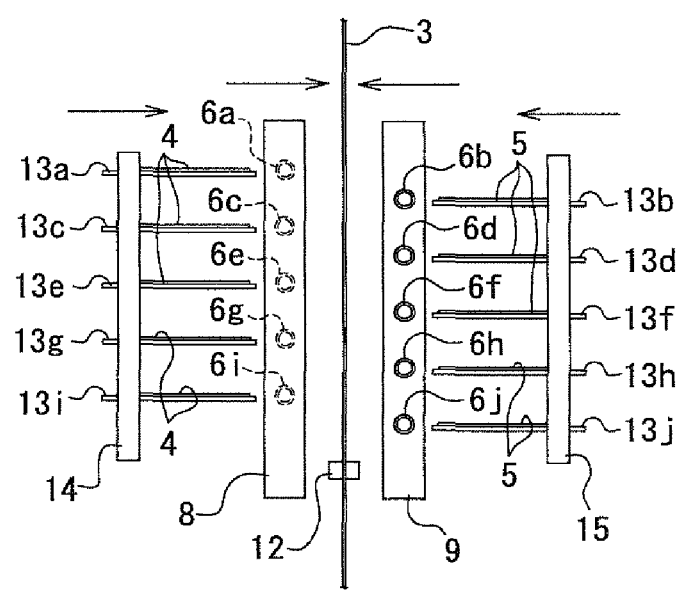

As shown in FIGS. 4A, 4B and 4C, the guide rods 6a, 6b, 6c, 6d, 6e, 6f, 6g, 6h, 6i and 6j are supported in cantilever manner by vertical frames 8 and 9 prepared for each row of the guide rods.

The guide rods 6a, 6b, 6c, 6d, 6e, 6f, 6g, 6h, 6i and 6j are formed as rollers so as to smoothly fold the continuous member 3 in zigzag shape. Of course, the guide rods 6a, 6b, 6c, 6d, 6e, 6f, 6g, 6h, 6i and 6j each having semi-cylindrical shape or round rods each of which is not rotated may be adopted as far as the guide rods can smoothly guide the continuous member 3 of the separator.

Each of the guide rods 6a, 6b, 6c, 6d, 6e, 6f, 6g, 6h, 6i and 6j may be formed with a number of fine nozzles 10 for exhausting air so as to direct to the continuous separator 3 when it is folded in zigzag shape. Each of these nozzles 10 is formed in a desired shape and arrangement such as circular shape or channel shape. By exhausting the air through the nozzles 10, friction between the continuous member 3 and the guide rods 6a, 6b, 6c, 6d, 6e, 6f, 6g, 6h, 6i and 6j can be reduced, and the zigzag folding formation of the continuous member 3 of the separator can be made further smooth.

Furthermore, a friction reducing material layer, not shown, may be formed on the surface of each of the guide rods 6a, 6b, 6c, 6d, 6e, 6f, 6g, 6h, 6i and 6j as occasion demands. The friction reducing material layer may be formed by coating fluororesin on the guide rod surface, thereby reducing the friction between the guide rods 6a, 6b, 6c, 6d, 6e, 6f, 6g, 6h, 61 and 6j and the continuous member 3 of the separator, and hence, further smoothing the zigzag-folding formation of the continuous member of the separator.

The zigzag-folding mechanism is provided with a driving unit for intersecting the rows of the guide rods 6a, 6b, 6c, 6d, 6e, 6f, 6g, 6h, 6i and 6j and folding the continuous member 3 of the separator into zigzag form when the continuous member 3 of the separator is inserted between one and another rows of the guide rods 6a, 6b, 6c, 6d, 6e, 6f, 6g, 6h, 6i and 6j. This driving unit is constructed from a ball screw, a motor and so on interposed between the base plate 7 and the vertical frames 8 and 9 supporting the rows of the guide rods 6a, 6b, 6c, 6d, 6e, 61, 6g, 6h, 6i and 6j. Such driving unit utilizing the ball screw and the motor is a known one, so that it is not shown herein.

On the base plate 7, as shown in FIGS. 6B, 6C and FIGS. 7B, 7C, a surface table 11 for supporting the continuous member 3 of the separator, which is folded into zigzag form, from the lower side thereof is set to be movable. Further, as shown in FIGS. 4B and 4C, a clamp 12 for clamping the base end (lower end as shown) is provided near the surface table 11 to be movable without interfering the surface table 11. A roll, not shown, on which the continuous member 3 of the separator has been wound up, is provided above the surface table 11. The roll is made to be less loaded in wind-out direction of the continuous member 3 of the separator so as to reduce tension generated to the continuous member at the portion to be zigzag-folded.

The electrode inserting mechanism is provided with electrode conveying trays 13a, 13b, 13c, 13d, 13e, 13f, 13g, 13h, 13i and 13j for alternately inserting the positive electrodes 4 and the negative electrodes 5 in the respective valley grooves 3a of the continuous member 3 of the separator which is folded into zigzag form by the guide rods 6a, 6b, 6c, 6d, 6e, 6f, 6g, 6h, 6i and 6j of the zigzag folding mechanism. The electrode conveying trays 13a, 13b, 13c, 13d, 13e, 13f, 13g, 13h, 13i and 13j are prepared by the same numbers as those of the positive and negative electrodes 4 and 5 necessary for one electrode assembly, and are arranged horizontally behind the respective guide rods 6a, 6b, 6c, 6d, 6e, 6f, 6g, 6h, 6i and 6j.

Figure 5A:
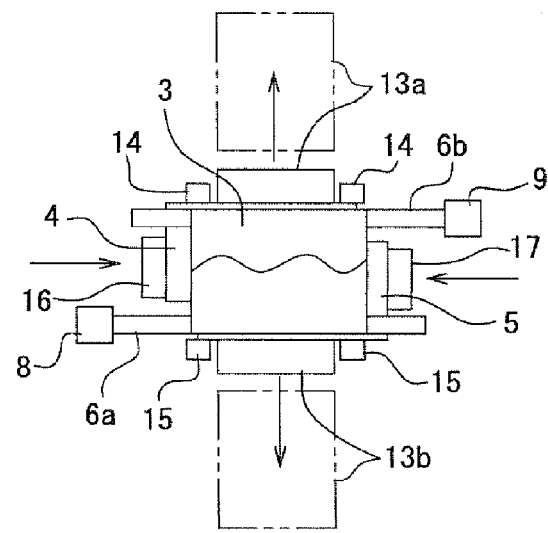
FIGS. 5A, 5B and 5C are plan, front and left-side side views, respectively, representing a second step in the method of the first embodiment of the present invention.
Figure 5B:
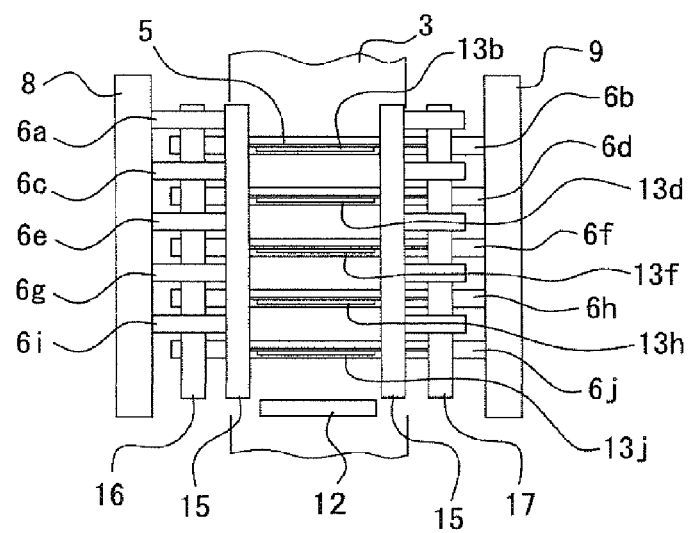
Figure 5C:
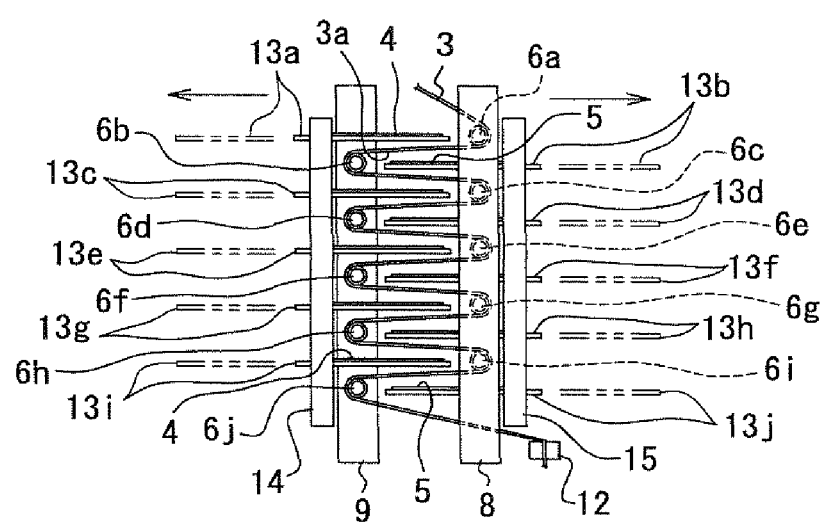

The electrode conveying trays 13a, 13b, 13c, 13d, 13e, 13f, 13g, 13h, 13i and 13j are assembled in correspondence with the respective rows of the guide rods 6a, 6b, 6c, 6d, 6e, 6f, 6g, 6h, 6i and 6j, are supported by vertical frames, not shown, but identical to those of the zigzag folding mechanism, and are movable in the horizontal direction by a driving unit composed of ball screw, not shown, but identical to that of the zigzag folding mechanism. Although the electrode conveying trays 13a, 13b, 13c, 13d, 13e, 13f, 13g, 13h, 13i and 13j may be moved after the zigzag-folding of the continuous member 3 by the guide rods 6a, 6b, 6c, 6d, 6e, 6f, 6g, 6h, 6i and 6j, as shown in FIGS. 5A, 5B and 5C, it may be desired that the electrode conveying trays 13a, 13b, 13c, 13d, 13e, 13f, 13g, 13h, 13i and 13j at the same time of folding, in the zigzag form, the continuous member 3 of the separator intersecting the rows of the guide rods 6a, 6b, 6c, 6d, 6e, 6f, 6g, 6h, 6i and 6j. According to such operation, the respective positive and negative electrodes 4 and 5 can be inserted into the respective valley grooves 3a of the continuous member 3 of the separator while performing the zigzag-folding of the continuous member 3, thus reducing the takt time.

As shown in FIG. 5C, the electrode conveying trays 13a, 13b, 13c, 13d, 13e, 13f, 13g, 13h, 13i and 13j are removed rearward from the valley grooves 3a of the continuous member 3 of the separator immediately after the insertion of the respective positive and negative electrodes 4 and 5 into the valley grooves 3a of the continuous member 3. In order that the electrodes 4 and 5 remain in the valley grooves 3a of the continuous member 3 at the time when the electrode conveying trays 13a, 13b, 13c, 13d, 13e, 13f, 13g, 13h, 13i and 13j are retired, as shown in FIGS. 5A, 5B and 5C, pressing members 14, 14 and 15, 15 are arranged so as to sandwich the rows of the electrode conveying trays 13a, 13b, 13c, 13d, 13e, 13f, 13g, 13h, 13i and 13j from both the lateral sides thereof. These pressing members 14, 14 and 15, 15 are formed as vertical rods abutting against the rear edges of the positive and negative electrodes 4 and 5 run off or protruded from both the lateral sides of the electrode conveying trays 13a, 13b, 13c, 13d, 13e, 13f, 13g, 13h, 13i and 13j, and arranged on the lateral portions of the respective rows of the electrode conveying trays 13a, 13b, 13c, 13d, 13e, 13f, 13g, 13h, 13i and 13j Since the pressing members 14, 14 and 15, 15 are arranged on the rear side of the positive and negative electrodes 4 and 5 run off from the lateral sides of the electrode conveying trays 13a, 13b, 13c, 13d, 13e, 13f, 13g, 13h, 13i and 13j, when the electrode conveying trays 13a, 13b, 13c, 13d, 13e, 13f, 13g, 13h, 13i and 13j are removed rearward from the valley grooves 3a of the continuous member 3 of the separator, the positive and negative electrodes 4 and 5 remain in the respective valley grooves 3a of the continuous member 3. The pressing members 14, 14 and 15, 15 are connected to the base plate 7 through a piston cylinder assembly, not shown, and when the electrode conveying trays 13a, 13b, 13c, 13d, 13e, 13f, 13g, 13h, 13i and 13j move forward into the valley grooves 3a of the continuous member 3, the pressing members 14, 14 and 15, 15 are also moved forward by the operation of the piston cylinder assembly and remain at the forwarded positions after the retirement of the electrode conveying trays 13a, 13b, 13c, 13d, 13e, 13f, 13g, 13h, 13i and 13j outward of the valley grooves 3a of the continuous member 3 of the separator.

As shown in FIG. 3 and FIGS. 5A and 5B, stoppers 16 and 17 are arranged on both sides in the longitudinal direction of the guide rods 6a, 6b, 6c, 6d, 6e, 6f, 6g, 6h, 6i and 6j as occasion demands. These stoppers 16 and 17 serve to press the positive electrodes 4 and the negative electrodes 5 inserted into the valley grooves 3a of the continuous member 3 of the separator so as to press the guide rods 6a, 6b, 6c, 6d, 6e, 6f, 6g, 6h, 6i and 6j in the longitudinal direction thereof. The stoppers 16 and 17 are reciprocally movable in the longitudinal direction of the guide rods 6a, 6b, 6e, 6d, 6e, 6f, 6g, 6h, 6i and 6j by a piston cylinder assembly, not shown, and one of the stoppers 16 is inserted into the respective valleys 3a of the continuous member of the separator by the one of the rows of the electrode conveying trays 13a, 13c, 13e, 13g and 13i and then abuts against the side edges of all the positive electrodes 4 which are run off from the side edge of the separator 3, and on the other hand, the other one of the stoppers 17 is inserted into the respective valleys 3a of the continuous member 3 of the separator by the other one of the rows of the electrode conveying trays 13b, 13d, 13f, 13h and 13j, and then abuts against the side edges of all the negative electrodes 5 run off from the opposing side edge of the separator. According to location of such stoppers 16 and 17, the positive electrodes 4 and the negative electrodes 5 inserted into the valley grooves 3a of the continuous member 3 can be accurately positioned in the longitudinal direction of the guide rods 6a, 6b, 6c, 6d, 6e, 6f, 6g, 6h, 6i and 6j.

Although not shown, a pitch changing mechanism for narrowing the interval between the respective guide rods 6a, 6b, 6c, 6d, 6e, 6f, 6g, 6h, 6i and 6j in the row in the longitudinal direction is provided for each of the respective vertical frames 8 and 9 supporting the guide rods 6a, 6b, 6c, 6d, 6e, 6f, 6g, 6h, 6i and 6j. That is, for the respective vertical frames 8 and 9, there are provided guide grooves for allowing the guide rods 6a, 6b, 6c, 6d, 6e, 6f, 6g, 6h, 6i and 6j to be slid in the vertical direction thereof and solenoids for holding the respective guide rods at pitches shown in FIG. 3 and FIGS. 5B and 5C. The guide rods 6a, 6b, 6c, 6d, 6e, 6f, 6g, 6h, 6i and 6j are held by an adsorbing force of the solenoids to the vertical frames 8 and 9 at the pitches shown in FIG. 3 and FIGS. 5B and 5C.

Figure 6A:
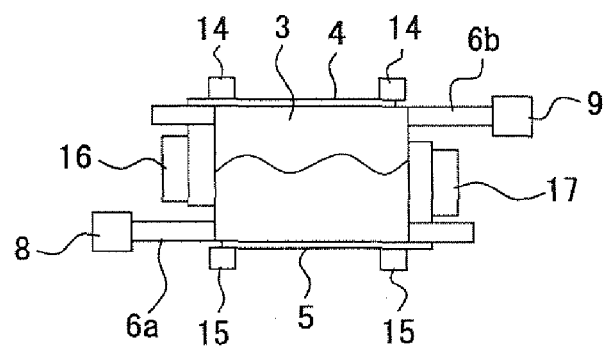
FIGS. 6A, 6B and 6C are plan, front and left-side side views, respectively, representing a third step in the method of the first embodiment of the present invention.
Figure 6B:
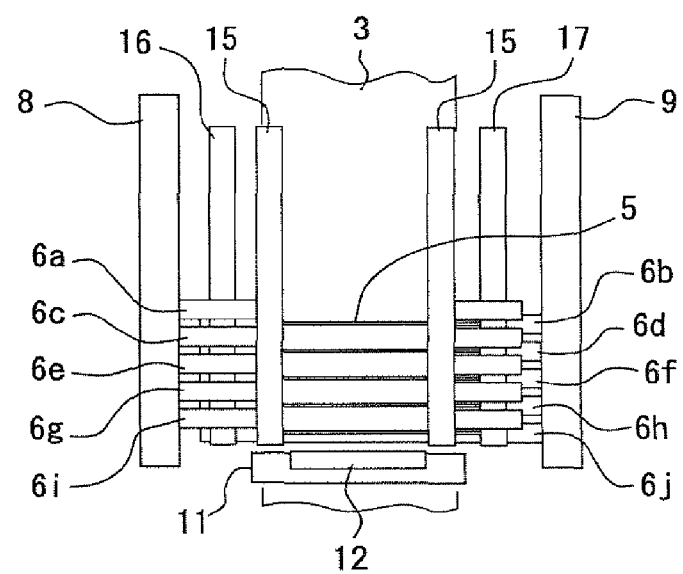
Figure 6C:
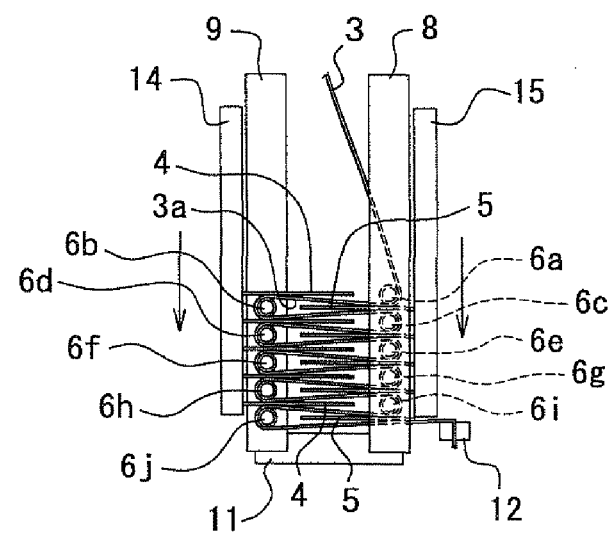

When the adsorbing force of the solenoids is released, the respective guide rod 6a, 6b, 6c, 6d, 6e, 6f, 6g, 6h, 6i and 6j fall down along the vertical frames 8 and 9, and the interval in the perpendicular direction is narrowed as shown in FIGS. 6B and 6C. Accordingly, the continuous member 3 of the separator with both the positive and negative electrodes 4 and 5 being inserted between the valley grooves 3a are made flat in the zigzag direction.

Figure 7A:
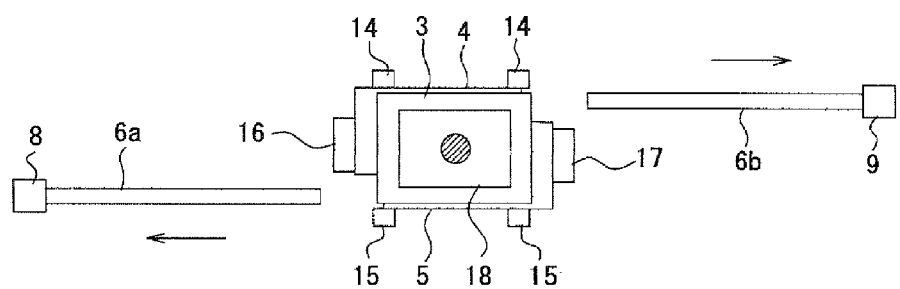
FIGS. 7A, 7B and 7C are plan, front and left-side side views, respectively, representing a fourth step in the method of the first embodiment of the present invention.
Figure 7B:
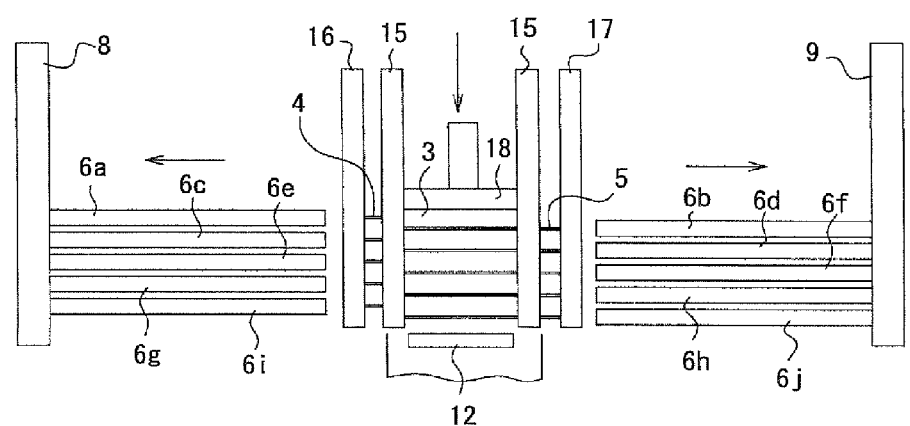
Figure 7C:
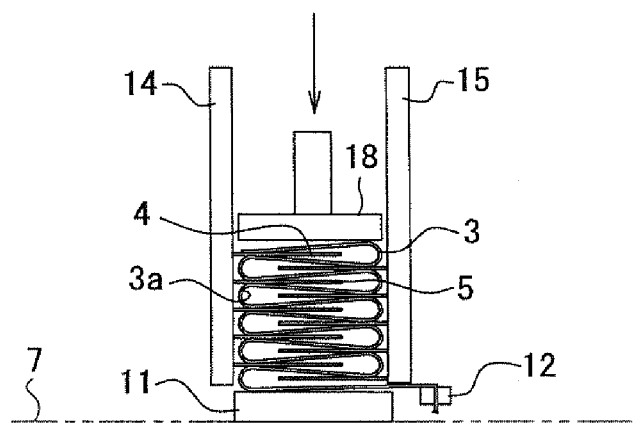

The guide rod 6a, 6b, 6e, 6d, 6e, 6f, 6g, 6h, 6i and 6j can be withdrawn from the respective valley grooves 3a of the continuous member 3 of the separator by the guide rod withdrawing mechanism as shown in FIGS. 7A, 7B, and 7C. The guide rod withdrawing mechanism includes a piston cylinder assembly, not shown. The piston cylinder assembly is interposed between the base plate 7 and the vertical frames 8 and 9 of the guide rod 6a, 6b, 6c, 6d, 6e, 6f, 6g, 6h, 6i and 6j, and according to the expansion/contraction motion of the piston cylinder assembly, the guide rod 6a, 6b, 6c, 6d, 6e, 6f, 6g, 6h, 6i and 6j are removed out of the respective valleys 3a of the continuous member 3 as shown in FIGS. 7A, 7B and 7C, or are returned to the positions shown in FIG. 3 and FIGS. 4A, 4B and 4C.

The pressing members 14, 14 and 15, 15 are connected to the base plate 7 through the piston cylinder assembly, not shown, as mentioned above. After the guide rod 6a, 6b, 6c, 6d, 6e, 6f, 6g, 6h, 6i and 6j have been withdrawn from the respective valley grooves 3a of the continuous member 3 of the separator folded in the zigzag form, when the piston cylinder assembly is operated, the pressing members 14, 14 and 15, 15 are further moved forward as shown in FIGS. 8A, 8B and 8C to thereby push further deeply the positive electrodes 4 and the negative electrodes 5 into the valleys 3a of the separator.

Figure 8A:
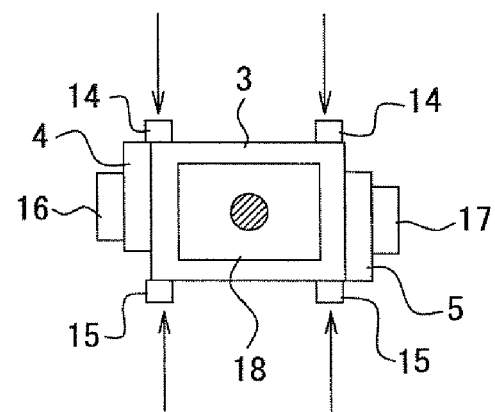
FIGS. 8A, 8B and 8C are plan, front and left-side side views, respectively, representing a fifth step in the method of the first embodiment of the present invention.
Figure 8B:
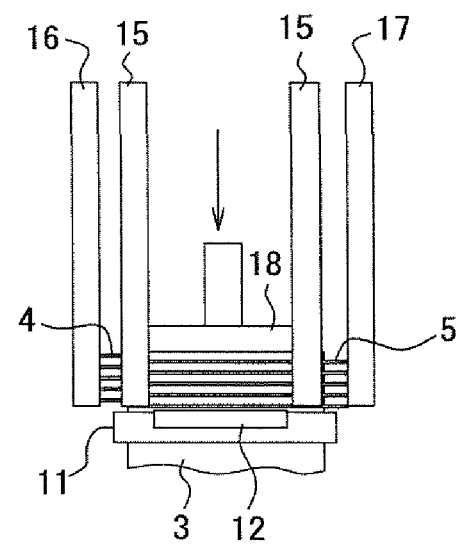
Figure 8C:
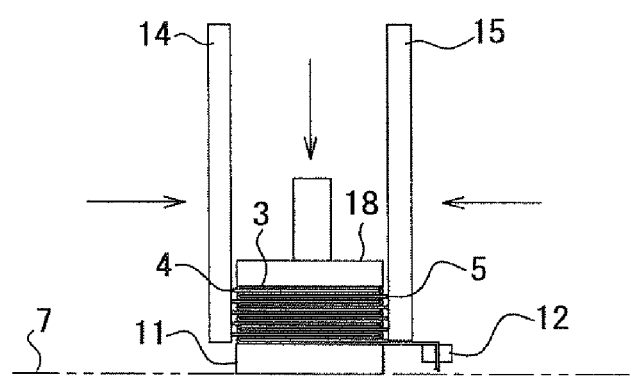

As shown in FIGS. 8A, 8B and 8C, the pressing mechanism includes a pusher 18 elevated perpendicularly on the base plate 7. The pusher 18 pushes the separator in the zigzag direction so as to make flat the continuous member 3 of the separator at the time when the pressing members 14, 14 and 15, 15 are moved on the side of the guide rods 6a, 6b, 6c, 6d, 6e, 6f, 6g, 6h, 6i and 6j, and the positive electrodes 4 and the negative electrodes 5 are pushed further deeply into the respective valley grooves 3a. According to such operation, the continuous member 3 is made flat so as to provide thickness identical to that of the electrode assembly 2 shown in FIG. 2 in which the positive and negative electrodes 4 and 5 are sandwiched by the folded continuous member 3.

Further, as shown in FIGS. 7A, 7B and 7C, when the guide rods 6a, 6b, 6c, 6d, 6e, 6f, 6g, 6h, 6i and 6j are withdrawn from the inside of the respective valley grooves 3a of the continuous member 3 of the separator, it may be possible to lightly press the continuous member 3 in the zigzag direction. According to this operation, the continuous member 3 of the separator bent in the zigzag form is not deformed in accordance with the withdrawal of the guide rods 6a, 6b, 6c, 6d, 6; 6f, 6g, 6h, 6i and 6j.

Figure 11A:
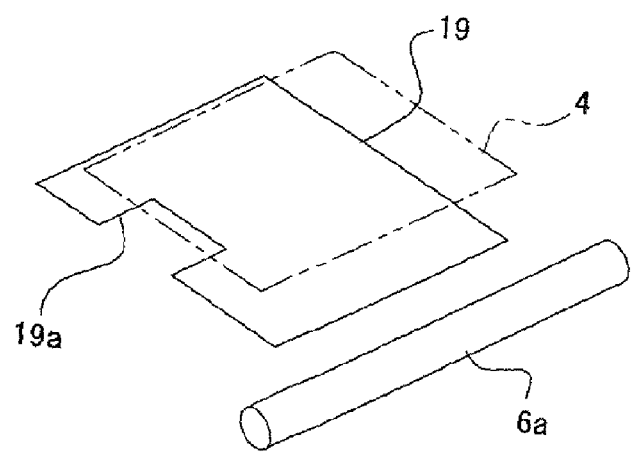
FIGS. 11A, 11B and 11C are perspective views, respectively, showing modified examples of an electrode conveying tray used in the first and second embodiment of the present invention mentioned above.
Figure 11B:
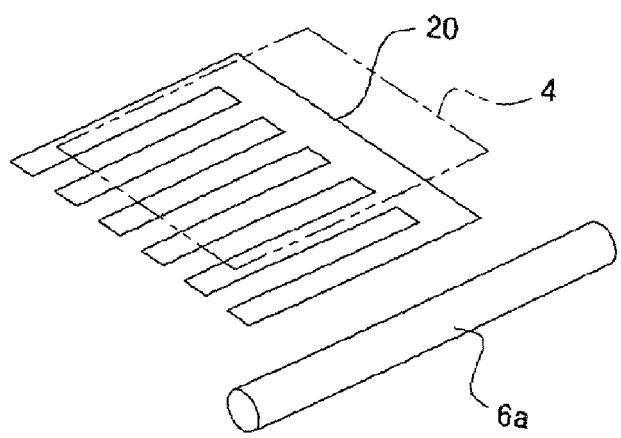
Figure 11C:
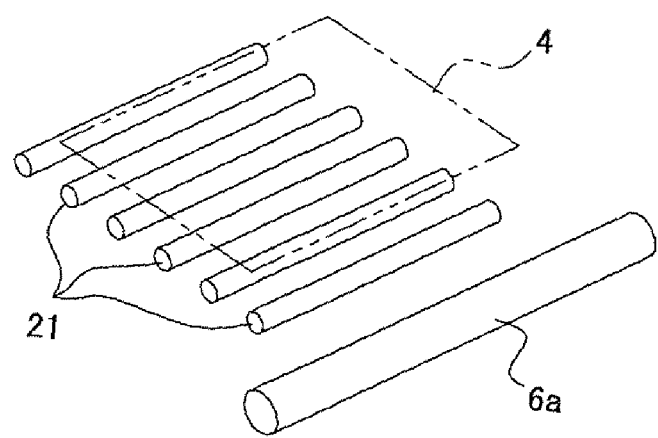

In the above embodiment, although each of the electrode conveying trays 13a, 13b, 13c, 13d, 13e, 13f, 13g, 13h, 13i and 13j is formed as a horizontal plate, it may be formed, as shown in FIG. 11A, as a electrode conveying tray 19 formed with a notch into which the stopper can enter. Further, as shown in FIG. 11B, it may be formed as a electrode conveying tray having a comb-shaped structure, or as shown in FIG. 11C, it may be also composed of a number of rollers or pins 21 arranged on a horizontal plane.

The electrode assembly 2 of the structure mentioned above will be manufactured in accordance with the following procedures.

(1) As shown in FIG. 3 and FIGS. 4A, 4B, and 4C, the continuous member 3 of the separator is inserted between one and the other rows of the guide rods 6a, 6b, 6c, 6d, 6e, 6f, 6g, 6h, 6i and 6j arranged in the zigzag form, and then, the front end of the continuous member 3 is held by the clamp 12. The continuous member 3 is then taken out from a roll around which the continuous member 3 has been wound up and stretched between the upper and lower guide rods 6a and 6j at a small tension.

(2) The rows of the guide rods 6a, 6b, 6c, 6d, 6e, 6f, 6g, 6h, 6i and 6j are moved in the horizontal direction shown with arrows in FIGS. 4A and 4C, and as shown in FIGS. 5A, 5B and 5C, the rows of the guide rods 6a, 6b, 6c, 6d, 6e, 6f, 6g, 6h, 6i and 6j intersect each other. According to this operation, the continuous member 3 of the separator is folded into the zigzag form, and the valley grooves 3a of the numbers required for one electrode assembly 2 are simultaneously formed to the continuous member 3 of the separator, thus remarkably reducing the takt time necessary for the manufacture of the electrode assembly 2. Furthermore, since the separator is formed into the zigzag shape by intersecting the rows of the guide rods 6a, 6b, 6c, 6d, 6e, 6f, 6g, 6h, 6i and 6j, the deep valley grooves 3a can be correspondingly formed, making it possible for large positive electrodes 4 and negative electrodes 5 to be inserted, and thus, making it possible to manufacture the electrode assembly 2 having large capacity.

The guide rods 6a, 6b, 6c, 6d, 6e, 6f, 6g, 6h, 6i and 6j are formed as rollers capable of being rotated, so that the tension of the continuous member 3 of the separator is relaxed and the continuous member 3 can be smoothly folded into the zigzag form.

Furthermore, when the rows of the guide rods 6a, 6b, 6c, 6d, 6e, 6f, 6g, 6h, 6i and 6j intersect each other, air is exhausted from the surfaces of the guide rods 6a, 6b, 6c, 6d, 6e, 6f, 6g, 6h, 6i and 6j toward the continuous member 3 of the separator through the nozzles 10. According to this operation, at the time when the continuous member 3 of the separator is folded in the zigzag form, the friction between the continuous member 3 and the guide rods 6a, 6b, 6c, 6d, 6c, 6f, 6g, 6h, 6i and 6j can be reduced, and the tension to be applied to the continuous member 3 of the separator can be relaxed. As a result, the time required for the zigzag-folding of the separator 3 can be shortened and breakage thereof can be suitably prevented.

(3) Simultaneously with the movement of the rows the guide rods 6a, 6b, 6c, 6d, 6e, 6f, 6g, 6h, 6i and 6j in the horizontal direction shown by arrows in FIGS. 4A and 4C, the electrode conveying trays 13a, 13b, 13c, 13d, 13e, 13f, 13g, 13h, 13i and 13j are also moved in the arrowed direction. The positive electrodes 4 are preliminarily placed on one of rows of the electrode conveying trays 13a, 13c, 13e, 13g and 13i and the negative electrodes 5 are also preliminarily placed on the other one of rows of the electrode conveying trays 13b, 13d, 13f, 13h and 13j. Thus, as shown in FIGS. 5A, 5B and 5C, the positive electrodes 4 and the negative electrodes 5 are alternately inserted into the valley grooves 3a of the zigzag-folded continuous member 3 of the separator.

As mentioned above, the zigzag-folding of the continuous member 3 of the separator and the insertion of the positive and negative electrodes 4 and 5 can be performed at the same time, while folding the continuous member 3 by intersecting the rows of the guide rods 6a, 6b, 6c, 6d, 6e, 6f, 6g, 6h, 6i and 6j, and inserting alternately the positive and negative electrodes 4 and 5 into the valley grooves 3a of the separator 3, thus further shortening the takt time.

As shown in FIGS. 5A, 5B and 5C, the pressing members 14, 14 and 15, 15 are also moved forward toward the separator and then stopped in the state of contacting to the rear edges of the positive and negative electrodes 4 and 5 placed on the electrode conveying trays 13a, 13b, 13c, 13d, 13e, 13f, 13g, 13h, 13i and 13j, respectively.

(4) As shown in FIG. 5C with two-dot-chain lines, the electrode conveying trays 13a, 13b, 13c, 13d, 13e, 13f, 13g, 13h, 13i and 13j are returned to the original position immediately after the insertion of the positive and negative electrodes 4 and 5 into the valley grooves 3a of the continuous member 3 of the separator 3.

The pressing members 14, 14 and 15, 15 stop at the advancing positions and maintain the state abutting against the rear edges of the positive and negative electrodes 4 and 5. Because of this reason, when the electrode conveying trays 13a, 13b, 13c, 13d, 13e, 13f, 13g, 13h, 13i and 13j are retired backward, the positive and negative electrodes 4 and 5 are pushed out from surfaces of the electrode conveying trays 13a, 13b, 13c, 13d, 13e, 13f, 13g, 13h, 13i and 13j, and the electrode conveying trays 13a, 13b, 13c, 13d, 13e, 13f, 13g, 13h, 13i and 13j are then retired in an empty state with the positive and negative electrodes 4 and 5 remaining in the valley grooves 3a of the separator.

(5) As shown in FIGS. 5A, 5B and 5C, when the electrode conveying trays 13a, 13b, 13c, 13d, 13e, 13f, 13g, 13h, 13i and 13j, on which the positive and negative electrodes 4 and 5 are placed, are invaded into the valley grooves 3a of the continuous member of the separator, the respective stoppers 16 and 17 advance in the longitudinal direction of the guide rods 6a, 6b, 6c, 6d, 6e, 6f, 6g, 6h, 6i and 6j. Thereafter, one of the stoppers 16 is inserted into the respective valley grooves 3a of the separator by one of the rows of the electrode conveying trays 13a, 13c, 13e, 13g and 13i and then contact to the side edges of all the positive electrodes 4 projecting from one side edge of the separator 3. On the other hand, the other one of the stoppers 17 is inserted into the respective valley grooves 3a of the separator by one of the rows of the electrode conveying trays 13a, 13c, 13e, 13g and 13i and then contact to the side edges of all the negative electrodes 5 projecting from opposing side edge of the separator 3. According to such operation, the positive and negative electrodes 4 and 5 inserted into the respective valley grooves 3a of the separator can be accurately positioned in the longitudinal direction of the guide rods 6a, 6b, 6c, 6d, 6e, 6f, 6g, 6h, 6i and 6j.

(6) By the function of the pitch changing mechanism, the respective guide rods 6a, 6b, 6c, 6d, 6e, 6f, 6g, 6h, 6i and 6j drop down, as shown in FIGS. 6A, 6B and 6C, along the vertical frames 8 and 9 so as to reduce the interval between the rows of the respective guide rods 6a, 6b, 6c, 6d, 6e, 6f, 6g, 6h, 6i and 6j. According to this operation, the continuous member 3 of the separator, in which the positive electrodes 4 and the negative electrodes 5 are inserted into the valley grooves 3a, respectively, are made flat in the zigzag direction thereof.

As mentioned above, since the respective guide rods 6a, 6b, 6c, 6d, 6e, 6f, 6g, 6h, 6i and 6j reduce the interval between the rows thereof after the positive electrodes 4 and the negative electrodes 5 have been inserted into the valley grooves 3a of the separator, openings of the respective valley grooves 3a are made large to thereby easily insert the positive and negative electrodes 4 and 5 thereinto, and after the insertion, by reducing the interval between the rows of the guide rods the respective guide rods 6a, 6b, 6c, 6d, 6e, 6f, 6g, 6h, 6i and 6j, the zigzag-shaped continuous member 3 of the separator can be easily made flat.

Further, the pitch changing mechanism may be eliminated in a case where the respective guide rods 6a, 6b, 6c, 6d, 6e, 6f, 6g, 6h, 6i and 6j are fine ones.

(7) As shown in FIGS. 7A, 7B and 7C, the guide rods 6a, 6b, 6c, 6d, 6e, 6f, 6g, 6h, 6i and 6j are withdrawn from the respective valley grooves 3a of the zigzag-shaped separator. At this time, the continuous member 3 of the separator is slightly pressed in the zigzag direction by the pusher 18. According to this operation, the deformation of the zigzag-shaped separator 3 due to the withdrawal of the guide rods 6a, 6b, 6c, 6d, 6e, 6f, 6g, 6h, 6i and 6j can be prevented.

(8) As shown in FIGS. 8A, 8B and 8C, when the pressing members 14, 14 and 15, 15 advance slightly on the separator side, the positive electrodes 4 and the negative electrodes 5 are further deeply pushed into the valley grooves 3a of the separator 3. According to this operation, the positive electrodes 4 and the negative electrodes 5 are moved to the positions at which the guide rods 6a, 6b, 6c, 6d, 6e, 6f, 6g, 6h, 6i and 6j exist in the valley grooves 3a of the separator, and areas at which the positive electrodes 4 and the negative electrodes 5 are overlapped with each other increase, and hence, the electric capacity is also increased, thereby improving the performance of the battery. Thus, the separator can be more effectively utilized.

Further, the step of further deeply pushing the positive electrodes 4 and the negative electrodes 5 into the valley grooves 3a may be done just after the withdrawal of the guide rods 6a, 6b, 6c, 6d, 6e, 6f, 6g, 6h, 6i and 6j from the valley grooves 3a of the zigzag-shaped continuous member 3, respectively.

(9) As shown in FIGS. 8A, 8B and 8C, in synchronous with the forward movement of the pressing members 14, 14 and 15, 15, the pusher 18 strongly pushes the continuous member 3 of the separator in the zigzag direction thereof. According to this operation, the separator is further bent and folded in the zigzag form to thereby become further flat, and a flat laminated member in which such flat-shaped continuous member 3 of the separator and the positive and negative electrodes 4 and 5 are alternately overlapped can be formed.

(10) When the front end of the separator is released from the clamp 12, and the rear end thereof is cut off from the succeeding continuous separator 3, the electrode assembly 2 can be completed. The thus completed electrode assembly 2 is accommodated in the battery case 1 as shown in FIG. 1.

Second Embodiment

Figure 9:
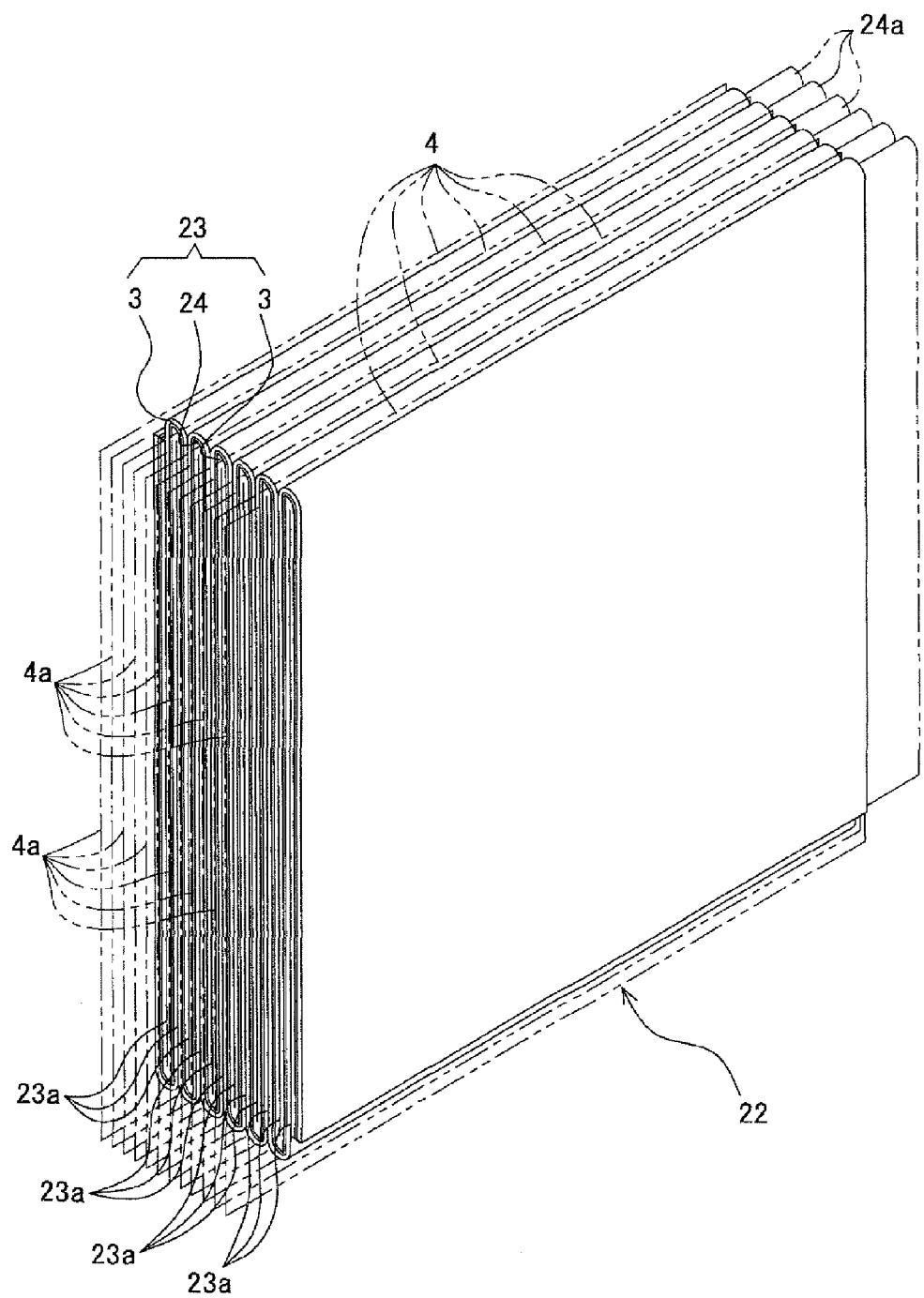
FIG. 9 is a perspective view showing the electrode assembly manufactured by the method and apparatus according to a second embodiment of the present invention.

As shown in FIG. 9, an electrode assembly 22 according to this second embodiment includes a laminated member composed of a continuous member 23 folded in zigzag form and the positive electrodes 4 inserted into valley grooves 3a of the continuous laminated member 23, respectively. The continuous laminated member 23 is a laminated member composed of two rows of continuous members 3, 3 of the separators and a continuous negative electrode 24 interposed between the two rows of the separators. According to this structure, the positive electrodes 4 inserted into the respective valley grooves 23a of the continuous laminated member 23 oppose to the continuous negative electrode 24 with the separator being interposed therebetween. The positive electrodes 4 and the continuous negative electrode 24 are provided with lead portions 4a and 24a which are projected from the separator in opposing directions, and these lead portions 4a and 24a are bundled respectively, which are then connected to positive and negative terminals, both not shown, of the battery case 1 (shown in FIG. 1)

Figure 10:
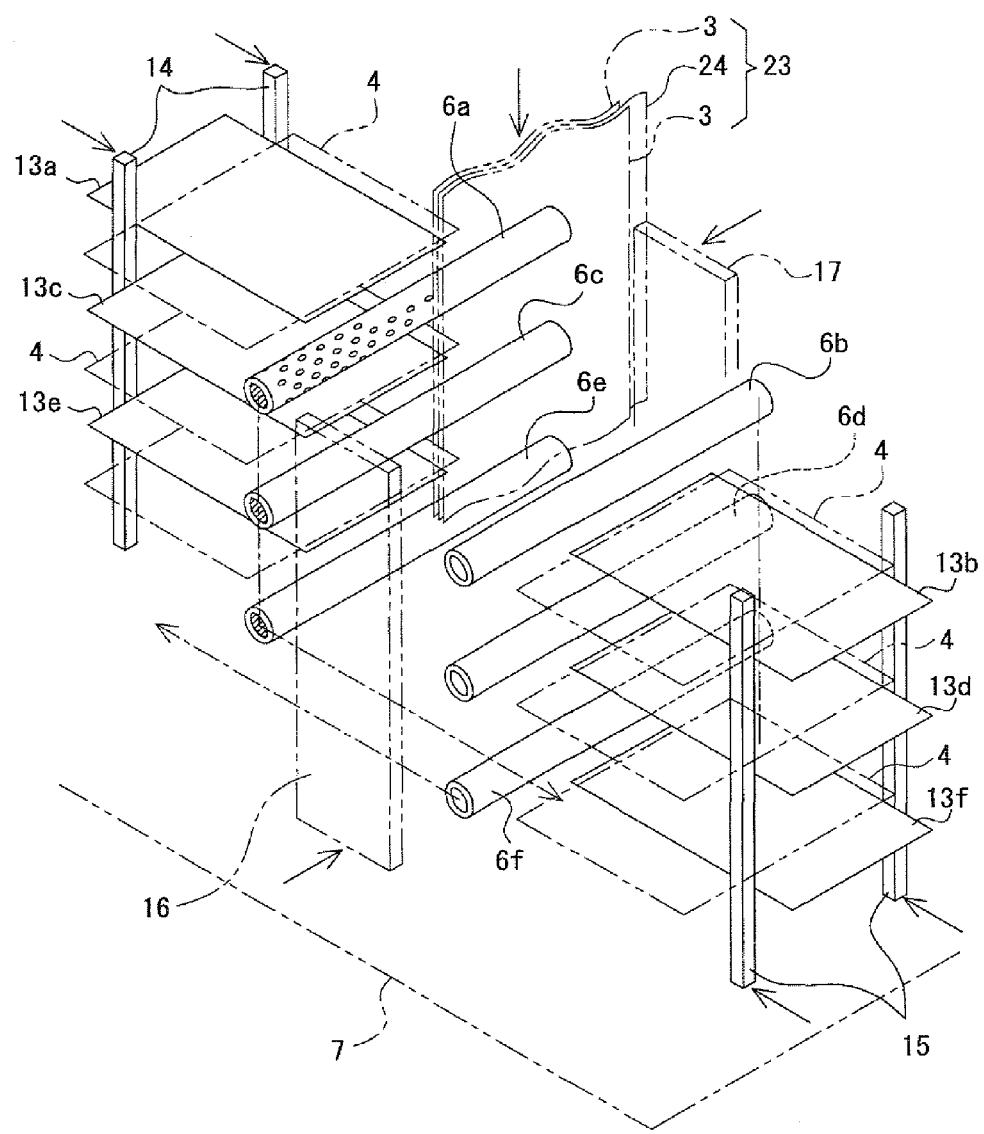
FIG. 10 is a schematic perspective view showing an apparatus for carrying out a method according to the second embodiment of the present invention.

As shown in FIG. 10, an apparatus for manufacturing the electrode assembly 22 includes a plurality of guide rods 6a, 6b, 6c, 6d, 6e, 6f, 6g, 6h, 6i and 6j arranged in zigzag form as in the first embodiment, but in this second embodiment, the continuous laminated member 23 is inserted between the two rows of such guide rods 6a, 6b, 6c, 6d, 6e, 6f, 6g, 6h, 6i and 6j. Further, all the electrode conveying trays 13a, 13b, 13c, 13d, 13e, 13f, 13g, 13h, 13i and 13j convey only the positive electrodes 4 into the valley grooves 23a of the continuous laminated member 23. Except the above points, the electrode assembly 22 is manufactured by the similar apparatus and processes as those mentioned with reference to the first embodiment.

In this second embodiment, the valleys 23a for inserting only the positive electrodes 4 into the continuous laminated member 23 may be formed, so that when the electrode assembly 22 having the same performance as that of the electrode assembly 2 in the first embodiment, the numbers of the zigzag-folds can be reduced half in comparison with the folded numbers of the first embodiment, and accordingly, the numbers of the guide rods and the electrode conveying trays can be also reduced half, thus further shortening the takt time.

To the other structures or arrangements, the same reference numerals are added, in FIGS. 9 and 10, to members or like as those in the first embodiment, and the duplicated explanations will be omitted herein.

Third Embodiment

Figure 12:
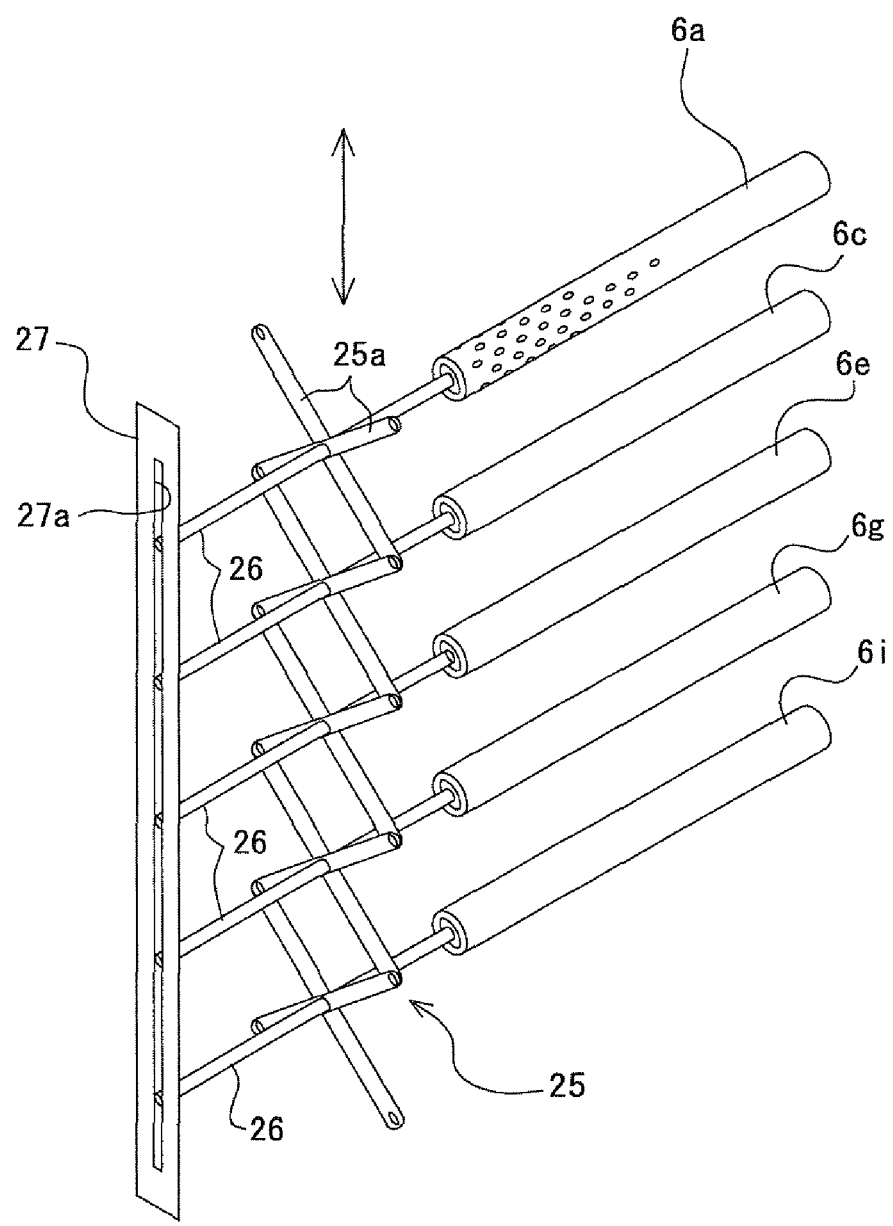
FIG. 12 is a perspective view showing one example of a pitch changing member of a guide rod according to a third embodiment of the present invention.

In the third embodiment, as shown in FIG. 12, a link mechanism 25 is utilized as the pitch changing mechanism for narrowing the interval between the rows of the guide rods 6a, 6b, 6c, 6d, 6e, 6f, 6g, 6h, 6i and 6j in the perpendicular direction.

This link mechanism is a parallel motion mechanism including a plurality of members each pivoting links 25a, 25a having the same length so as to provide an X-shape, which are connected by means of pins in perpendicular direction. A shaft 26 of the guide rods 6a, 6c, 6e, 6g and 6i is inserted into each pivot point of the X-shaped paired links 25a, 25a, and one end of each of the shafts 26 is inserted into a guide groove 27a of a guide member 27 extending in the perpendicular direction. In order to easily hold horizontally the guide rods 6a, 6c, 6e, 6g and 6i, a plurality of link mechanisms may be arranged in rows as occasion demands.

Though not shown, substantially identical arrangements of the link mechanisms and guide member may be made with respect to the opposing guide rods 6b, 6d, 6f, 6h and 6j.

According to the arrangement mentioned above, the guide rods 6a, 6b, 6c, 6d, 6e, 6f, 6g, 6h, 6i and 6j are held in the perpendicular direction at pitches shown in FIG. 3 and FIGS. 5B and 5C, and when the link mechanism is contracted in the perpendicular direction, the guide rods 6a, 6b, 6c, 6d, 6e, 6f, 6g, 6h, 6i and 6j drop down perpendicularly while maintaining the constant interval from each other, and as shown in FIGS. 6B and 6C, the interval in the perpendicular direction is narrowed. As a result, the zigzag-shaped continuous member 3 having the valley grooves 3a into which the positive and negative electrodes 4 and 5 are inserted are made flat to thereby provide an electrode assembly 2.

Fourth Embodiment

Figure 13A:
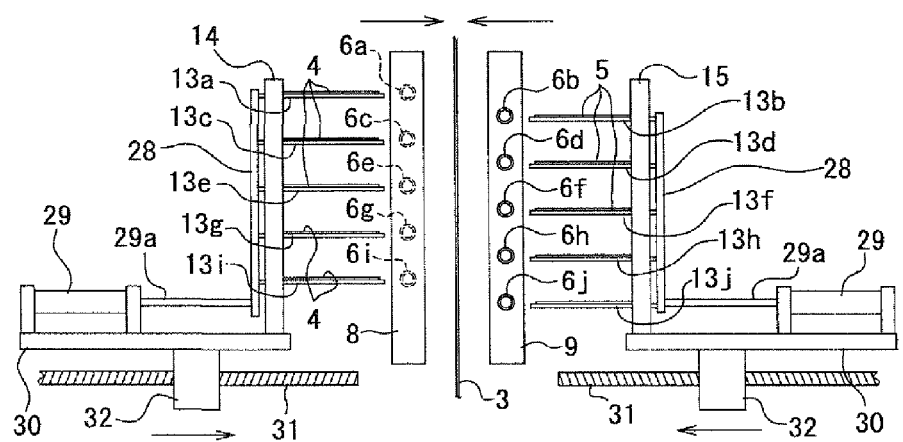
FIG. 13A is a front view showing one example of an electrode conveying tray and a device for driving a push member according to a fourth embodiment of the present invention in a state before a separator is folded in a zigzag form.
Figure 13B:
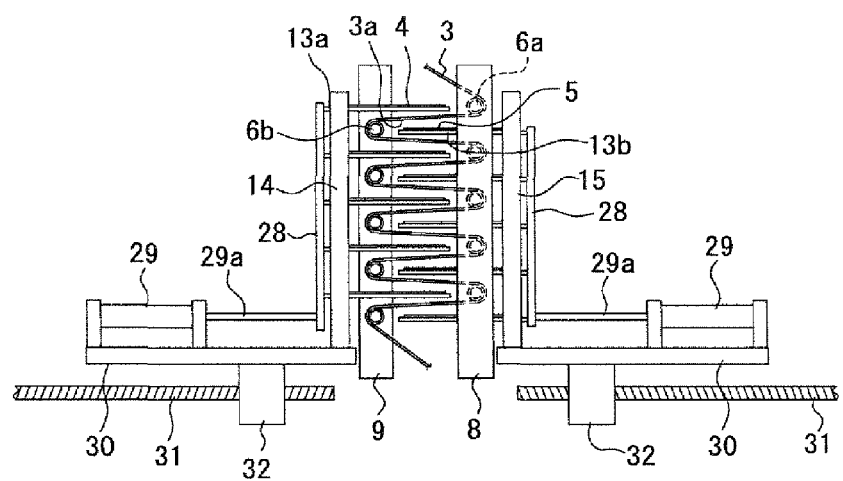
FIG. 13B is a front view showing a state in which an electrode is inserted into a valley groove after the zigzag-folding of the separator.
Figure 13C:
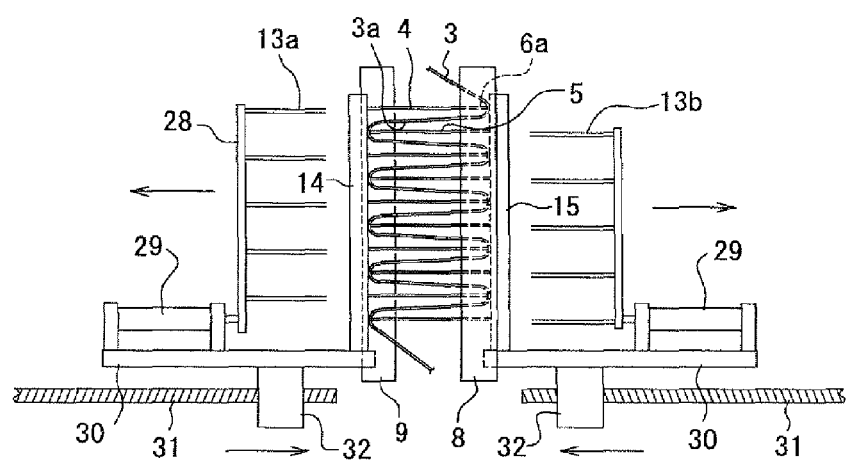
FIG. 13C is a front view showing a state in which the electrode is inserted further deeply in the valley groove of the separator.

In this fourth embodiment, as shown in FIGS. 13A, 13B and 13C, the electrode conveying trays 13a, 13b, 13c, 13d, 13e, 13f, 13g, 13h, 13i and 13j are assembled in correspondence with the respective rows of the guide rods 6a, 6b, 6c, 6d, 6e, 6f, 6g, 6h, 6i and 6j, and the rear ends of the respective trays are connected to the vertical frames 28.

The vertical frames 28, 28 are connected to the piston rods 29a, 29a of the piston cylinder assemblies 29, 29 which are expanded and contracted in the conveying direction of the respective electrodes 4 and 5, and the respective piston cylinder assemblies 29, 29 are placed on a reciprocal table 30, 30 to be reciprocally movable in the conveying direction of the respective electrodes 4 and 5.

Each of the reciprocal tables 30 (refer to FIGS. 3 and 10) is connected to a nut 32 screwed with a ball screw 31 as feed screw means mounted on the base plate 7 to be rotatable. The ball screw 31 is rotated by means of motor, not shown.

The pressing members 14, 14 and 15, 15 are mounted to the reciprocal tables 30, 30, and when the reciprocal tables 30, 30 are moved by the rotation of the ball screws 31, 31, the pressing members 14, 14 and 15, 15 are moved together with the electrode conveying trays 13a, 13b, 13c, 13d, 13e, 13f, 13g, 13h, 13i and 13j. When the piston cylinder assemblies 29, 29 are expanded and contracted, the electrode conveying trays 13a, 13b, 13c, 13d, 13e, 13f, 13g, 13h, 13i and 13j perform the reciprocal movement independently of the pressing members 14, 14 and 15, 15.

The functions of the electrode assembly manufacturing apparatus of the present invention of the characters mentioned above will be described hereunder.

(1) In the state shown in FIG. 13A, the respective rows of the guide rods 6a, 6b, 6c, 6d, 6e, 6f, 6g, 6h, 6i and 6j start to move in the horizontal direction as shown with arrows as like as in the first embodiment. At the same time, the ball screws 31, 31 take one turn in one direction, and the electrode conveying trays 13a, 13b, 13c, 13d, 13e, 13f, 13g, 13h, 13i and 13j and the pressing members 14, 14 and 15, 15 on the respective reciprocal tables 30, 30 are moved integrally in the arrowed direction with respect to each of the lateral electrode assembly.

At this time, the positive electrodes 4 are preliminarily placed on the one of the rows of the electrode conveying trays 13a, 13c, 13e, 13g and 13i and on the other hand, the negative electrodes 5 are preliminarily placed on the other one of the rows of the electrode conveying trays 13b, 13d, 13f, 13h and 13j.

(2) As shown in FIG. 13B, when the respective rows of the guide rods 6a, 6b, 6c, 6d, 6e, 6f, 6g, 6h, 6i and 6j intersect with each other, the continuous member 3 of the separator is folded into zigzag form. Further, when the lateral reciprocal tables 30, 30 approach each other, the positive electrodes 4 and the negative electrodes 5 are alternately inserted into the respective valley grooves 3a of the separator, and the reciprocal tables 30, 30 stop at a time when the respective front ends of the electrode conveying trays 13a, 13b, 13c, 13d, 13e, 13f, 13g, 13h, 13i and 13j approach the guide rods 6a, 6b, 6e, 6d, 6e, 6f, 6g, 6h, 6i and 6j, respectively.

The pressing members 14, 14 and 15, 15 also advance on the separator side and then stop together with the electrode conveying trays 13a, 13b, 13c, 13d, 13e, 13f, 13g, 13h, 13i and 13j in a state that the pressing members are in contact with the rear edges of the positive and negative electrodes 4 and 5 on the electrode conveying trays 13a, 13b, 13c, 13d, 13e, 13f, 13g, 13h, 13i and 13j.

(3) When the electrode conveying trays 13a, 13b, 13c, 13d, 13e, 13f, 13g, 13h, 13i and 13j on which the positive and negative electrodes 4 and 5 are placed invade into the valley grooves 3a of the separator, as like as in the first and second embodiments, the respective stoppers 16 and 17 advance in the longitudinal direction of the guide rods 6a, 6b, 6c, 6d, 6e, 6f, 6g, 6h, 6i and 6j. Then, one of the stoppers 16 is inserted into the respective valley grooves 3a of the separator by one row of the electrode conveying trays 13a, 13c, 13e, 13g and 13i and abuts against the side edges of all the positive electrodes 4 projecting over the side edge of the separator. On the other hand, the other one of the stoppers 17 is inserted into the respective valley grooves 3a of the separator by one row of the electrode conveying trays 13b, 13d, 13f, 13h and 13j and abuts against the side edges of all the negative electrodes 5 projecting over the side edge of the separator.

According to such operation, the positive electrodes 4 and the negative electrodes 5 inserted into the respective valley grooves 3a of the continuous member 3 of the separator are positioned exactly in the longitudinal direction of the guide rods 6a, 6b, 6c, 6d, 6e, 6f, 6g, 6h, 6i and 6j. These stoppers 16 and 17 may be provided as occasion demands.

(4) Thereafter, as shown in FIG. 13C, the piston cylinder assemblies 29, 29 placed on the reciprocal tables 30, 30 are contracted, and then, the electrode conveying trays 13a, 13b, 13c, 13d, 13e, 13f, 13g, 13h, 13i and 13j are removed out of the valley grooves 3a of the separator and retired to the position shown with the solid line in FIG. 13C.

At that time, the pressing members 14, 14 and 15, 15 keep the forwarding positions shown in FIG. 13B and maintain the state abutting against the rear edges of the positive and negative electrodes 4 and 5. Because of this reason, the positive and negative electrodes 4 and 5 are pushed out from the electrode conveying trays 13a, 13b, 13c, 13d, 13e, 13f, 13g, 13h, 13i and 13j when the electrode conveying trays 13a, 13b, 13c, 13d, 13e, 13f, 13g, 13h, 13i and 13j are moved rearward, and then, the electrode conveying trays 13a, 13b, 13c, 13d, 13e, 13f, 13g, 13h, 13i and 13j are retired in the empty state with the positive and negative electrodes 4 and 5 remaining in the valley grooves 3a of the separator.

(5) As occasion demands, as like as in the first, second and third embodiments, the pitch changing mechanism is provided, and according to the function thereof, the interval between the respective rows of the guide rods 6a, 6b, 6c, 6d, 6e, 6f, 6g, 6h, 6i and 6j are narrowed.

(6) As shown in FIG. 13C, the guide rods 6a, 6b, 6c, 6d, 6e, 6f, 6g, 6h, 6i and 6j are withdrawn from the respective valley grooves 3a of the zigzag-shaped continuous member 3 of the separator.

(7) When the guide rods 6a, 6b, 6c, 6d, 6e, 6f, 6g, 6h, 6i and 6j are withdrawn, as shown in FIG. 13C, the ball screws 31, 31 are rotated to move slightly forward the pressing members 14, 14 and 15, 15 toward the separator side to thereby push further deeply the positive and negative electrodes 4 and 5 into the valley grooves 3a of the separator, respectively.

According to these motions, the positive electrodes 4 and the negative electrodes 5 are moved with high accuracy to the position in which the guide rods 6a, 6b, 6c, 6d, 6e, 6f, 6g, 6h, 6i and 6j in the respective valley grooves 3a of the separator 3 exist, and then, the positive electrodes 4 and the negative electrodes 5 are overlapped accurately, thus increasing the electric capacity, and hence, improving the performance as the battery. The separator can be more effectively utilized.

(8) Thereafter, as in the first embodiment, the separator is folded into further flat, and the electrode assembly 2 as the flat laminated member including the overlapped flat separator and the positive and negative electrodes 4 and 5 is formed.

Further, it is to be noted that like reference numerals are added to portions or members shown in FIGS. 13A, 13B and 13C corresponding to those in the first embodiment, and duplicated explanation is omitted herein.

Fifth Embodiment

A electrode assembly manufacturing apparatus according to the fifth embodiment will be explained hereunder with reference to FIGS. 14 to 17 for manufacturing the electrode assembly shown in FIG. 2.

Figure 14:
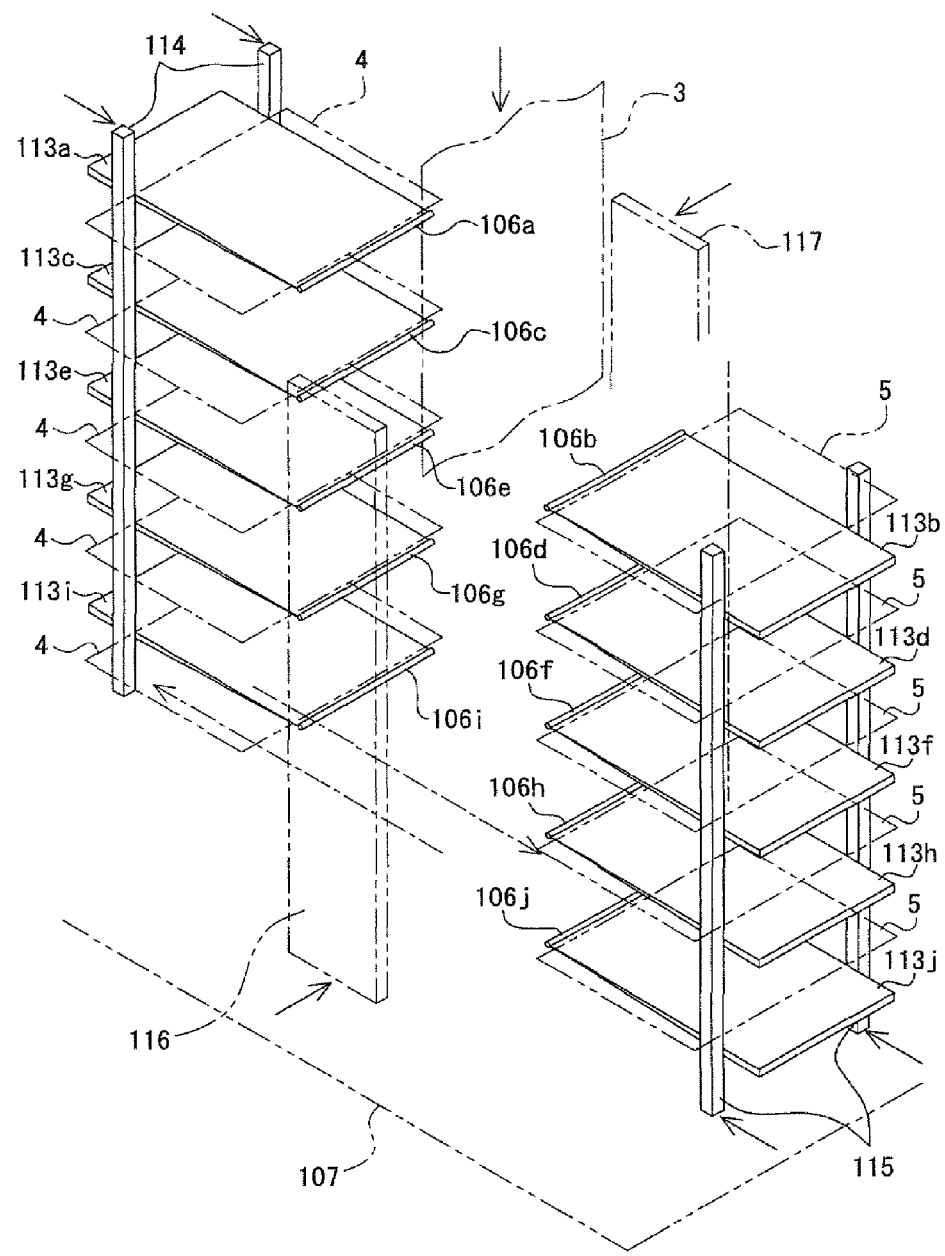
FIG. 14 is a schematic view showing an apparatus for carrying out a method according to a fifth embodiment of the present invention.

As shown in FIG. 14, the electrode assembly manufacturing apparatus of this embodiment is provided with: a plurality of guide plates 113a, 113b, 113c, 113d, 113e, 113f, 113g, 113h, 113i and 113j including two rows arranged in a perpendicular direction in the zigzag form, in which on the one row of the guide plates, the positive electrodes 4 are placed, and on the other row thereof, the negative electrodes 5 are placed, and when the continuous member 3 of the separator is inserted between these two rows, the continuous member 3 is moved and intersect horizontally to thereby fold the same into zigzag-shape; an electrode holding mechanism for holding the positive electrodes 4 and the negative electrodes 5 in the respective valley grooves 3a of the continuous member 3 when the guide plates 113a, 113b, 113c, 113d, 113e, 113f, 113g, 113h, 113i and 113j are withdrawn from the respective valley grooves 3a; and a pressing mechanism for pressing the continuous member 3 in the zigzag direction to make flat the continuous member 3 of the separator.

A plurality of guide plates 113a, 113b, 113c, 113d, 113e, 113f, 113g, 113h, 113i and 113j are prepared by the numbers same as or more than the numbers of the positive and negative electrodes 4 and 5 supplied to one row of the continuous member 3 of the separator. The guide plates are then arranged horizontally at respective two rows in the perpendicular direction on the base plate 107 so as to provide the zigzag shape between these rows.

As shown in FIG. 14 and FIGS. 15A to 15C, the guide plates 113a, 113b, 113c, 113d, 113e, 113f, 113g, 113h, 113i and 113j are formed to an inclining plate gently inclining toward the front ends of the intersecting side (intersecting side front ends, hereinlatter) by moving them horizontally between the rows.

Rotatable rollers 106a, 106b, 106c, 106d, 106e, 106f, 106g, 106h, 106i and 106j are mounted to the intersecting side front ends of the guide plates 113a, 113b, 113c, 113d, 113e, 113f, 113g, 113h, 113i and 113j so as to smoothly fold the continuous member 3 of the separator in the zigzag form. That is, each of these rollers 106a, 106b, 106c, 106d, 106e, 106f, 106g, 106h, 106i and 106j has a length substantially the same as the width of each of the guide plates 113a, 113b, 113c, 113d, 113e, 113f, 113g, 113h, 113i and 113j, and the both ends of each roller is mounted to be rotatable by a support arm, not shown, secured to a portion near the front end of the guide plate. Further, each of the respective rollers 106a, 106b, 106c, 106d, 106e, 106f, 106g, 106h, 106i and 106j may have a semi-cylindrical shape or may be non-rotatable round bar, not a cylindrical shape, as far as it can smoothly guide the continuous member 3 of the separator.

A number of ejecting ports, not shown, through which air is jetted toward the continuous member 3 when the continuous member 3 is folded into the zigzag form, may be formed as occasion demands to each of the respective rollers 106a, 106b, 106c, 106d, 106e, 106f, 106g, 106h, 106i and 106j of the guide plates 113a, 113b, 113c, 113d, 113e, 113f, 113g, 113h, 113i and 113j. The ejecting ports may be formed in a desired shape or arrangement such as circular shape or groove arrangement. When the air is jetted through these ports, the friction between the continuous member 3 and the guide plates 113a, 113b, 113c, 113d, 113e, 113f, 113g, 113h, 113*i* and 113*j* are reduced, and the zigzag folding of the continuous separator 3 can be further made smooth.

Furthermore, on the surfaces of the respective rollers 106*a*, 106*b*, 106*c*, 106*d*, 106*e*, 106*f*, 106*g*, 106*h*, 106*i* and 106*j*, friction reducing layers (films), not shown, may be formed as occasion demands. The friction reducing layer is formed by coating fluororesin. Accordingly, the friction between the respective rollers 106*a*, 106*b*, 106*c*, 106*d*, 106*e*, 106*f*, 106*g*, 106*h*, 106*i* and 106*j* and the continuous member 3 of the separator is reduced, and the zigzag folding of the continuous member 3 can be made smooth. Furthermore, on the surfaces of the guide plates 113*a*, 113*b*, 113*c*, 113*d*, 113*e*, 113*f*, 113*g*, 113*h*, 113*i* and 113*j*, such friction reducing layers may be also formed as occasion demands.

The guide plates 113*a*, 113*b*, 113*c*, 113*d*, 113*e*, 113*f*, 113*g*, 113*h*, 113*i* and 113*j* are provided with a driving unit for folding the continuous member of the separator into the zigzag form by intersecting the two rows of the guide plates when the continuous member 3 of the separator is inserted between the respective rows of the guide plates 113*a*, 113*b*, 113*c*, 113*d*, 113*e*, 113*f*, 113*g*, 113*h*, 113*i* and 113*j*. This guide unit is composed of a ball screw and a motor for rotating the ball screw, or piston cylinder assembly disposed between the frame, not shown, supporting the rows of the guide plates and the base plate 107. The drive unit composed of such ball screw and the motor, or the piston cylinder assembly is known means, so that the detailed structure thereof is not shown herein.

Figure 17A:
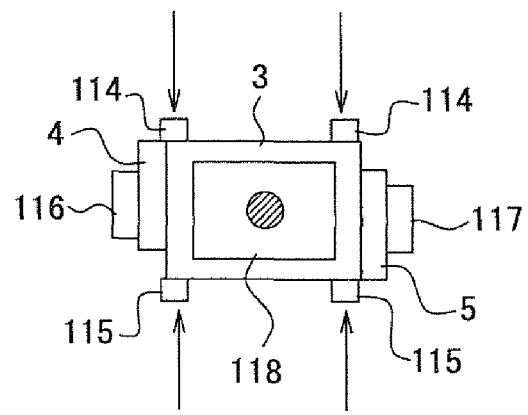
FIGS. 17A, 17B and 17C are plan, front and left-side side views, respectively, representing a third step in the method of the fifth embodiment of the present invention.
Figure 17B:
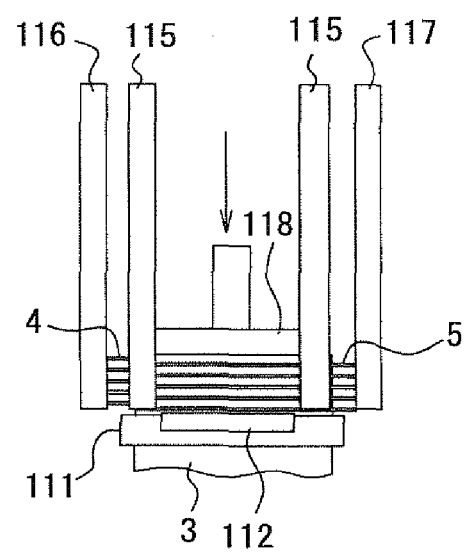
Figure 17C:
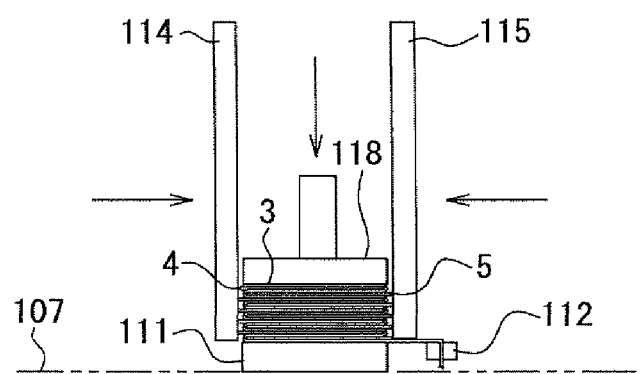

On the base plate 107, as shown in FIGS. 17B and 17C, a surface table 111 for receiving the zigzag folded continuous member 3 of the separator from the lower side thereof is mounted to be movable. Furthermore, as shown in FIGS. 15B and 15C, a clamp 112 for holding the base end of the continuous member 3 of the separator is also mounted at a portion near the surface table 111 so as not to interfere the surface table 111. A roll, not shown, around which the continuous member 3 of the separator is wound up is provided above the surface table 111. The roll has a structure so as not to be largely loaded in the wind-out direction of the continuous member 3 and so as to reduce tension caused to the continuous member 3 at a portion to be zigzag-folded.

The guide plates 113*a*, 113*b*, 113*c*, 113*d*, 113*e*, 113*f*, 113*g*, 113*h*, 113*i* and 113*j* serve to insert the positive electrodes 4 and the negative electrodes 5 alternately into the respective valley grooves 3*a* of the continuous member 3 of the separator while folding the separator into the zigzag form.

Figure 15A:
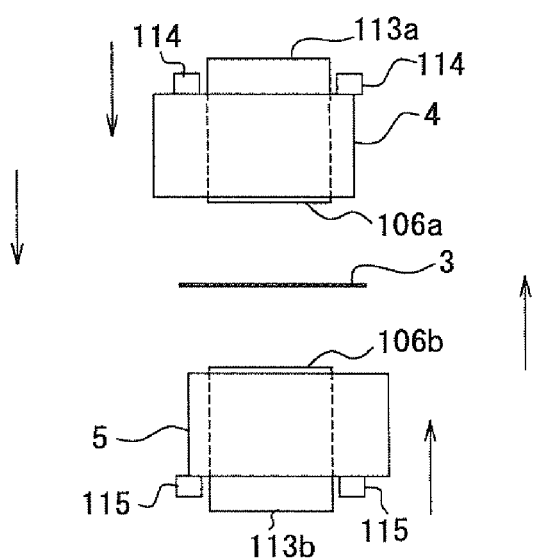
FIGS. 15A, 15B and 15C are plan, front and left-side side views, respectively, representing a first step in the method of the fifth embodiment of the present invention.
Figure 15B:
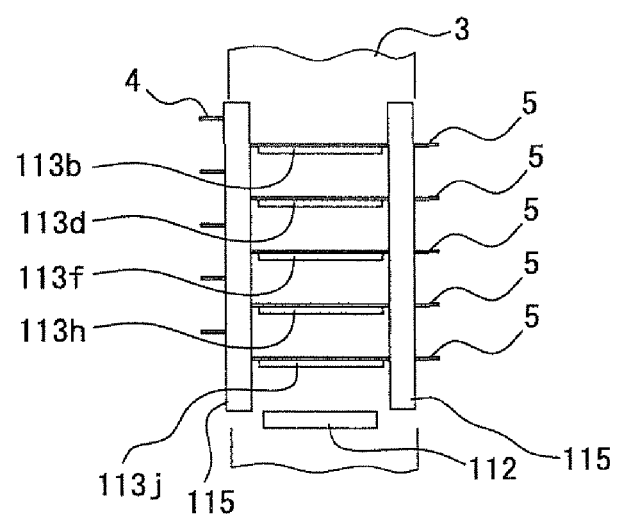
Figure 15C:
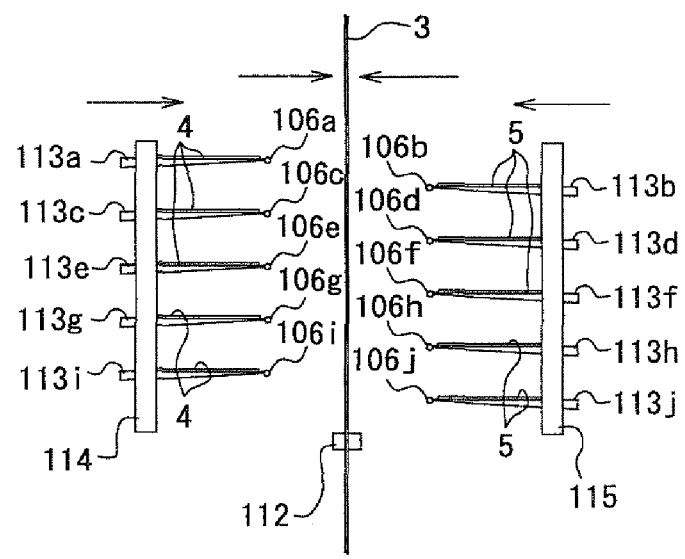
Figure 16A:
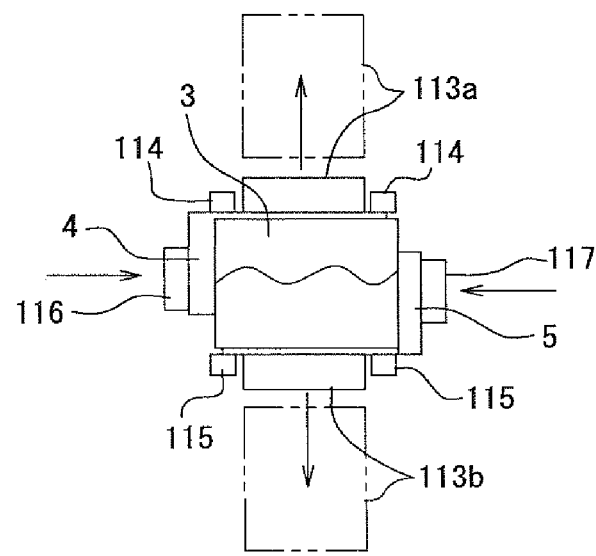
FIGS. 16A, 16B and 16C are plan, front and left-side side views, respectively, representing a second step in the method of the fifth embodiment of the present invention.
Figure 16B:
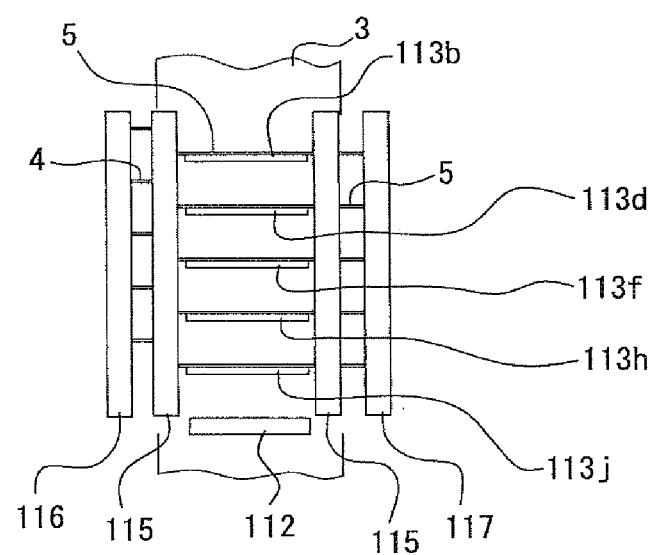
Figure 16C:
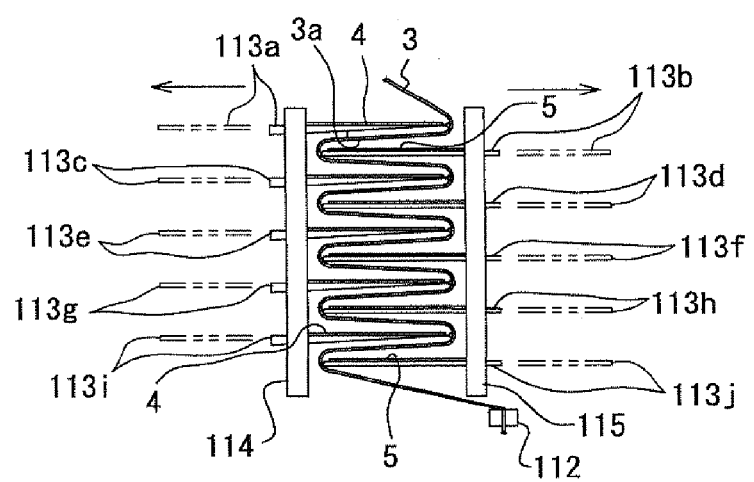

More specifically, as shown in FIG. 16C, the guide plates 113*a*, 113*b*, 113*c*, 113*d*, 113*e*, 113*f*, 113*g*, 113*h*, 113*i* and 113*j* are removed rearward from the valley grooves 3*a* of the continuous member 3 immediately after the insertion of the positive electrodes 4 and the negative electrodes 5 into the valley grooves 3*a*. At the time of the rearward removal of the guide plates 113*a*, 113*b*, 113*c*, 113*d*, 113*e*, 113*f*, 113*g*, 113*h*, 113*i* and 113*j*, in order that the positive and negative electrodes 4 and 5 remain in the valley grooves 3*a* of the continuous member 3 of the separator, as shown in FIGS. 14 to 16 (FIGS. 16A to 16C), pressing members 114, 114 and 115, 115 as electrode holding mechanism are arranged so as to sandwich the rows of the guide plate 113*a*, 113*b*, 113*c*, 113*d*, 113*e*, 113*f*, 113*g*, 113*h*, 113*i* and 113*j* from both the lateral sides thereof. These pressing members 114, 114 and 115, 115 are formed as vertical rods abutting against the rear edges of the positive and negative electrodes 4 and 5 run off (projected over) from the lateral sides of the guide plates 113*a*, 113*b*, 113*c*, 113*d*, 113*e*, 113*f*, 113*g*, 113*h*, 113*i* and 113*j*, and arranged laterally of the respective rows of the guide plates 113*a*, 113*b*, 113*c*, 113*d*, 113*e*, 113*f*, 113*g*, 113*h*, 113*i* and 113*j*. According to the arrangement in which the pressing members 114, 114 and 115, 115 are disposed rearward of the positive and negative electrodes 4 and 5 run off from both the lateral sides of the guide plates 113*a*, 113*b*, 113*c*, 113*d*, 113*e*, 113*f*, 113*g*, 113*h*, 113*i* and 113*j*, when the guide plates 113*a*, 113*b*, 113*c*, 113*d*, 113*e*, 113*f*, 113*g*, 113*h*, 113*i* and 113*j* are removed rearward from the valley grooves 3*a* of the continuous member 3 of the separator, the positive and negative electrodes 4 and 5 remain in the respective valley grooves 3*a* on the separator side. The pressing members 114, 114 and 115, 115 are connected to the base plate 107 through the ball screw and the motor for rotating the ball screw, or the piston cylinder assembly, not shown, and when the guide plates 113*a*, 113*b*, 113*c*, 113*d*, 113*e*, 113*f*, 113*g*, 113*h*, 113*i* and 113*j* advance into the valley grooves 3*a* of the continuous member 3 of the separator, the pressing members 114, 114 and 115, 115 also advance by the operation of the piston cylinder assembly or the combination of the ball screw and the motor for rotating the ball screw, and retains at that position after the rearward movement of the guide plates 113*a*, 113*b*, 113*c*, 113*d*, 113*e*, 113*f*, 113*g*, 113*h*, 113*i* and 113*j* outside the valley grooves 3*a* of the continuous member 3 of the separator.

As shown in FIG. 14 and FIGS. 16A and 16B, stoppers 116 and 117 for pressing the positive electrodes 4 and the negative electrodes 5 inserted into the respective valley grooves 3*a* of the continuous member of the separator in the width direction of the guide plates 113*a*, 113*b*, 113*c*, 113*d*, 113*e*, 113*f*, 113*g*, 113*h*, 113*i* and 113*j* are provided, as occasion demands, on both sides in the width direction of the guide plates 113*a*, 113*b*, 113*c*, 113*d*, 113*e*, 113*f*, 113*g*, 113*h*, 113*i* and 113*j*. The respective stoppers 116 and 117 are formed to be reciprocally movable with respect to the width direction of the guide plates 113*a*, 113*b*, 113*c*, 113*d*, 113*e*, 113*f*, 113*g*, 113*h*, 113*i* and 113*j* by the piston cylinder assembly, not shown. One of the stoppers 116 is inserted into the respective valley grooves 3*a* of the continuous member 3 of the separator by one of rows of the guide plates 113*a*, 113*c*, 113*e*, 113*g* and 113*i* and abuts against all the positive electrodes 4 run off from the side edge of the separator, and the other one of the stoppers 117 is inserted into the respective valley grooves 3*a* of the continuous member 3 of the separator by the other one of rows of the guide plates 113*b*, 113*d*, 113*f*, 113*h* and 113*j* and abuts against all the negative electrodes 5 run off from the opposing side edge of the separator. The positive electrodes 4 and the negative electrodes 5 inserted into the respective valley grooves 3*a* of the continuous member 3 of the separator are accurately positioned in the width direction of the guide plates 113*a*, 113*b*, 113*c*, 113*d*, 113*e*, 113*f*, 113*g*, 113*h*, 113*i* and 113*j*.

The guide plates 113*a*, 113*b*, 113*c*, 113*d*, 113*e*, 113*f*, 113*g*, 113*h*, 113*i* and 113*j* may be withdrawn from the respective valley grooves 3*a* of the continuous member 3 of the separator, as shown in FIGS. 16A to 16C, by the guide plate withdrawing mechanism. The guide plate withdrawing mechanism is composed of, for example, a piston cylinder assembly, though not shown, (or ball screw and motor for rotating the ball screw). This piston cylinder assembly is interposed between the base plate 107 and the vertical frame, not shown, of the 113*a*, 113*b*, 113*c*, 113*d*, 113*e*, 113*f*, 113*g*, 113*h*, 113*i* and 113*j*, and according to the expansion/contraction motion of the piston cylinder assembly, the guide plates 113*a*, 113*b*, 113*c*, 113*d*, 113*e*, 113*f*, 113*g*, 113*h*, 113*i* and 113*j* are removed outside the valley grooves 3*a* of the separator, as shown in FIG. 16A to 16C, or returned to the positions shown in FIG. 14 or FIGS. 15A to 15C.

The pressing members 114, 114 and 115, 115 are connected to the base plate 107 though the combination of ball screw and motor for rotating the ball screw, or piston cylinder assembly, not shown, as mentioned above. After the withdrawn of the guide plates 113a, 113b, 113c, 113d, 113e, 113f, 113g, 113h, 113i and 113j from the inside of the valley grooves 3a of the continuous member 3 of the separator folded into zigzag shape, the pressing members 114, 114 and 115, 115 further advance as shown in FIGS. 16A to 16C by the operation of the ball screw and the motor for rotating the ball screw, or the piston cylinder assembly to thereby further deeply insert the positive electrodes 4 and the negative electrodes 5 into the respective valley grooves 3a of the separator 3.

As shown in FIGS. 17A to 17C, the pressing mechanism is formed as a pusher 118 capable of being movable in the perpendicular direction on the base plate 107. The pusher 118 serves to press and make flat the continuous member 3 of the separator in the zigzag direction at the time when the pressing members 114, 114 and 115, 115 further advance on the side of the guide plates 113a, 113b, 113c, 113d, 113e, 113f, 113g, 113h, 113i and 113j, and the positive electrodes 4 and the negative electrodes 5 are pushed further deeply into the respective valley grooves 3a. According to such operation, the separator is made flat to the extent of the thickness of the electrode assembly 2 shown in FIG. 2 in which the positive and negative electrodes 4 and 5 are sandwiched between the continuous member 3 of the separator.

Further, as shown in FIGS. 17A to 17C, the continuous member 3 may be pushed at a small force in the zigzag direction at the time when the guide plates 113a, 113b, 113c, 113d, 113e, 113f, 113g, 113h, 113i and 113j are withdrawn from the inside of the valley grooves 3a of the separator 3. According to such operation, the continuous member 3 bent in the zigzag form may be destroyed at the time of withdrawing the 113a, 113b, 113c, 113d, 113e, 113f, 113g, 113h, 113i and 113j.

The electrode assembly 2 mentioned above will be manufactured by the manufacturing apparatus of the structure mentioned above according to the following procedure.

(1) As shown in FIG. 14 and FIGS. 15A to 15C, the continuous member 3 of the separator is inserted between the one and other rows of the guide plates 113a, 113b, 113c, 113d, 113e, 113f, 113g, 113h, 113i and 113j arranged in the zigzag form, and the front end of this continuous member 3 is held by the clamp 112. The continuous member 3 is paid out from the roll on which the continuous member 3 has been wound up, and stretched between the upper and lower guide plates 113a and 113j at a small tension.

(2) Then, the rows of the guide plates 113a, 113b, 113c, 113d, 113e, 113f, 113g, 113h, 113i and 113j are moved in the horizontal direction as shown with arrows in FIGS. 15A to 15C, and as shown in FIGS. 16A to 16C, the rows of the guide plates 113a, 113b, 113c, 113d, 113e, 113f, 113g, 113h, 113i and 113j intersect with each other. Accordingly, while folding the continuous member 3 of the separator into zigzag form, the valley grooves 3a of the number necessary for one electrode assembly 2 are simultaneously formed to the continuous member 3 of the separator, and hence, the takt time necessary for the manufacture of the electrode assembly 2 can be remarkably reduced. Furthermore, since the separator is folded into zigzag form by intersecting the respective rows of the guide plates 113a, 113b, 113c, 113d, 113e, 113f, 113g, 113h, 113i and 113j, the deep valley grooves 3a can be formed, which allows the large positive and negative electrodes 4 and 5 to be inserted thereinto, and the electrode assembly 2 having large electric capacity can be manufactured.

Furthermore, since the rotatable rollers 106a, 106b, 106c, 106d, 106e, 106f, 106g, 106h, 106i and 106j are mounted to the intersecting side front ends of the guide plates 113a, 113b, 113c, 113d, 113e, 113f, 113g, 113h, 113i and 113j, respectively, the tension of the separator can be relaxed and the separator can be smoothly folded into zigzag form.

Furthermore, at the time when the rows of the guide plates 113a, 113b, 113c, 113d, 113e, 113f, 113g, 113h, 113i and 113j intersect with each other, air is jetted through the ejecting ports formed in the surface of the rollers 106a, 106b, 106c, 106d, 106e, 106f, 106g, 106h, 106i and 106j toward the continuous member 3 of the separator. According to this operation, at the time of folding the continuous member 3 of the separator into zigzag form, the friction between the continuous member 3 of the separator and the guide plates 113a, 113b, 113c, 113d, 113e, 113f, 113g, 113h, 113i and 113j is reduced, the time required for folding the separator into zigzag form can be shortened, and the continuous member 3 can be properly prevented from being broken.

(3) When the rows of the guide plates 113a, 113b, 113c, 113d, 113e, 113f, 113g, 113h, 113i and 113j are moved in the horizontal direction as shown with arrows in FIGS. 15A and 15C, the positive electrodes 4 are preliminarily placed on one of the rows of the guide plates 113a, 113c, 113e, 113g and 113i and on the other hand, the negative electrodes 5 are also preliminarily placed on the other one of the rows of the guide plates 113b, 113d, 113f, 113h and 113j. Accordingly, as shown in FIGS. 16A to 16C, the positive electrodes 4 and the negative electrodes 5 are alternately inserted into the valley grooves 3a of the continuous member 3 of the separator, which is folded into zigzag form.

As mentioned above, the zigzag-folding of the continuous member 3 of the separator and the insertion of the positive and negative electrodes 4 and 5 can be simultaneously performed by alternately inserting the positive electrodes 4 and the negative electrodes 5 in the respective valley grooves 3a while folding the continuous member 3 in the zigzag form by intersecting the respective rows of the guide plates 113a, 113b, 113c, 113d, 113e, 113f, 113g, 113h, 113i and 113j with each other, thus simplifying the structure of the apparatus and shortening the takt time.

As shown in FIGS. 16A to 16C, the pressing members 114, 114 and 115, 115 advance on the separator side and stop there in the state of contacting to the rear edges of the positive and negative electrodes 4 and 5 placed on the guide plates 113a, 113b, 113c, 113d, 113e, 113f, 113g, 113h, 113i and 113j.

(4) Next, as shown with two-dot-chain line in FIG. 16C, the guide plates 113a, 113b, 113c, 113d, 113e, 113f, 113g, 113h, 113i and 113j return back to the original position immediately after the insertion of the positive and negative electrodes 4 and 5 into the valley grooves 3a of the separator. Herein, since the guide plates 113a, 113b, 113c, 113d, 113e, 113f, 113g, 113h, 113i and 113j are formed to an inclining plate inclining to the front end on the intersecting side thereof, the guide plates 113a, 113b, 113c, 113d, 113e, 113f, 113g, 113h, 113i and 113j can be easily inserted into and withdrawn from the respective valley grooves 3a of the separator, thus reducing the time necessary for folding the continuous member 3 of the separator.

The pressing members 114, 114 and 115, 115 stop at the advancing position and maintain the condition abutting against the rear edges of the positive and negative electrodes 4 and 5. Accordingly, the positive and negative electrodes 4 and 5 are pushed out from the upper portion of the guide plates 113a, 113b, 113c, 113d, 113e, 113f, 113g, 113h, 113i and 113j at the retiring time of the guide plates 113a, 113b, 113c, 113d, 113e, 113f, 113g, 113h, 113i and 113j. Thus, at this time, the guide plates are retired in an empty state, and the positive and negative electrodes 4 and 5 remain in the valley grooves 3a of the separator.

(5) As shown in FIGS. 16A to 16C, when the guide plates 113a, 113b, 113c, 113d, 113e, 113f, 113g, 113h, 113i and 113j, on which the positive and negative electrodes 4 and 5 are placed, invade into the valley grooves 3a of the separator, the respective stoppers 116 and 117 advance toward the width direction of the guide plates 113a, 113b, 113c, 113d, 113e, 113f, 113g, 113h, 113i and 113j. Then, one of the stoppers 116 is inserted into the respective valley grooves 3a of the separator by one row of the guide plates 113a, 113c, 113e, 113g and 113i and abut against the side edges of all the positive electrodes 4 projecting over the side edge of the separator. On the other hand, the other one of the stoppers 117 is inserted into the respective valley grooves 3a of the separator by the other one row of the guide plates 113b, 113d, 113f, 113h and 113j, and abut against the side edges of all the negative electrodes 5 projecting over the opposing side edge of the separator. According to such operation, the positive electrodes 4 and the negative electrodes 5 inserted into the respective valley grooves 3a of the continuous member 3 of the separator can be accurately positioned in the width direction of the guide plates 113a, 113b, 113c, 113d, 113e, 113f, 113g, 113h, 113i and 113j.

(6) Furthermore, as shown in FIGS. 16A to 16C, the guide plates 113a, 113b, 113c, 113d, 113e, 113f, 113g, 113h, 113i and 113j are withdrawn from the respective valley grooves 3a of the zigzag-shaped continuous member 3 of the separator. At this time, the continuous member 3 is lightly pushed in the zigzag direction by the pusher 118, thereby preventing the continuous member 3 of the separator from destroying in shape at the time of the withdrawal of the guide plates 113a, 113b, 113c, 113d, 113e, 113f, 113g, 113h, 113i and 113j.

(7) Still furthermore, as shown in FIGS. 16A to 16C, the pressing members 114, 114 and 115, 115 slightly advance on the separator side, and the positive and negative electrodes 4 and 5 are pushed further deeply into the respective valley grooves 3a of the separator. Then, the positive and negative electrodes 4 and 5 are moved to the positions in the valley grooves 3a of the separator at which the guide plates 113a, 113b, 113c, 113d, 113e, 113f, 113g, 113h, 113i and 113j existed, and an overlapped area of the positive electrodes 4 and the negative electrodes 5 increases. Thus, the electric capacity can be increased, and the performance as battery can be improved. The separator can be more effectively used.

The step of pushing the positive and negative electrodes 4 and 5 further deeply into the respective valley grooves 3a may be carried out after the withdrawal of the guide plates 113a, 113b, 113c, 113d, 113e, 113f, 113g, 113h, 113i and 113j from the respective valley grooves 3a of the zigzag-shaped continuous member 3 of the separator.

(8) As shown in FIGS. 17A to 17C, the pusher 118 strongly pushes the continuous member 3 in the zigzag direction in synchronism with the advancing of the pressing members 114, 114, and 115, 115. According to this motion, the zigzag-shaped bent portion of the separator is folded and further made flat, and this flat separator and the positive and negative electrodes 4 and 5 are overlapped to thereby provide a flat lamination structure.

(9) The front end of the separator is released from the clamp 112, and the rear end thereof is cut off so as to separate from the separator, thus completing the electrode assembly 2 shown in FIG. 2, which is accommodated in the battery case 1 as shown in FIG. 1.

Sixth Embodiment

This sixth embodiment explains the manufacture of the electrode assembly 22 shown in FIG. 9.

Figure 18:
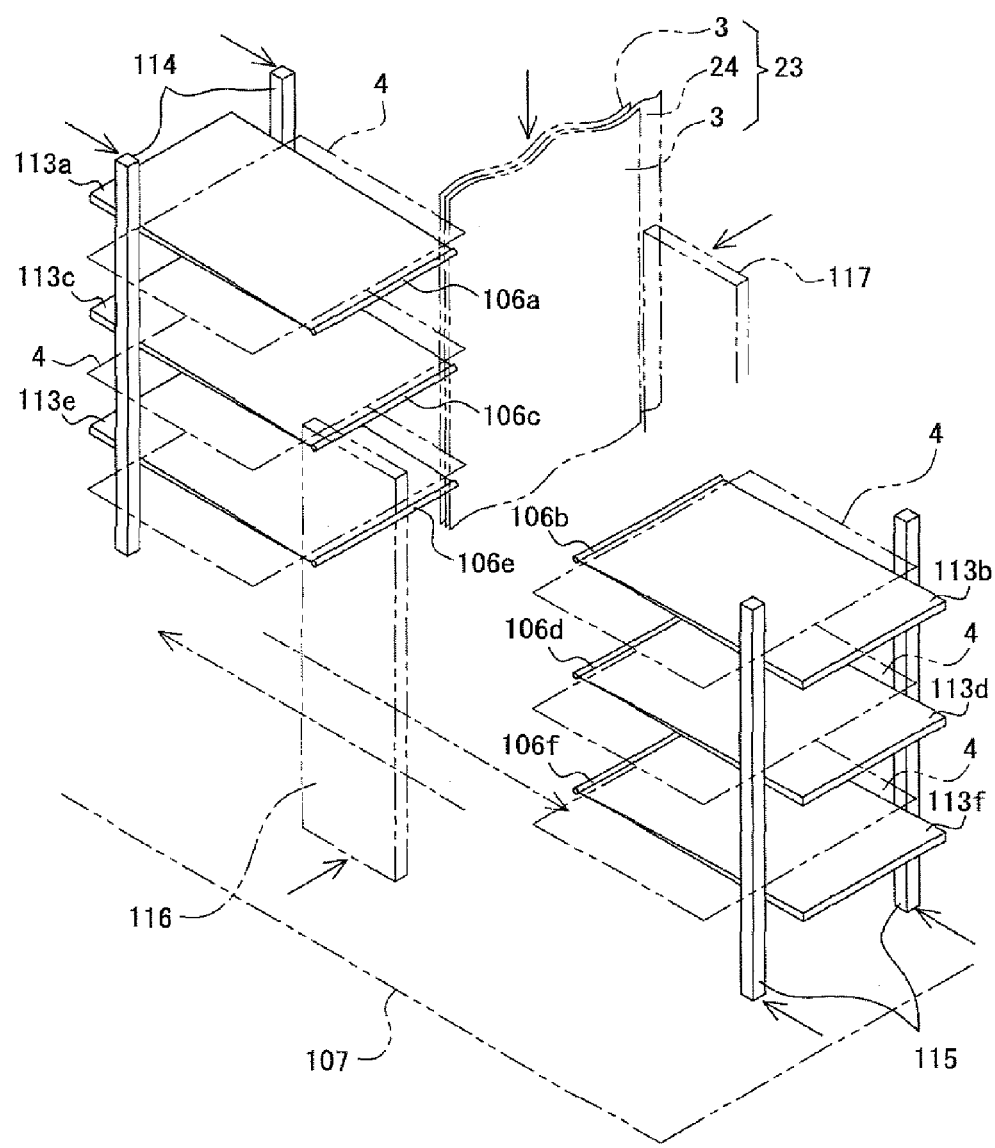
FIG. 18 is a schematic view showing an apparatus for carrying out a method according to a sixth embodiment of the present invention.

As shown in FIG. 18, an apparatus for manufacturing the electrode assembly 22 is similar to that of the fifth embodiment having a plurality of guide plates 113a, 113b, 113c, 113d, 113e and 113f arranged in the zigzag form and other structures, but between one and the other one rows of the guide plates 113a, 113b, 113c, 113d, 113e and 113f, a continuous laminated member 23 is inserted. Further, all the guide plates 113a, 113b, 113c, 113d, 113e and 113f serve to convey only the positive electrodes 4 into the valley grooves 23a of the laminated member 23. Except the above structures, the electrode assembly 22 may be manufactured by the apparatus and method similar to those mentioned with respect to the fifth embodiment.

In this sixth embodiment, since the valley groove 23a for inserting only the positive electrodes 4 into the laminated member 23 may be formed, when it is required to manufacture the electrode assembly 22 of the same performance as that of the electrode assembly 2 of the fifth embodiment, the folding number of the laminated member 23 can be reduced half, and accordingly, the number of the guide plates 113a, 113b, 113c, 113d, 113e and 113f can be also made half, thus further reducing the takt time.

The description of the structures and functions of the sixth embodiment substantially the same as those of the fifth embodiment may be omitted herein.

Seventh Embodiment

This seventh embodiment explains an apparatus for manufacturing the electrode assembly 2 shown in FIG. 2 with reference to FIGS. 19 to 25.

Figure 19:
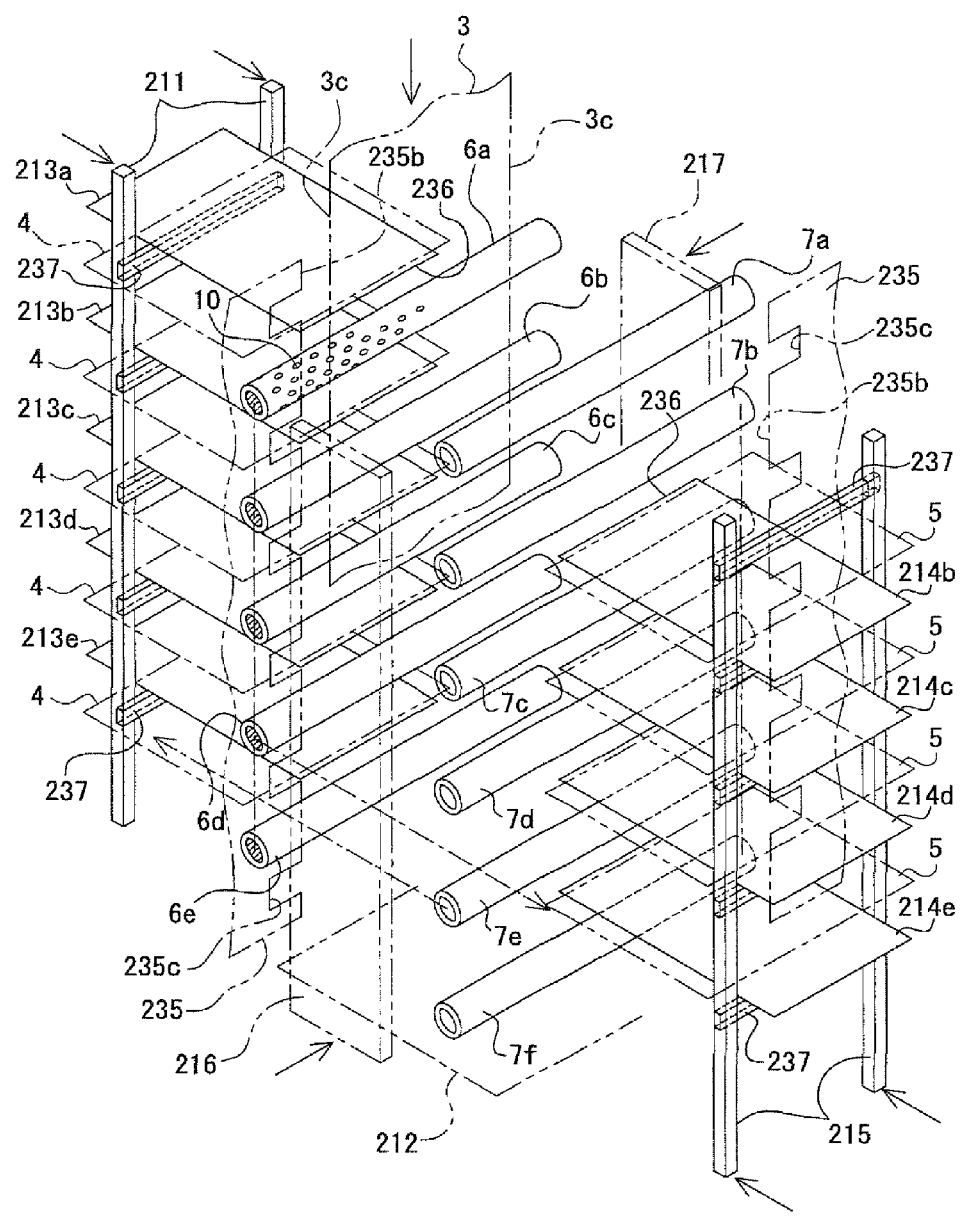
FIG. 19 is a schematic view showing an apparatus for carrying out a method according to a seventh embodiment of the present invention.

As shown in FIG. 19, the apparatus for manufacturing the electrode assembly 2 is provided with a surface table 212 on a base plate, not shown. The surface table 212 is, as shown in FIGS. 21B and 21C, placed below the continuous member 3 of the separator which is folded into zigzag form. Further, as shown in FIGS. 20B and 20C, a clamp 212a clamping the base end of the continuous member 3 of the separator is disposed at a portion near the one side of the surface table 212 so as not to interfere with the surface table 212. Above the surface table 212, as shown in FIG. 20C, there is disposed a roll 3b around which the continuous member 3 of the separator is wound up. The roll 3 is disposed so as not to be loaded in the wind-off direction of the continuous member 3 and so as to reduce a tension caused to a portion of the continuous member to be zigzag-folded. Furthermore, a cutter 233 is arranged on a travelling path of the continuous member 3 of the separator so as to cut the separator continuous member 3 wound-off from the roll 3b at a predetermined portion.

As shown in FIG. 19, the apparatus for manufacturing the electrode assembly 2 is provided with: a zigzag folding mechanism for folding the continuous member 3 of the separator by intersecting the rows of these guide rods in the horizontal direction at a time when the continuous member 3 of the separator is inserted between the one and the other one rows of the guide rods 6a, 6b, 6c, 6d, 6e and 7a, 7b, 7c, 7d, 7e, 7f, the zigzag folding mechanism is provided with a plurality of guide rods 6a, 6b, 6c, 6d, 6e and 7a, 7b, 7c, 7d, 7e, 7f arranged in the zigzag form in the perpendicular direction; an electrode insertion mechanism for alternately inserting the positive and negative electrodes 4 and 5 into the respective valley grooves 3a of the separator (see FIG. 2) at the time when the continuous member 3 of the separator is folded into the zigzag form; a guide rod withdrawing mechanism for withdrawing the guide rods 6a, 6b, 6c, 6d, 6e and 7a, 7b, 7c, 7d, 7e, 7f from the respective valley grooves 3a of the separator; a side edge pressing mechanism for pressing the side edges 3c, 3c of the continuous member 3 of the separator in the front end direction of the guide rods 6a, 6b, 6c, 6d, 6e and 7a, 7b, 7e, 7d, 7e, 7f till the time of withdrawing the guide rods 6a, 6b, 6c, 6d, 6e and 7a, 7b, 7c, 7d, 7e, 7f from the time of folding the continuous member 3 of the separator; a folding line forming mechanism for forming folding lines 234 (see FIG. 23C) to the bottom portions of the valley grooves 3a of the separator continuous member 3 after the withdrawal of the guide rods 6a, 6b, 6c, 6d, 6e and 7a, 7b, 7c, 7d, 7e, 7f; and a press mechanism for pressing the continuous member 3 of the separator with the folded lines 234 into the zigzag direction so as to make flat the continuous member 3.

The number of the guide rods 6a, 6b, 6c, 6d, 6e and 7a, 7b, 7c, 7d, 7e, 7f of the zigzag folding mechanism is the same as or more than the number of the positive and negative electrodes 4 and 5 supplied with respect to one continuous member 3 of the separator, and these guide rods are arranged in two rows in the perpendicular direction on the upper side of the surface table 212 in a zigzag arrangement.

Figure 20A:
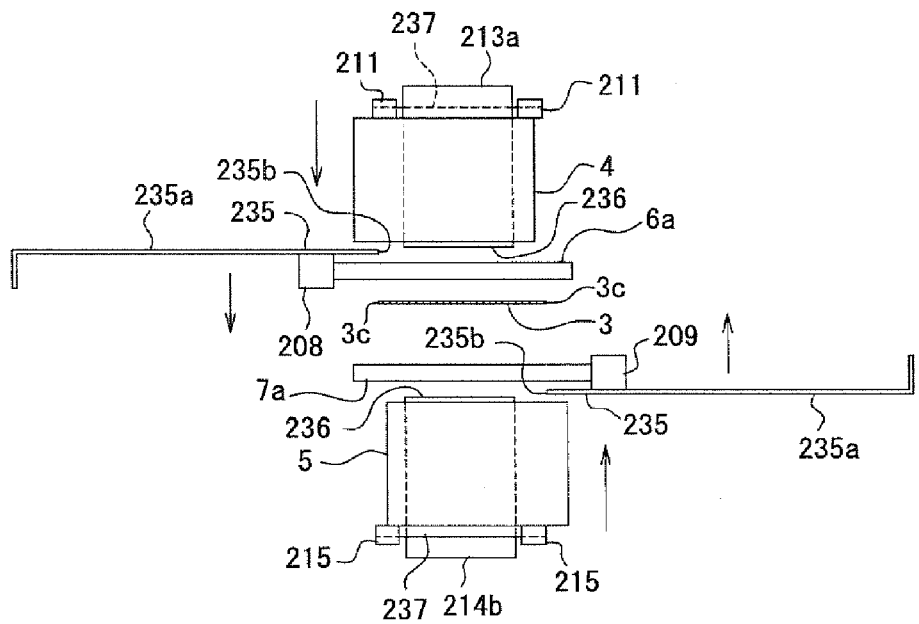
FIGS. 20A, 20B and 20C are plan, front and left-side side views, respectively, representing a first step in the method of the seventh embodiment of the present invention.
Figure 20B:
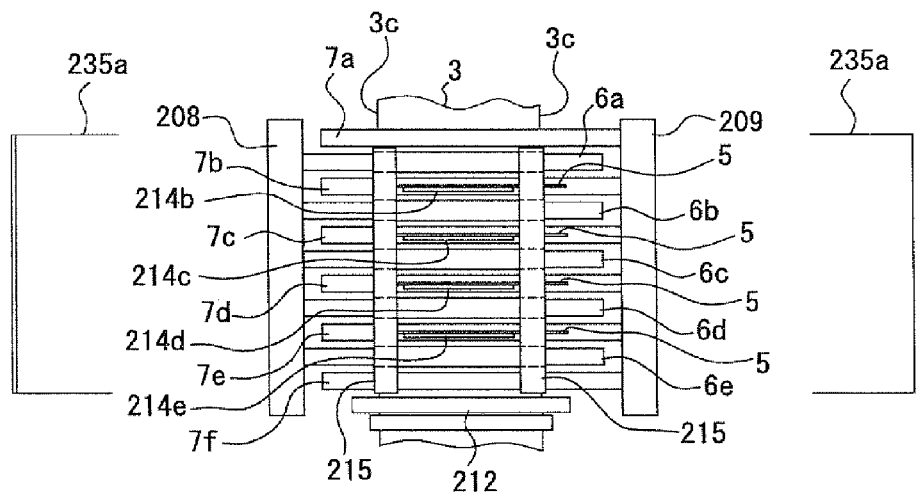
Figure 20C:
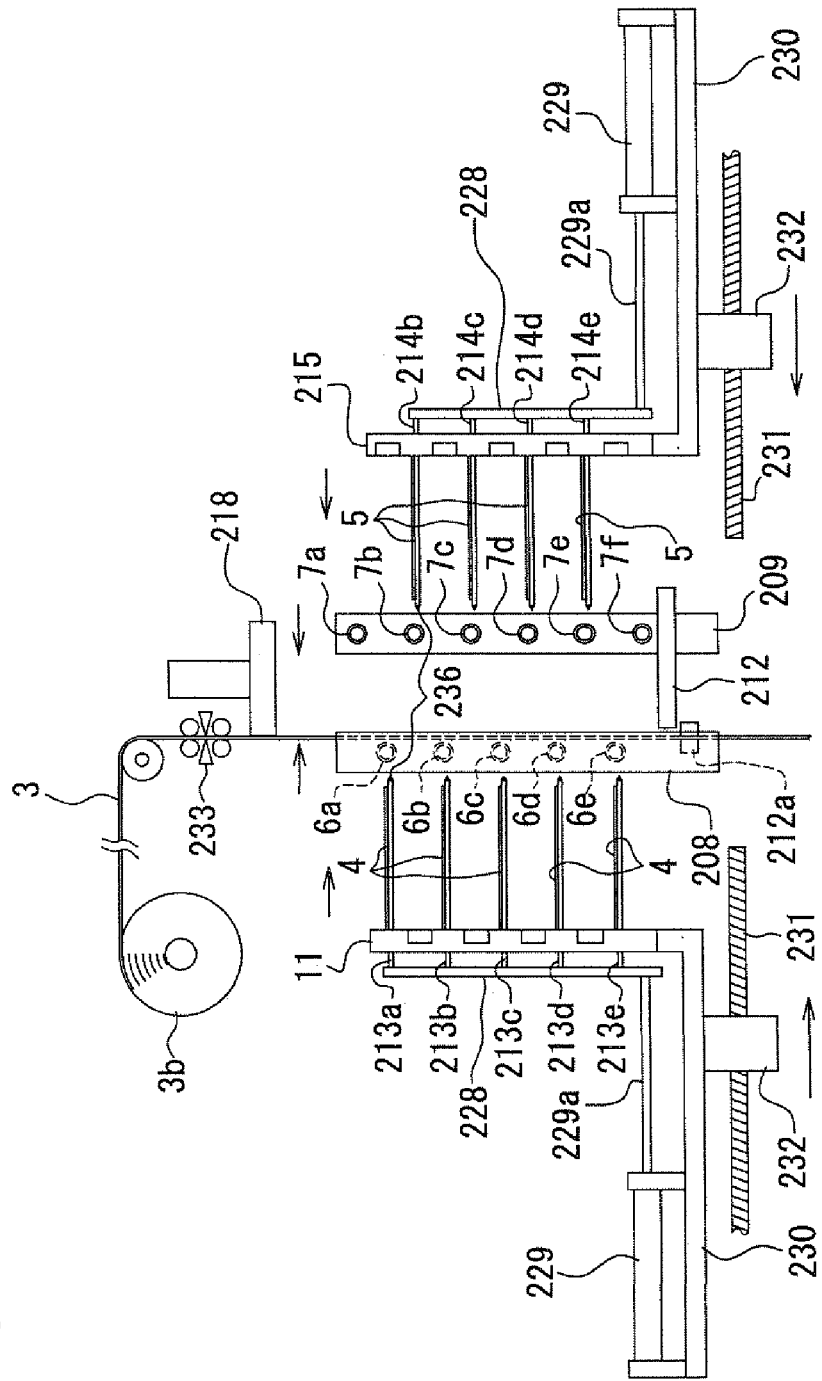

As shown in FIGS. 20A to 20C, the guide rods 6a, 6b, 6c, 6d, 6e and 7a, 7b, 7c, 7d, 7e, 7f are supported in a cantilever manner to the vertical frames 208 and 209 for the respective rows of the guide rods.

The guide rods 6a, 6b, 6c, 6d, 6e and 7a, 7b, 7c, 7d, 7e, 7f may be formed as rotatable rollers so as to smoothly fold the continuous member 3 of the separator into the zigzag form. Of course, each of the guide rods 6a, 6b, 6c, 6d, 6e and 7a, 7b, 7c, 7d, 7e, 7f may have semi-cylindrical shape (not a cylindrical shape) or round-rod shape which is not rotated, as far as the guide rods 6a, 6b, 6c, 6d, 6e and 7a, 7b, 7c, 7d, 7e, 7f can smoothly guide the continuous member 3 of the separator.

A number of fine nozzles 10 for jetting air toward the continuous member 3 of the separator when the continuous member 3 is folded into the zigzag form are formed, as occasion demands, to the guide rods 6a, 6b, 6c, 6d, 6e and 7a, 7b, 7c, 7d, 7e, 7f. Each of the nozzles 10 has a desired shape such as circular shape, groove shape or like, and a number of such nozzles are formed in a desired arrangement. When the air jetted through the fine nozzles 10, the friction between the continuous member 3 of the separator and the guide rods 6a, 6b, 6c, 6d, 6e and 7a, 7b, 7c, 7d, 7e, 7f is reduced, and the zigzag-folding of the continuous member 3 can be further smoothly performed.

Furthermore, a friction reducing layer, not shown, is formed, as occasion demands, on the surface of the guide rods 6a, 6b, 6c, 6d, 6e and 7a, 7b, 7c, 7d, 7e, 7f. The friction reducing layer is formed by coating fluororesin or like. According to this coating of the friction reducing layer, the friction between the guide rods 6a, 6b, 6c, 6d, 6e and 7a, 7b, 7c, 7d, 7e, 7f and the continuous member 3 of the separator can be reduced, and the zigzag-folding of the continuous member 3 can be smoothly made.

The zigzag-folding mechanism is provided with a driving member for zigzag-folding the continuous member 3 of the separator by intersecting the respective rows of the guide rods 6a, 6b, 6c, 6d, 6e and 7a, 7b, 7c, 7d, 7e, 7f when the continuous member 3 of the separator is inserted into one and the other one of rows of the guide rods 6a, 6b, 6c, 6d, 6e and 7a, 7b, 7c, 7d, 7e, 7f. This driving member is composed of a ball screw interposed between the vertical frames 208 and 209 supporting the respective rows of the guide rods 6a, 6b, 6c, 6d, 6e and 7a, 7b, 7c, 7d, 7e, 7f and the base plate, not shown, of the manufacturing apparatus and a motor for rotating the ball screw. Such driving member is a known feed member, so that the details thereof are not shown herein.

The side edge pressing mechanism is provided, as shown in FIGS. 19, 20A, 20B, 21A, 21B, 22A and 22B, with plate-shaped pressing members 235, 235 for pressing the side edges 3c, 3c of the continuous member 3 of the separator toward the front end direction of the guide rods 6a, 6b, 6c, 6d, 6e and 7a, 7b, 7c, 7d, 7e, 7f till the time of withdrawing the guide rods 6a, 6b, 6c, 6d, 6e and 7a, 7b, 7c, 7d, 7e, 7f from the valley grooves 3a of the zigzag-shaped continuous member 3 of the separator from the time of zigzag-folding the continuous member 3 by intersecting the rows of the guide rods 6a, 6b, 6c, 6d, 6e and 7a, 7b, 7c, 7d, 7e, 7f with each other.

Each of the pressing members 235, 235 is disposed for each of the rows of the guide rods 6a, 6b, 6c, 6d, 6e and 7a, 7b, 7c, 7d, 7e, 7f, and the pressing members 235, 235 are connected to the vertical frames 8, 9, respectively, through holding members 235a, 235a integral with the pressing members 235, 235, respectively, so as to be moved integrally with the respective rows of the guide rods 6a, 6b, 6c, 6d, 6e and 7a, 7b, 7c, 7d, 7e, 7f at the time when the rows of the guide rods 6a, 6b, 6c, 6d, 6e and 7a, 7b, 7c, 7d, 7e, 7f intersect with each other.

Figure 22A:
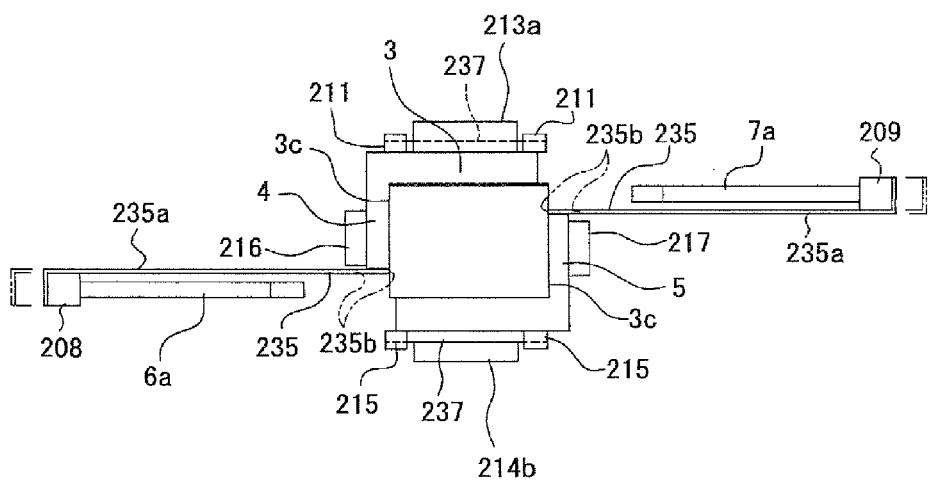
FIGS. 22A, 22B and 22C are plan, front and left-side side views, respectively, representing a third step in the method of the seventh embodiment of the present invention.
Figure 22B:
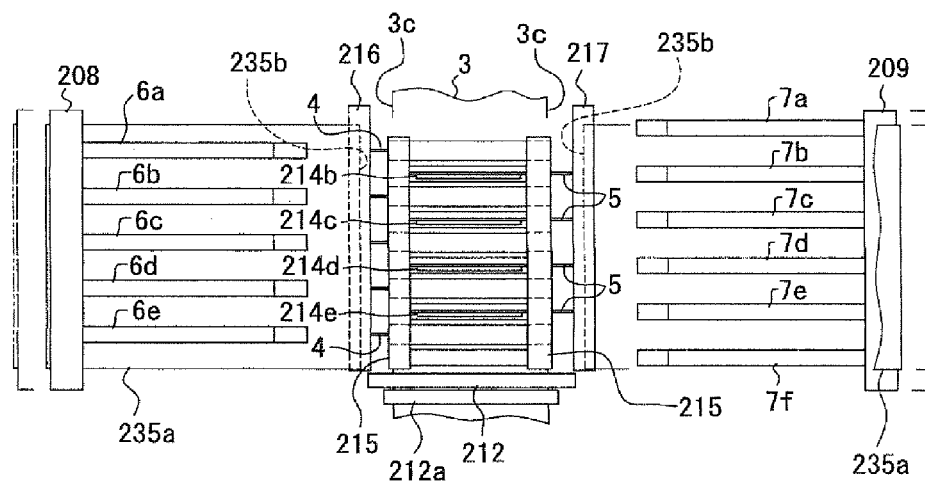

Furthermore, the holding members 235a, 235a of the respective pressing members 235, 235 are connected, as shown in FIGS. 22A and 22B, to the vertical frames 8, 9 to be slidable in the axial direction of the guide rods 6a, 6b, 6c, 6d, 6e and 7a, 7b, 7c, 7d, 7e, 7f, and supported to the base plate of the manufacturing apparatus to be slidable between the solid line position and two-dot-chain line position as shown in FIGS. 22a and 22B.

Springs are disposed as elastic member, not shown, between the respective holding members 235a, 235a and the base plate, and according to the location of these springs, the pressing members 235, 235 and the holding members 235a, 235a are always urged to the solid line position.

Figure 21A:
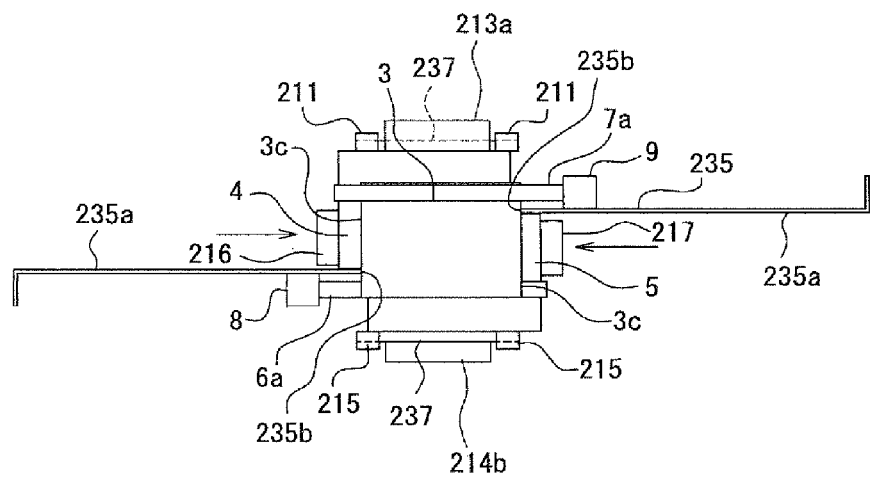
FIGS. 21A, 21B and 21C are plan, front and left-side side views, respectively, representing a second step in the method of the seventh embodiment of the present invention.
Figure 21B:
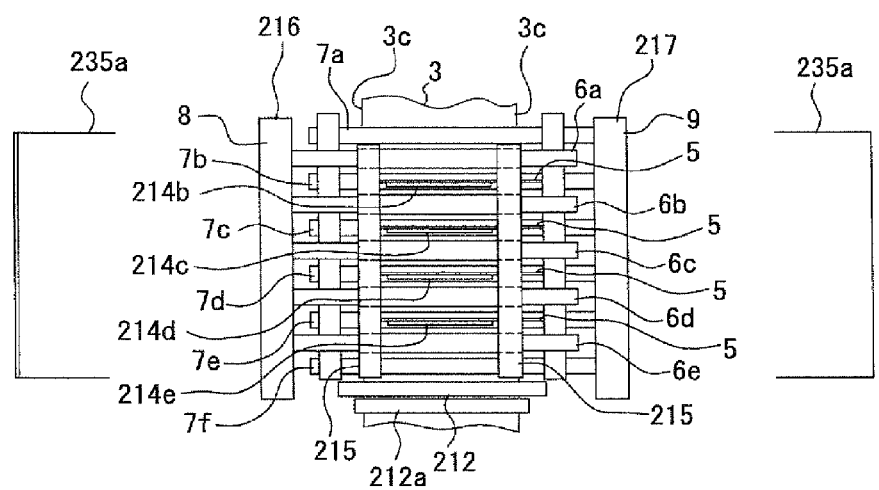
Figure 21C:
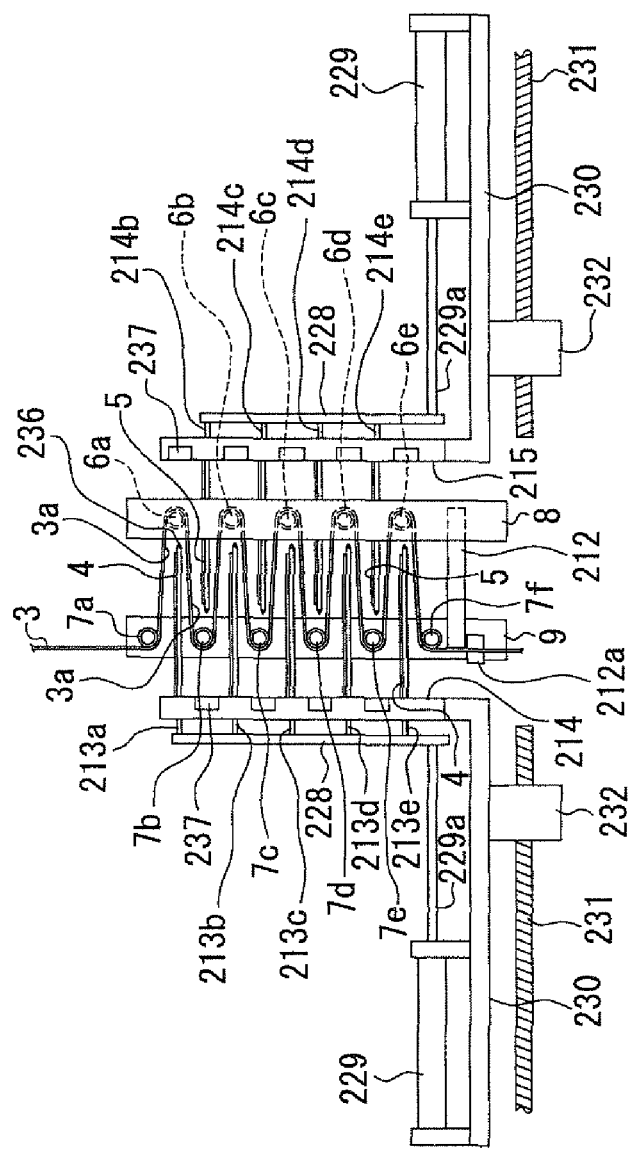
Figure 22C:
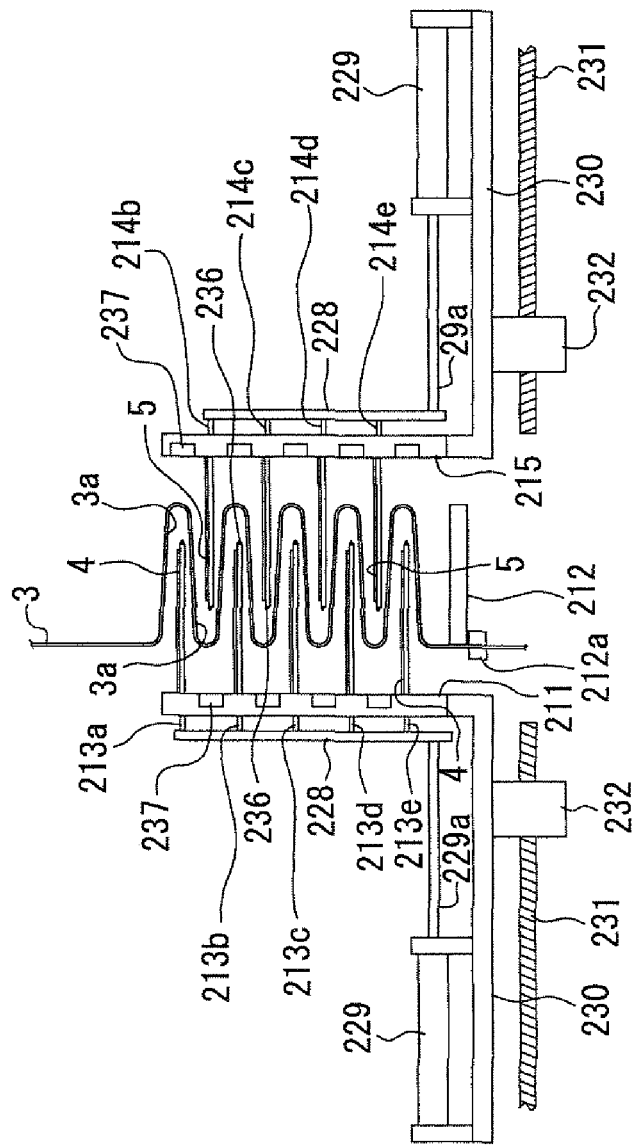

The respective pressing members 235, 235 have front end edges 235b, 235b, as shown in FIGS. 22A and 22B, contacting the side edges 3e, 3c of the zigzag-folded continuous member 3 of the separator. According to the urging force of the springs, not shown, as shown in FIG. 21A, the front end edges 235b, 235b of the pressing members 235, 235 slightly contact the side edges 3c, 3c of the continuous member 3 at the solid line position. As shown in FIGS. 22A and 22C, when the guide rods 6a, 6b, 6c, 6d, 6e and 7a, 7b, 7c, 7d, 7e, 7f are withdrawn from the respective valley grooves 3a of the separator, the holding members 235a, 235a of the respective pressing members 235, 235 are pushed by the vertical frames 8 and 9 and retired to the two-dot-chin-line position against the urging force of the springs, and the front end edges 235b, 235b of the respective pressing members 235, 235 are separated from the side edges 3c, 3c of the continuous member 3 of the separator.

As mentioned above, from the time of zigzag-folding the continuous member 3 of the separator by the intersection of the rows of the guide rods 6a, 6b, 6c, 6d, 6e and 7a, 7b, 7c, 7d, 7e, 7f to the time of withdrawing the guide rods 6a, 6b, 6c, 6d, 6e and 7a, 7b, 7c, 7d, 7e, 7f from the continuous member 3, the meandering motion of the continuous member 3 at the zigzag-folding time can be prevented because the continuous member 3 is pressed in the front end direction of the guide rods 6a, 6b, 6c, 6d, 6e and 7a, 7b, 7c, 7d, 7e, 7f, and the zigzag-shaped continuous member 3 can be supported so as not to damage the mount portions thereof at the time of withdrawing the guide rods 6a, 6b, 6e, 6d, 6e and 7a, 7b, 7c, 7d, 7e, 7f.

Further, as shown in FIG. 19, notches 235c are formed to the front end edges 235b, 235b of the pressing members 235, 235 so as not to interfere with the front ends of the guide rods 6a, 6b, 6c, 6d, 6e and 7a, 7b, 7c, 7d, 7e, 7f at the time of intersecting the rows of the guide rods 6a, 6b, 6c, 6d, 6e and 7a, 7b, 7c, 7d, 7e, 7f. However, such notches may be eliminated in a case where the front end portions of the guide rods 6a, 6b, 6c, 6d, 6e and 7a, 7b, 7c, 7d, 7e, 7f may be made short so as not to cause interfering, or the guide rods 6a, 6b, 6c, 6d, 6e and 7a, 7b, 7c, 7d, 7e, 7f are controlled so that the front end portions thereof are pulled in the valley grooves 3a of the continuous member 3 at the time of zigzag-folding thereof.

The electrode insertion mechanism is provided with electrode conveying trays 13a, 13b, 13c, 13d, 13e and 14a, 14b, 14c, 14d, 14e for alternately inserting the positive electrodes 4 and the negative electrodes 5 in the respective valley grooves 3a of the continuous member 3 of the separator which is zigzag-folded by the guide rods 6a, 6b, 6c, 6d, 6e and 7a, 7b, 7c, 7d, 7e, 7f of the zigzag folding mechanism.

Further, as shown in FIGS. 19 and 20C, the electrode conveying trays 13a, 13b, 13c, 13d, 13e and 14a, 14b, 14c, 14d, 14e are prepared by the same numbers as those of the positive and negative electrodes 4 and 5 necessary for one electrode assembly 2 and arranged horizontally at the rear side of the guide rods 6a, 6b, 6c, 6d, 6e and 7a, 7b, 7c, 7d, 7e, 7f.

As shown in FIG. 20C, the electrode conveying trays 13a, 13b, 13c, 13d, 13e and 14a, 14b, 14c, 14d, 14e are disposed correspondingly to the guide rods 6a, 6b, 6c, 6d, 6e and 7a, 7b, 7c, 7d, 7e, 7f, and the respective rear end portions of the rows are connected to the support frames 28, 28, respectively.

The respective frames 228, 228 are connected to the piston rods 229a, 229a of piston cylinder assemblies 229, 229 which are expanded and contracted in the conveying direction of the positive and negative electrodes 4 and 5, and the respective piston cylinder assemblies 229, 229 are placed on reciprocating tables 230, 230, which are reciprocally movable in the conveying direction of the positive and negative electrodes 4 and 5.

The reciprocating table 230 is connected to a nut 232 screw-engaged with a ball screw 231 as a feed screw disposed to be rotatable on the base plate, not shown, of the manufacturing apparatus. The ball screw 231 is rotated by a motor, not shown.

When the ball screws 231, 231 are rotated, the electrode conveying trays 213a, 213b, 213c, 213d, 213e and 214b, 214c, 214d, 214e, on which the positive and negative electrodes 4 and 5 are placed, are moved in unit of the respective rows as shown in FIG. 21C into the respective valley grooves 3a of the separator continuous member 3 to be folded in the zigzag form by the guide rods 6a, 6b, 6c, 6d, 6e and 7a, 7b, 7c, 7d, 7e, 7f.

Although it is possible to move the electrode conveying trays 213a, 213b, 213c, 213d, 213e and 214b, 214c, 214d, 214e after the zigzag formation of the continuous member 3 of the separator by the guide rods, the electrode conveying trays 213a, 213b, 213c, 213d, 213e and 214b, 214c, 214d, 214e may be preferably moved on the side of the separator continuous member 3 at the same time of the zigzag-folding of the separator continuous member 3 by intersecting the respective rows of the guide rods 6a, 6b, 6c, 6d, 6e and 7a, 7b, 7c, 7d, 7e, 7f. According to such motion, it becomes possible to insert the positive and negative electrodes 4 and 5 into the respective valley grooves 3a of the continuous member 3 of the separator while folding the continuous member 3 into zigzag form, thus shortening the takt time.

Figure 24A:
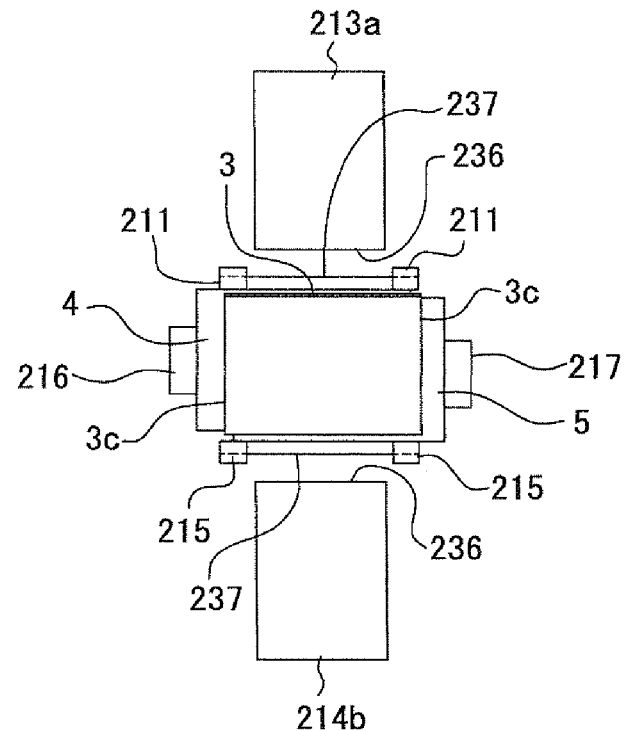
FIGS. 24A, 24B and 24C are plan, front and left-side side views, respectively, representing a fifth step in the method of the seventh embodiment of the present invention.
Figure 24B:
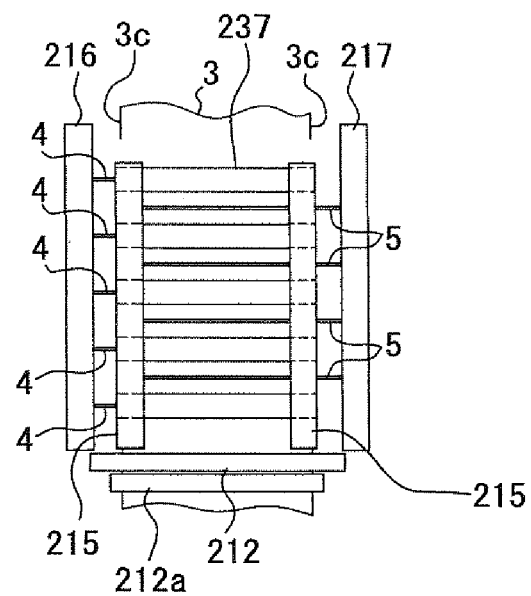
Figure 24C:
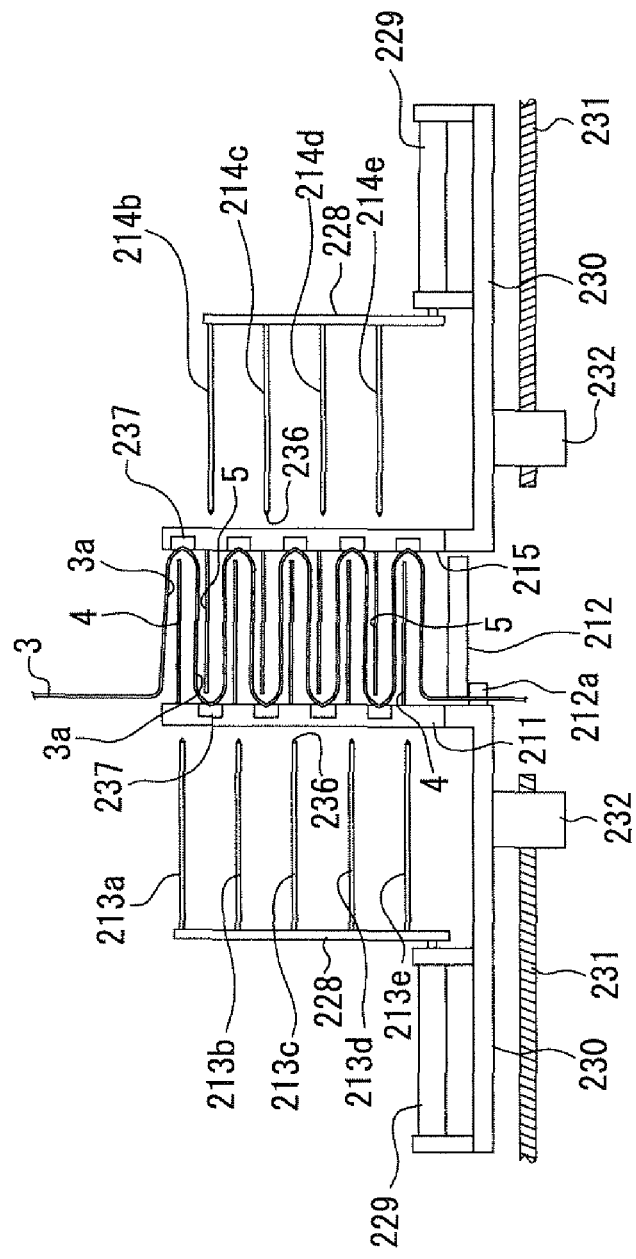

As shown in FIG. 24C, the electrode conveying trays 213a, 213b, 213c, 213d, 213c and 214b, 214c, 214d, 214e are thereafter removed rearward from the valley grooves 3a of the separator by the contractive motion of the piston cylinder assemblies 229, 229. On the time of the retiring motion of the electrode conveying trays 213a, 213b, 213c, 213d, 213e and 214b, 214c, 214d, 214e, the positive and negative electrodes 4 and 5 remain in the valley grooves 3a of the separator continuous member 3, so that, as shown in FIGS. 20A to 20C, the pressing members 211, 211 and 215, 215 are arranged so as to sandwich the rows of the electrode conveying trays 213a, 213b, 213c, 213d, 213e and 214b, 214c, 214d, 214e, respectively, from both lateral sides thereof.

The pressing members 211, 211 and 215, 215 are knitted as vertical rods abutting against the rear edges of the positive and negative electrodes 4 and 5 projecting over both the lateral sides of the electrode conveying trays 213a, 213b, 213c, 213d, 213e and 214b, 214c, 214d, 214e, and arranged on both the lateral sides of the respective rows thereof.

Since these pressing members 211, 211 and 215, 215 are arranged in the rear side of the positive and negative electrodes 4 and 5 projecting over both sides of the electrode conveying trays 213a, 213b, 213c, 213d, 213e and 214b, 214c, 214d, 214e, so that when the electrode conveying trays 213a, 213b, 213c, 213d, 213e and 214b, 214c, 214d, 214e are removed rearward from the valley grooves 3a of the separator, the positive and negative electrodes 4 and 5 remain in the respective valley grooves 3a of the separator.

As shown in FIG. 19 and FIGS. 21A and 21B, stoppers 216 and 217 for pushing the positive and negative electrodes 4 and 5 inserted into the respective valley grooves 3a of the separator continuous member 3 of thin the longitudinal direction of the guide rods 6a, 6b, 6c, 6d, 6e and 7a, 7b, 7c, 7d, 7e, 7f are provided as occasion demands on both sides along the longitudinal direction of the guide rods.

Each of the stoppers 216 and 217 is reciprocally movable by the piston cylinder assembly, not shown, in the longitudinal direction of the guide rods 6a, 6b, 6c, 6d, 6e and 7a, 7b, 7e, 7d, 7e, 7f. One of the stoppers 216 is inserted into the respective valley grooves 3a of the separator by one of the rows of electrode conveying trays 213a, 213b, 213c, 213d and 213e and abut against the side edges of all the positive electrodes 4 projecting over the side edge 3c of the continuous member 3 of the separator, On the other hand, the other one of the stoppers 217 is inserted into the respective valley grooves 3a of the separator by the other one of the rows of electrode conveying trays 214b, 214c, 214d and 214e and abut against the side edges of all the negative electrodes 5 projecting over the other side edge 3c of the continuous member 3 of the separator.

According to the location of these stoppers 216 and 217, the positive electrodes 4 and the negative electrodes 5 inserted into the respective valley grooves 3a of the separator are accurately positioned in the longitudinal direction of the guide rods 6a, 6b, 6c, 6d, 6e and 7a, 7b, 7c, 7d, 7e, 7f.

The guide rods 6a, 6b, 6c, 6d, 6e and 7a, 7b, 7c, 7d, 7e, 7f can be withdrawn from the respective valley grooves 3a of the separator as shown in FIGS. 22A to 22C by the guide rod withdrawing mechanism. This guide rod withdrawing mechanism includes, for example, a piston cylinder assembly, not shown. Such piston cylinder assembly is interposed between the vertical frames 208 and 209 of the guide rods 6a, 6b, 6c, 6d, 6e and 7a, 7b, 7c, 7d, 7e, 7f and the base plate, not shown, and in accordance with the operation (contraction or expansion) of the piston cylinder assembly, the guide rods 6a, 6b, 6c, 6d, 6e and 7a, 7b, 7c, 7d, 7e, 7f are removed outside the respective valley grooves 3a of the continuous member 3 of the separator, as shown in FIGS. 22A to 22C, or returned to the original position as shown in FIGS. 19 and 20A to 20C.

The piston cylinder assembly of this guide rod withdrawing mechanism serves to intersect the rows of the guide rods 6a, 6b, 6c, 6d, 6e and 7a, 7b, 7c, 7d, 7e, 7f, to hold the respective driving members for folding the continuous member 3 of the separator together with the respective vertical frames 208 and 209 and to expand or contract the same.

Figure 23A:
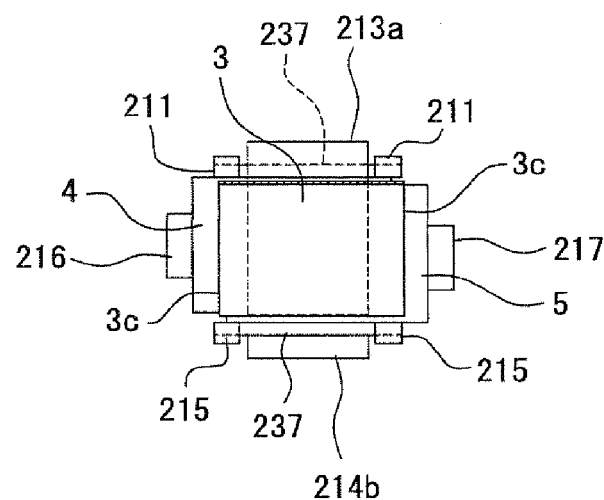
FIGS. 23A, 23B and 23C are plan, front and left-side side views, respectively, representing a fourth step in the method of the seventh embodiment of the present invention.

The electrode conveying trays 213a, 213b, 213c, 213d, 213e and 214b, 214c, 214d, 214e are connected to the base plate, not shown, through the ball screw 231 as mentioned above. After the withdrawal of the guide rods 6a, 6b, 6c, 6d, 6e and 7a, 7b, 7c, 7d, 7e, 7f by the guide rod withdrawing mechanism from the valley grooves 3a of the continuous member 3 of the separator folded into the zigzag shape, when the ball screw 231 is further rotated, the electrode conveying trays 213a, 213b, 213c, 213d, 213e and 214b, 214c, 214d, 214e further advance as shown in FIGS. 23A and 23C so as to push the positive electrodes 4 and the negative electrodes 5 into the respective valley grooves 3a of the separator.

Figure 23B:
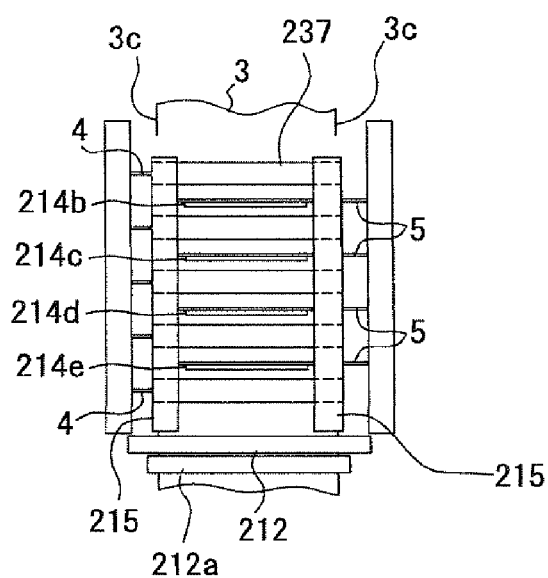
Figure 23C:
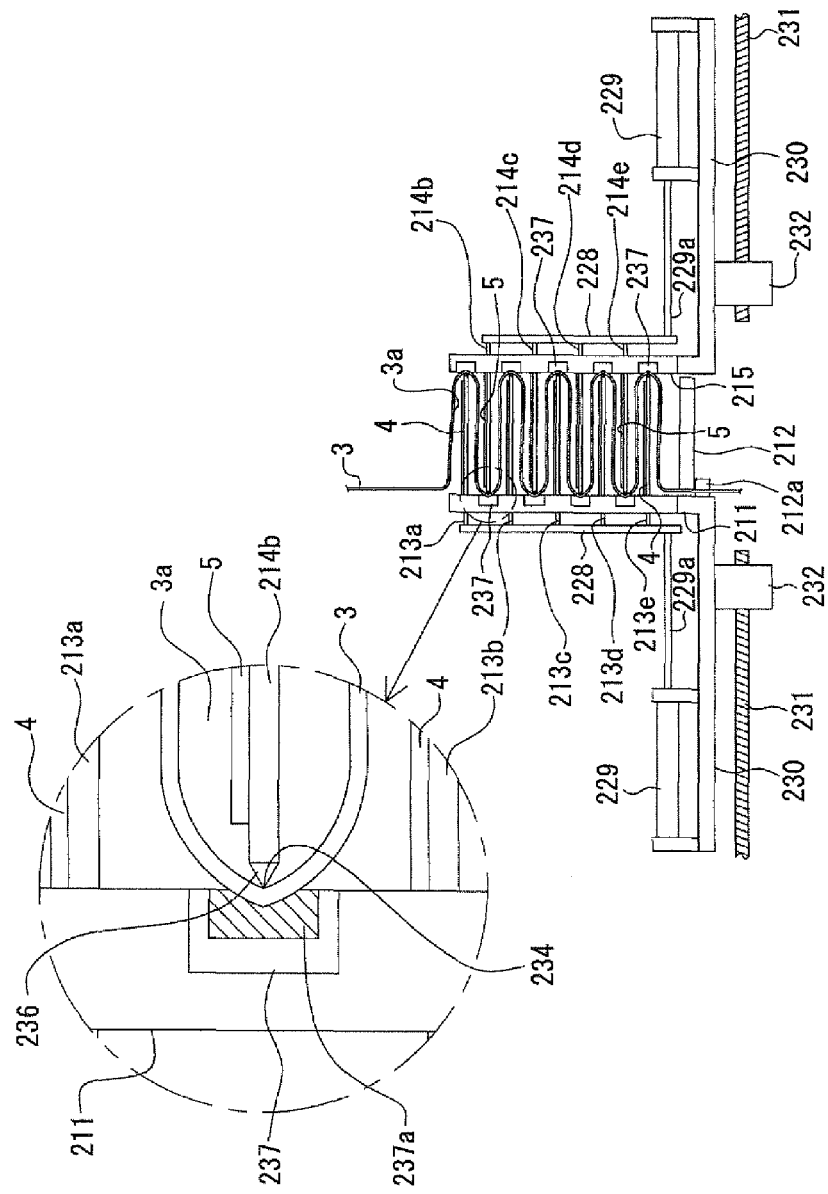

According to the further advancing of the electrode conveying trays 213a, 213b, 213c, 213d, 213e and 214b, 214c, 214d, 214e, as shown in FIG. 23C, the folded lines 234 are formed to the bottom portions of the respective valley grooves 3a of the separator by the folding line forming mechanism.

As shown in FIG. 19 and FIG. 23C, the folding line forming mechanism is provided with receiving portions 237 for forming the folded lines 234 to the bottom portions of the valley grooves 3a by clamping the protruded portions 236 formed to the front ends of the electrode conveying trays 213a, 213b, 213c, 213d, 213e and 214b, 214c, 214d, 214e and the protruded portions 236 of the continuous member 3 of the separator.

The protruded portions 236 are formed to the front ends, in form of blade, of the electrode conveying trays 213a, 213b, 213c, 213d, 213e and 214b, 214c, 214d, 214e. The protruded portions 236 may be formed by making thin the electrode conveying trays 213a, 213b, 213c, 213d, 213e and 214b, 214c, 214d, 214e or sharpening the front ends thereof, respectively, or may be formed by attaching independently formed blade members to the front ends of the electrode conveying trays 213a, 213b, 213c, 213d, 213e and 214b, 214c, 214d, 214e.

Furthermore, the front ends or protruded portions 236 of the electrode conveying trays 213a, 213b, 213c, 213d, 213e and 214b, 214c, 214d, 214e may be sharpened at portions contacting to the continuous member 3 of the separator, or may be formed with curved surfaces at portions abutting against the separator continuous member 3.

The receiving portions 237 are attached to the pressing members 211, 211 and 215, 215 so as to oppose to each other with the protruded portions 236 of the front ends of the electrode conveying trays 213a, 213b, 213c, 213d, 213e and 214b, 214c, 214d, 214e and the continuous member 3 of the separator being interposed therebetween. Further, as shown in FIG. 19 and FIG. 23C, the receiving portions 237 are stretched as beams between the opposed pair of the pressing members 211, 211 and 215, 215, and elastic pieces 237a, such as rubber, having cushioning performance may be disposed at portions against which the protruded portions 236 abut.

As shown in FIGS. 23A to 23C, when the electrode conveying trays 213a, 213b, 213c, 213d, 213e and 214b, 214c, 214d, 214e further advance, and the positive and negative electrodes 4 and 5 are pushed further inside the valley grooves 3a of the separator, the continuous member 3 of the separator are sandwiched by the protruded portions 236 of the front ends of the electrode conveying trays 213a, 213b, 213c, 213d, 213e and 214b, 214c, 214d, 214e and the receiving portions 237, and the folded lines 234 are formed to the bottom portions of the respective valley grooves 3a of the continuous member 3 of the separator.

Further, it may be possible that the receiving portions 237 are not mounted to the pressing members 211, 211 and 215, 215 so as to operate independently of the pressing members 211, 211 and 215, 215. The receiving portions 237 may advance to the positions receiving the protruded portions 236 only at the time of forming the folded lines 234.

As shown in FIG. 20C and FIGS. 25A to 25C, the pressing mechanism includes a pusher 218 vertically movable on the surface table 212. The pusher 218 pushes the continuous member 3 of the separator formed with the folded lines 234 in the zigzag direction so as to provide the flat shape. According to this operation, the continuous member 3 of the separator is made flat so as to provide the thickness to the extent of that of the electrode assembly 2 shown in FIG. 2 in a state of sandwiching the positive and negative electrodes 4 and 5.

The electrode assembly 2 will be manufactured by the manufacturing apparatus of the structure mentioned above according to the procedures which will be mentioned hereunder.

(1) As shown in FIG. 19 and FIGS. 20A to 20C, the continuous member of the separator is inserted between one and the other one rows of the guide rods 6a, 6b, 6c, 6d, 6e and 7a, 7b, 7c, 7d, 7e, 7f arranged in the zigzag form. The front end of the continuous member 3 is clamped by the clamp 12a. The continuous member 3 is reeled out from the roll on which the continuous member 3 was wound up, and tensioned perpendicularly with small tension between the guide rods 6a, 6b, 6e, 6d, 6e and 7a, 7b, 7c, 7d, 7e, 7f.

(2) In FIGS. 20A and 20C, the rows of the guide rods 6a, 6b, 6c, 6d, 6e and 7a, 7b, 7c, 7d, 7e, 7f are moved horizontally in the arrowed direction, and as shown in FIGS. 21A to 21C, the guide rods 6a, 6b, 6c, 6d, 6e and 7a, 7b, 7c, 7d, 7e, 7f are crossed between the rows thereof. Accordingly, the continuous member 3 of the separator is folded into zigzag form, and necessary numbers of the valley grooves 3a for one electrode assembly 2 are simultaneously formed to the separator continuous member 3, thus remarkably reducing the takt time required for the manufacture of the electrode assembly 2.

In addition, since the separator is folded in the zigzag form by intersecting the respective rows of the guide rods 6a, 6b, 6c, 6d, 6e and 7a, 7b, 7c, 7d, 7e, 7f, the deep valley grooves 3a can be formed which enables the large-sized positive and negative electrodes 4 and 5 to be inserted into the valley grooves 3a, and it is made possible to manufacture the electrode assembly 2 having large capacity.

Since the guide rods 6a, 6b, 6c, 6d, 6e and 7a, 7b, 7c, 7c1, 7e, 7f are formed as rotatable rollers, the tension applied to the continuous member 3 of the separator is loosened, and the continuous member is smoothly folded into the zigzag form.

Further, when the rows of the guide rods 6a, 6b, 6c, 6d, 6e and 7a, 7b, 7c, 7d, 7e, 7f are intersected, air is jetted from the nozzles 10 formed to the surface of the guide rods 6a, 6b, 6c, 6d, 6e and 7a, 7b, 7c, 7d, 7e, 7f toward the continuous member 3 of the separator. According to this operation, the friction between the continuous member 3 and the guide rods 6a, 6b, 6c, 6d, 6e and 7a, 7b, 7c, 7d, 7e, 7f at the time of the zigzag-folding of the continuous member 3 can be reduced, and the tension applied to the continuous member 3 can be loosened. As a result, the time required for the zigzag-folding of the continuous member 3 can be reduced and the breakage thereof can be prevented.

(3) At the same time when the rows of the guide rods 6a, 6b, 6c, 6d, 6e and 7a, 7b, 7c, 7d, 7e, 7f are moved in the horizontal direction as shown with arrows in FIGS. 20A to 20C, the ball screw 231 is rotated by one turn, and every lateral groups of the electrode conveying trays 213a, 213b, 213c, 213d, 213e, 214b, 214c, 214d, 214e and the pressing members 211, 211 and 215, 215 are moved integrally in the arrowed directions.

At this time, the positive electrodes 4 are preliminarily placed on one of the rows of the electrode conveying trays 213a, 213b, 213c, 213d and 213e and on the other hand, the negative electrodes 5 are preliminarily placed on the other one of the rows of the electrode conveying trays 214b, 214c, 214d and 214e. Accordingly, as shown in FIGS. 21A to 21C, the positive and negative electrodes 4 and 5 are alternately inserted into the respective valley grooves 3a of the continuous member 3 of the separator while being folded into the zigzag form.

As mentioned above, the zigzag-folding of the continuous member 3 of the separator and the insertion of the positive and negative electrodes 4 and 5 can be simultaneously performed by zigzag-folding the continuous member 3 of the separator and alternately inserting the positive and negative electrodes 4 and 5 into the respective valley grooves 3a by intersecting the respective rows of the guide rods 6a, 6b, 6c, 6d, 6e and 7a, 7b, 7c, 7d, 7e, 7f, thus further shortening the takt time.

(4) Furthermore, as shown in FIGS. 20A, 20B and FIG. 21A, when the continuous member 3 of the separator is zigzag-folded, the front end edges 235b, 235b of the pressing members 235, 235 of the side edge pressing mechanism advance so as to be in contact with both the side edges 3c, 3c of the separator continuous member 3 by the urging force of a spring, not shown. According to this motion, the meandering movement of the continuous member 3 at the zigzag-folding time can be prevented from causing and the continuous member 3 can be accurately folded into the zigzag form.

(5) When the movement of the guide rods 6a, 6b, 6c, 6d, 6e and 7a, 7b, 7c, 7d, 7e, 7f in the intersecting direction is stopped and the respective front ends of the electrode conveying trays approach the guide rods 6a, 6b, 6c, 6d, 6e and 7a, 7b, 7c, 7d, 7e, 7f, the rotations of the ball screws 231, 231 are stopped, and whole the electrode conveying trays 213a, 213b, 213c, 213d, 213e and 214b, 214c, 214d, 214e stop together with the reciprocal tables 230, 230.

(6) As shown in FIGS. 21A to 21C, the pressing members 211, 211 and 215, 215 also advance toward the continuous member side and then stop together with the electrode conveying trays 213a, 213b, 213c, 213d, 213e and 214b, 214c, 214d, 214e in the state of contacting with the rear edges of the positive and negative electrodes 4 and 5 placed in the electrode conveying trays 213a, 213b, 213c, 213d, 213e and 214b, 214c, 214d, 214e.

(7) As shown in FIGS. 21A to 21C, when the electrode conveying trays 213a, 213b, 213c, 213d, 213e and 214b, 214c, 214d, 214e on which the positive and negative electrodes 4 and 5 are placed are moved into the valley grooves 3a of the continuous member 3 of the separator, the respective stoppers 216 and 217 advance in the longitudinal direction of the guide rods 6a, 6b, 6c, 6d, 6e and 7a, 7b, 7e, 7d, 7e, 7f. Then, one of the stoppers 216 is inserted into the respective valley grooves 3a of the continuous member 3 by the one of the rows of the electrode conveying trays 213a, 213b, 213c, 213d, 213e and abut against the side edges of all the positive electrodes 4 projecting from the side edge 3c of the continuous member 3. Furthermore, the other one of the stoppers 217 is inserted into the respective valley grooves 3a of the continuous member 3 by the other one of the rows of the electrode conveying trays 214b, 214c, 214d, 214e and abut against the side edges of all the negative electrodes 5 projecting from the other side (opposite side) of the continuous member 3. According to this operation, the positive electrodes 4 and the negative electrodes 5 inserted into the respective valley grooves 3a of the separator continuous member 3 can be accurately positioned in the longitudinal direction of the guide rods 6a, 6b, 6c, 6d, 6c and 7a, 7b, 7c, 7d, 7e, 7f.

(8) Then, the piston cylinder assemblies, not shown, are operated to move the vertical frames 8 and 9 in the direction separating from the continuous member 3 of the separator, as shown in FIGS. 22A and 22B.

According to this motion, the guide rods 6a, 6b, 6c, 6d, 6e and 7a, 7b, 7c, 7d, 7e, 7f are moved in the longitudinal direction thereof and removed outside the valley grooves 3a of the continuous member 3. As a result, the valley grooves 3a of the continuous member 3 become empty.

When the guide rods 6a, 6b, 6c, 6d, 6e and 7a, 7b, 7c, 7d, 7e, 7f are withdrawn from the zigzag-shaped continuous member 3, the side edges 3c, 3c of the zigzag-shaped continuous member 3 are pressed in the front end direction of the guide rods 6a, 6b, 6c, 6d, 6e and 7a, 7b, 7c, 7d, 7e, 7f by the pressing members 235, 235, so that the continuous member 3 of the separator can be finely protected so as not to destroy the zigzag folded mount portions thereof.

(9) The piston cylinder assemblies for reciprocally moving the guide rods 6a, 6b, 6c, 6d, 6e and 7a, 7b, 7c, 7d, 7e, 7f serve to move the respective vertical frames 208 and 209 against the urging force of the spring, not shown, to further rearward direction from the position at which the vertical frames 208 and 209 abut against the rear ends of the holding portions 235a, 235a of the pressing members 235, 235. According to this motion, the front end edges of the respective pressing members 235, 235 move from the position shown with solid lines in FIGS. 22A and 22b to the position shown with two-dot-chain lines and separate from the respective side edges 3c, 3c of the separator continuous member 3.

(10) As shown in FIG. 23C, when the ball screws 231, 231 are further rotated in one direction, the electrode conveying trays 213a, 213b, 213c, 213d, 213e and 214b, 214c, 214d, 214e placed on the reciprocal tables 230, 230 further advance together with the pressing members 211, 211 and 215, 215.

Accordingly, as shown in FIG. 23C, the continuous member 3 of the separator is sandwiched between the protruded portions of the electrode conveying trays 213a, 213b, 213c, 213d, 213e and 214b, 214c, 214d, 214e and the receiving portions 237, thus forming the folded lines to the bottom portions of the respective valley grooves 3a of the separator continuous member 3.

Further, as shown in FIGS. 23A to 23C, the pressing members 211, 211 and 215, 215 push the positive and negative electrodes 4 and 5 further deeply inside the respective valley grooves 3a of the separator in a state of contacting to the rear edges of the positive and negative electrodes 4 and 5 placed on the electrode conveying trays 213a, 213b, 213c, 213d, 213e, 213f, 213g, 213h, 213i and 213j. According to this operation, areas opposing to the positive and negative electrodes 4 and 5 through the continuous member 3 of the separator increase, which results in the increasing of the electric capacity and improvement of the battery performance. In addition, the separator can be more effectively utilized.

(11) As shown in FIG. 24C, according to the contraction motion of the piston cylinder assemblies 229, 229, the electrode conveying trays 213a, 213b, 213c, 213d, 213e and 214b, 214c, 214d, 214e are removed at once from the valley grooves 3a of the continuous member 3 of the separator.

At this time, as shown in FIGS. 24A to 24C, the pressing members 211, 211 and 215, 215 stop at the advancing position and maintain the state abutting against the rear edges of the positive and negative electrodes 4 and 5. Therefore, at the retiring time of electrode conveying trays 213a, 213b, 213c, 213d, 213e and 214b, 214c, 214d, 214e, the positive and negative electrodes 4 and 5 are pushed inside the valley grooves 3a of the continuous member 3 of the separator from the position on the electrode conveying trays 213a, 213b, 213c, 213d, 213e and 214b, 214c, 214d, 214e, and they are then retired in an empty state with the positive and negative electrodes 4 and 5 remaining in the valley grooves 3a of the separator.

Figure 25A:
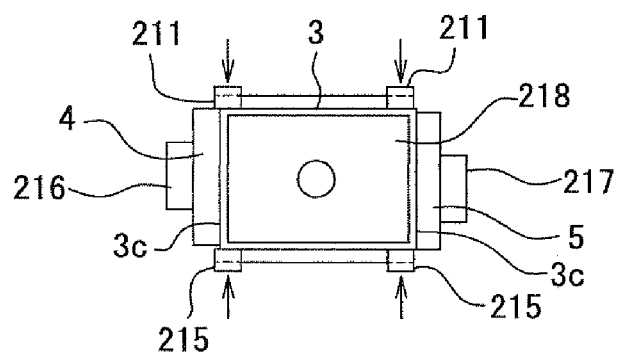
FIGS. 25A, 25B and 25C are plan, front and left-side side views, respectively, representing a sixth step in the method of the seventh embodiment of the present invention.
Figure 25B:
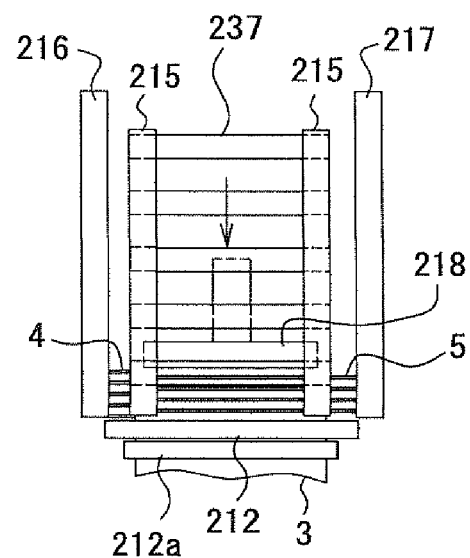
Figure 25C:
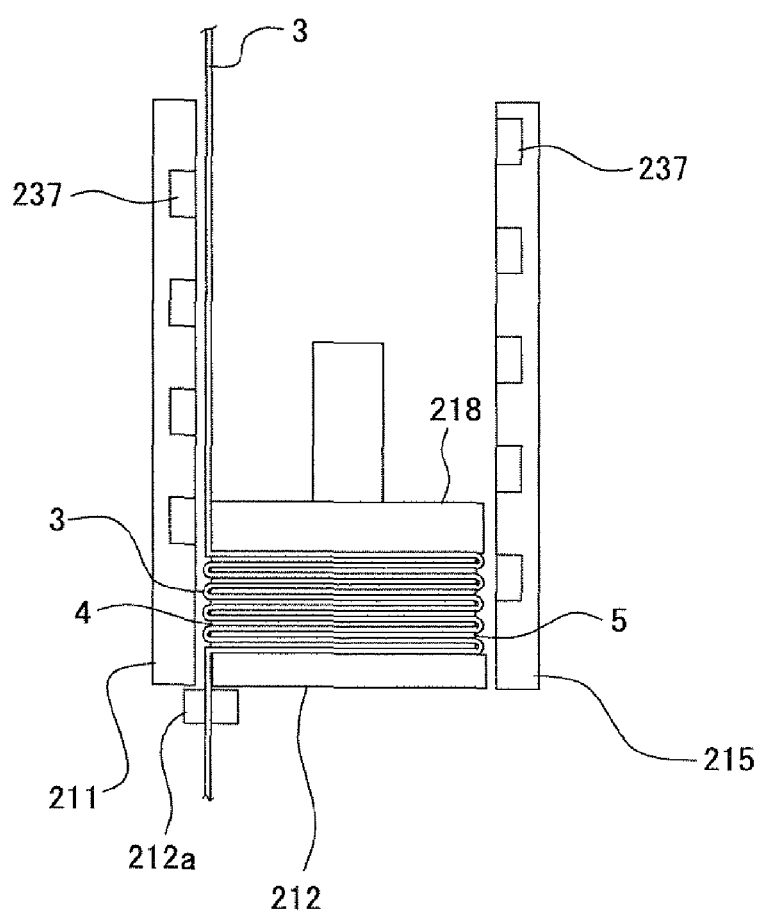

(12) As shown in FIGS. 25A to 25C, the pusher 218 strongly pushes the continuous member 3 of the separator toward the surface plate 212 in the zigzag direction.

As mentioned above, since the folded lines 34 are formed to the respective valley grooves 3a of the continuous member 3 of the separator, the continuous member 3 can be accurately folded into flat shape without loosening its shape, and a flat laminated member, in which the folded continuous member 3 and the positive and negative electrodes 4 and 5 are alternately laminated, can be formed.

(13) The front end of the continuous member 3 folded into the zigzag form is released from the clamp 212a, and the rear end thereof is cut off from the continuous member on the roll 3b side by a cutter 233 shown in FIG. 20C, and then, the electrode assembly 2 shown in FIG. 2 can be completed. This electrode assembly 2 is accommodated in the battery case 1 to thereby constitute a cell.

Eighth Embodiment

Figure 26:
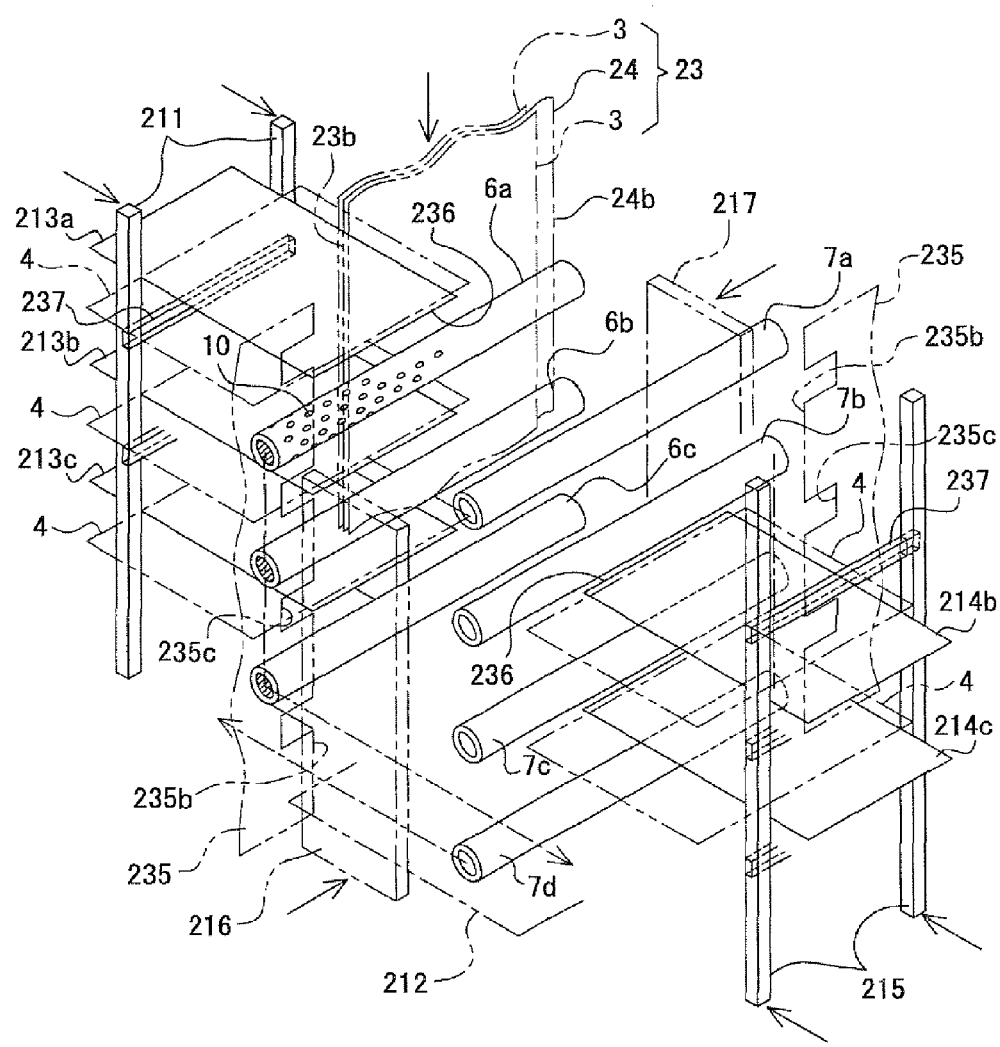
FIG. 26 is a schematic view showing an apparatus for carrying out a method according to an eighth embodiment of the present invention.

As shown in FIG. 26, an apparatus for manufacturing the electrode assembly 22 shown in FIG. 9 has a structure provided with a plurality of guide rods 6a, 6b, 6c and 7a, 7b, 7c and 7d arranged in the zigzag form and other structures. However, between one and the other rows of these guide rods, the continuous laminated member 23 is inserted.

Further, all the electrode conveying trays 13a, 13b, 13c and 14b, 14c can convey only the positive electrodes 4 into the valley grooves 23a of the laminated member 23. Except for these structures, the electrode assembly 22 can be manufactured by the apparatus of the structure similar to that of the seventh embodiment with similar procedures.

In this eighth embodiment, it is allowed for the apparatus to have the valley grooves 23a of the laminated member 3 into which only the positive electrodes 4 are inserted, so that by manufacturing the electrode assembly 22 having the performance similar to that of the electrode assembly 2 of the seventh embodiment, the number of the zigzag-folding of the laminated member 23 can be reduced half in number in comparison with the case of the seventh embodiment, and accordingly, the numbers of the guide rods 6a, 6b, 6c and 7a, 7b, 7c, 7d and the electrode conveying trays 213a, 213b, 213c, 213d, 213e and 214b, 214c, 214d, 214e can be also reduced half, resulting in the further shortening of the takt time.

In this eighth embodiment, the pressing members 235, 235 are provided as side edge pressing mechanism as like as in the seventh embodiment, and the front end edges 235b, 235b thereof contact to one side edge 23b of the laminated member 23 and side edge 24b of the side edge 24b of the continuous member 24.

Furthermore, as the folded line forming mechanism similar to that in the seventh embodiment, the protruded portions 236 are provided for the front ends of the electrode conveying trays 13a, 13b, 13c and 14b, 14 c, 14d, 14e, and the receiving portions 237 opposing to the protruded portions 236 are mounted to the pressing members 211, 211 and 215, 215.

Further, the same reference numerals are added to members or portions corresponding to those in the seventh embodiment and the duplicated explanations are hence omitted herein.

Ninth Embodiment

In this ninth embodiment, the pitch changing mechanism for narrowing the distance in the respective rows in the perpendicular direction of the electrode conveying trays 213a, 213b, 213c, 213d, 213e and 214b, 214c, 214d, 214e is provided to the respective support frames 228, 228 of the electrode conveying trays 213a, 213b, 213c, 213d, 213e and 214b, 214c, 214d, 214e in the apparatus for manufacturing the electrode assembly for the rectangular battery shown in the seventh embodiment.

Figure 27:
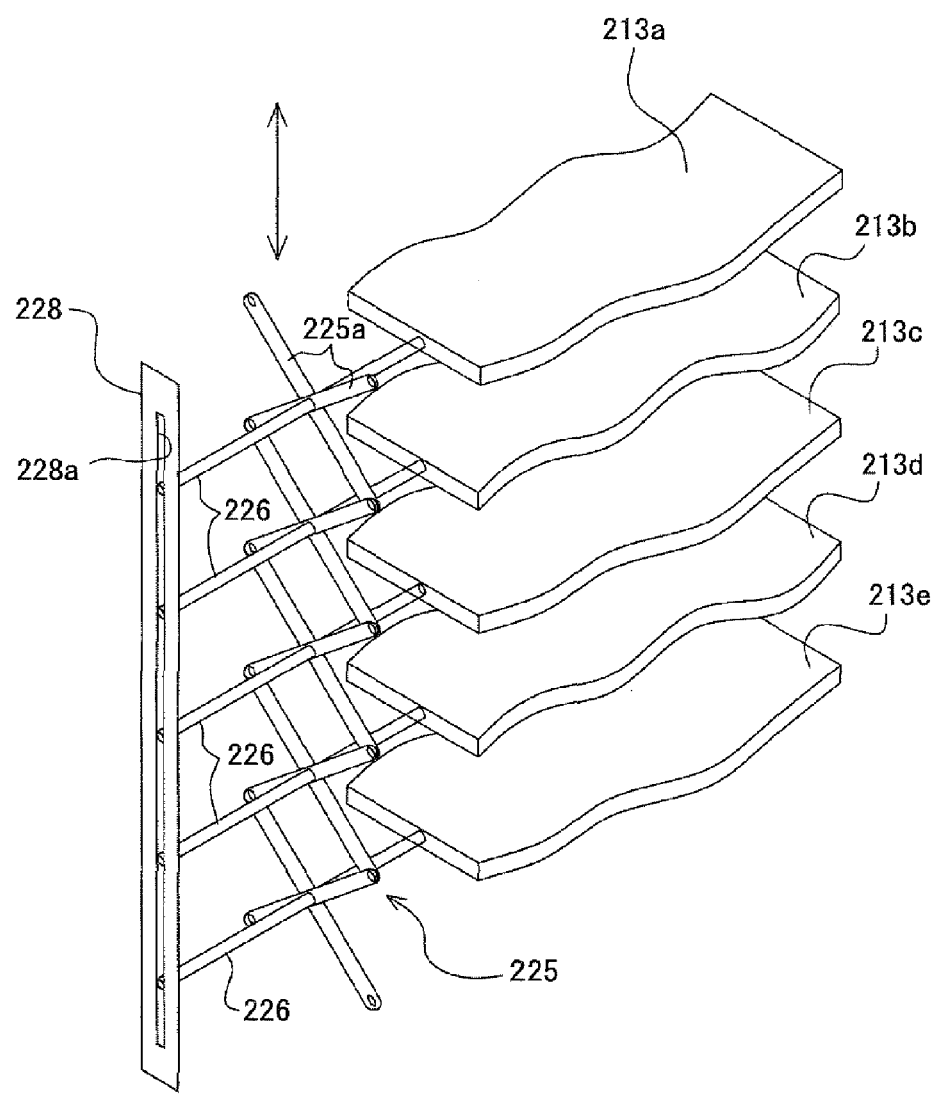
FIG. 27 is a perspective view showing one example of a pitch changing device of an electrode conveying tray according to a ninth embodiment of the present invention.

This pitch changing mechanism is composed, as typical example, of a link mechanism 225 shown in FIG. 27.

The link mechanism 227 is a parallel motion mechanism including a plurality of links 225a, 225a, having the same length, which are pivoted in X-shape and coupled with pins in the perpendicular direction. Shafts 226 horizontally holding the electrode conveying trays 213a, 213b, 213c, 213d, 213e and 214b, 214c, 214d, 214e pass through the pivot points, respectively, of the respective paired links 225a, 225a which are coupled in X-shape, and one end of each shaft 226 is inserted into a guide groove 228a of a guide member 228 extending in the perpendicular direction. In order to easily hold the electrode conveying trays 213a, 213b, 213c, 213d, 213e horizontally, a plurality of rows of such link mechanisms may be arranged as occasion demands.

Although not shown, similar link mechanisms and guide members may be provided for the electrode conveying trays 214b, 214c, 214d, 214e of the other row.

According to the structure mentioned above, as shown in FIG. 22C, after the withdrawal of the guide rods 6a, 6b, 6c, 6d, 6e and 7a, 7b, 7c, 7d, 7e, 7f from the valley grooves 3a of the continuous member 3 of the separator, when the link mechanisms are contracted in the perpendicular direction, the electrode conveying trays 213a, 213b, 213c, 213d, 213e and 214b, 214c, 214d, 214e are lowered in the perpendicular direction with constant distances being maintained in the respective rows thereof and the distances are narrowed in the perpendicular direction. As a result, the distance of the continuous member 3 in the zigzag direction is narrowed, and as shown in FIG. 23C, in the process forming the folded lines 234 in the valley grooves 3a of the continuous member 3 of the separator, the folded lines 234 can be easily formed to the separator continuous member 3, and in addition, in the pressing process shown in FIG. 25C, the continuous member 3 of the separator can be accurately folded in the perpendicular direction.

Tenth Embodiment

Figure 28A:
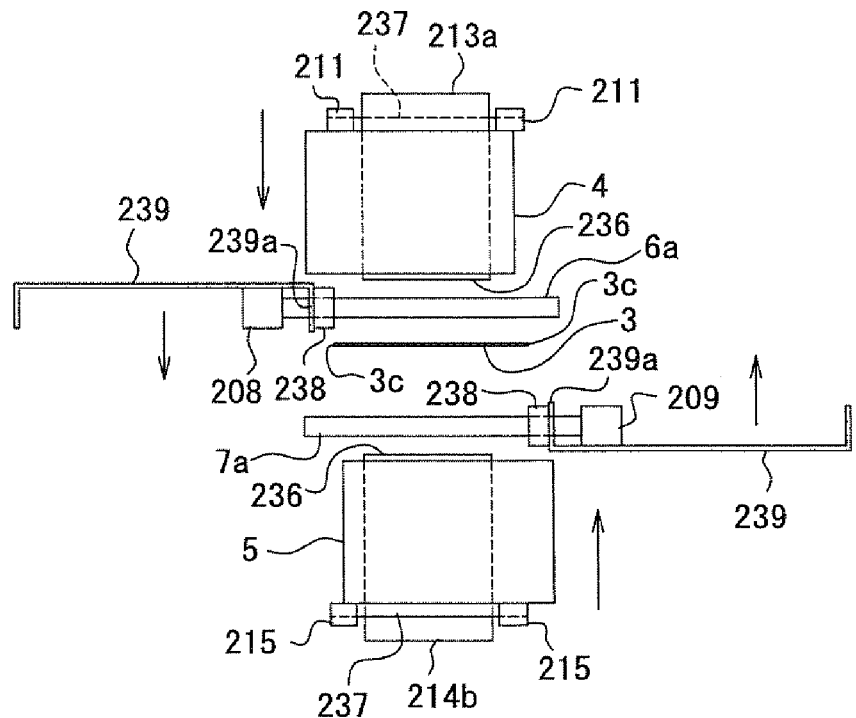
FIG. 28A is a plan view showing another example of a side edge pressing member used for method and apparatus according to a tenth embodiment of the present invention in a state before the separator is folded in a zigzag form.
Figure 28B:
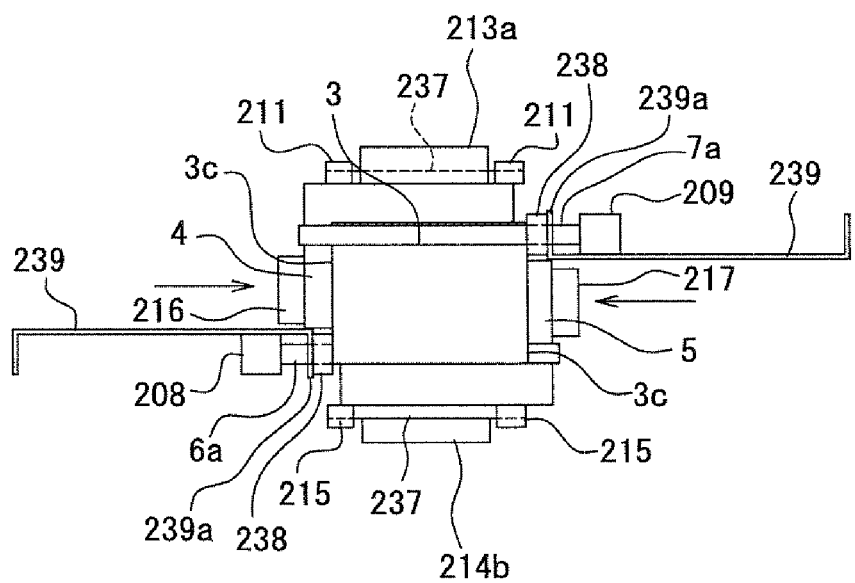
FIG. 28B is a plan view showing another example of the side edge pressing member used for method and apparatus according to the tenth embodiment of the present invention in a state in which an electrode is inserted into a valley groove after the separator is folded in the zigzag shape.
Figure 28C:
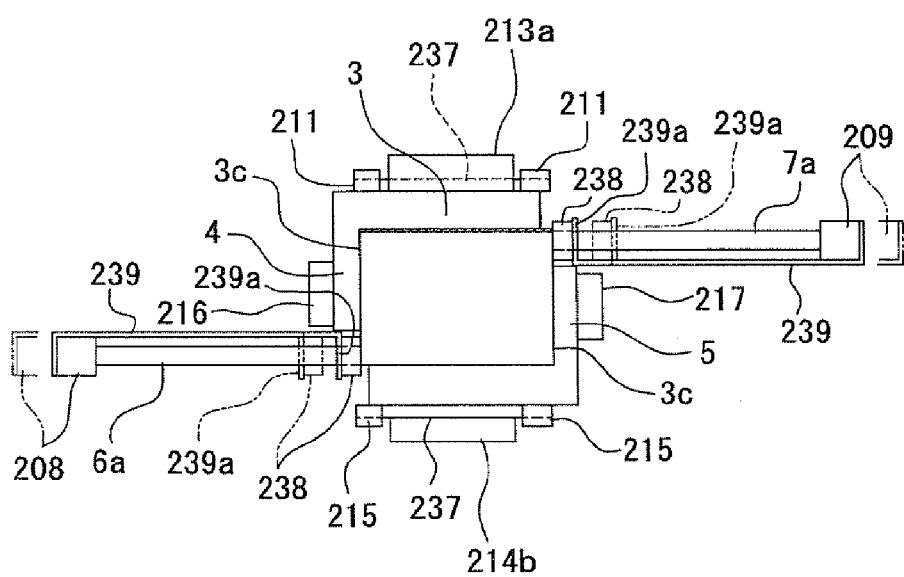
FIG. 28C is a front view showing another example of the side edge pressing member used for method and apparatus according to the tenth embodiment of the present invention in a state in which the guide rods are withdrawn from the valley grooves of the separator.

In this tenth embodiment, the side edge pressing mechanism in the manufacturing apparatus of the electrode assembly for the rectangular battery shown in the seventh embodiment is constructed so as to guide both the side edges 3c, 3c of the continuous member 3 of the separator by the ring-shaped pressing member 238 as shown in FIGS. 28A to 28C.

That is, the ring-shaped pressing member 238 is provided to be rotatable and slidable over all or a part of the guide rods 6a, 6b, 6c, 6d, 6e and 7a, 7b, 7c, 7d, 7e, 7f, and are held to be rotatable to brackets 239a formed to the front ends of the respective holding members 239, 239. The respective holding members 239, 239 are connected to the vertical frames 8 and 9, as like as in the seventh embodiment, and coupled to the base plate, not shown, of the manufacturing apparatus through a spring, not shown.

Then, the function of such side edge pressing mechanism of the structure mentioned above will be explained hereunder.

As shown in FIG. 28A, when the continuous member 3 of the separator is inserted between one and the other one rows of the guide rods 6a, 6b, 6c, 6d, 6e and 7a, 7b, 7c, 7d, 7e, 7f arranged in the zigzag form, the holding members 239, 239 advance toward the side edges 3c, 3c of the separator continuous member 3 by the actuation of the piston cylinder assembly, not shown, and the end surfaces of the pressing members 238 as the rings contact to both the side edges 3e, 3c of the continuous member 3, respectively.

Then, as shown in FIG. 28B, the rows of the guide rods 6a, 6b, 6c, 6d, 6e and 7a, 7b, 7c, 7d, 7e, 7f are intersected with each other, the continuous member 3 of the separator is folded into the zigzag shape, and the valley grooves 3a of the number necessary for the one electrode assembly 2 are simultaneously formed to the continuous member 3 of the separator.

When the continuous member 3 is folded into the zigzag shape, both the side edges 3c, 3c of the continuous member 3 are guided by the pressing member 238, so that the meandering motion of the continuous member 3 is prevented and the continuous member 3 can be exactly folded into zigzag form in the perpendicular direction.

Thereafter, by the actuation of the piston cylinder assembly, not shown, as shown in FIG. 28C, the vertical frames 8 and 9 are moved in the direction apart from the continuous member 3 of the separator, and at the same time, the guide rods 6a, 6b, 6c, 6d, 6e and 7a, 7b, 7c, 7d, 7e, 7f are moved in their longitudinal directions to thereby separate outside from the valley grooves 3a of the separator.

At the time when the guide rods 6a, 6b, 6c, 6d, 6e and 7a, 7b, 7c, 7d, 7e, 7f are withdrawn from the continuous member 3 in the zigzag arrangement, the side edges 3c, 3c of the separator continuous member 3 are pressed toward the front end directions of the guide rods 6a, 6b, 6c, 6d, 6e and 7a, 7b, 7c, 7d, 7e, 7f by the pressing member 238, so that the mount portions of the zigzag-shaped continuous member 3 are not deformed and finely maintained.

After the guide rods 6a, 6b, 6c, 6d, 6e and 7a, 7b, 7c, 7d, 7e, 7f are removed outside the valley grooves 3a of the separator, when the vertical frames 8 and 9 are further moved, the respective vertical frames 8 and 9 abut against the holding members 239, 239, respectively, as shown with solid lines in FIG. 28C, and against the urging force of the spring, not shown, the respective pressing members 238 are moved together with the pressing members 239, 239 to the position shown with two-dot-chain lines. As a result, the end surfaces of both the pressing members 238 are separated from the side edges 3c, 3c of the continuous member 3.

Thereafter, as like as the seventh embodiment, the same procedures as those represented by FIGS. 23A to 23C and FIGS. 25A to 25C are performed to thereby manufacture the electrode assembly 2.

Further, like reference numerals are added to members or portions shown in FIGS. 28A to 28C corresponding to those in the seventh embodiment, and duplicated explanations are omitted herein.

It is further noted that the present invention is not limited to from the first to the tenth embodiments described above, and many other changes and modifications may be made without departing from the scope of the appended claims.

For example, in the above first to tenth embodiment, although the present invention was explained with reference to the lithium ion secondary battery, the present invention is applicable to a battery other than the lithium ion battery or a primary battery. In addition, in the above first to tenth embodiment, although both the rows of the guide rods are moved at the time of intersecting the rows of the guide rods, the zigzag-folding may be preformed by moving only one row of the guide rods without moving the other row of guide rods. According to such structure, the driving unit for moving the row of the guide rods can be made simple and hence the cost-down can be achieved. Moreover, the numbers of the guide rods and the electrode conveying trays may be changed to be increased or decreased without being limited to the first and tenth embodiments.

The invention claimed is:

1. A method of manufacturing a rectangular battery, comprising the steps of:
   arranging a plurality of guide members in zigzag form in a perpendicular direction;
   inserting a continuous member of a separator having a first surface and an opposite facing second surface between rows of the guide members;
   folding, into a zigzag form, the continuous member by intersecting the rows of the guide members in a horizontal direction;
   inserting positive electrodes and negative electrodes into respective valley grooves of the zigzag-folded continuous member, such that the positive electrodes are inserted into first valley grooves formed in a first surface side of the separator in a state in which the guide members are preliminarily placed in the grooves on the first surface side, and such that the negative electrodes are inserted into second valley grooves formed in a second surface side of the separator in a state in which the guide members are preliminarily placed in the grooves on the second surface side, and each one of the positive electrodes is inserted into a corresponding one of the first valley grooves concurrently with insertion of another one of the positive electrodes into another corresponding one of the first valley grooves, and each one of the negative electrodes is inserted into a corresponding one of the second valley grooves concurrently with insertion of another one of the negative electrodes into another corresponding one of the second valley grooves;

withdrawing the guide members from the respective valley grooves of the continuous member; and pressing, thereafter, the continuous member in the zigzag direction so as to make flat the continuous member.

2. The method of manufacturing a rectangular battery according to claim 1, wherein the positive electrodes and the negative electrodes are inserted into the respective valley grooves of the continuous member while folding the continuous member by intersecting the respective rows of the guide members.

3. The method of manufacturing a rectangular battery according to claim 1, wherein the positive and negative electrodes are placed onto electrode conveying members, and the electrode conveying members place the positive and negative electrodes into respective valley grooves.

4. The method of manufacturing a rectangular battery according to claim 3, wherein each of the electrode conveying members is formed as a horizontal plate.

5. The method of manufacturing a rectangular battery according to claim 4, wherein each of the electrode conveying members is formed with a notch into which a stopper can enter.

6. The method of manufacturing a rectangular battery according to claim 3, wherein each of the electrode conveying members is formed as an electrode conveying tray having a comb-shaped structure.

7. The method of manufacturing a rectangular battery according to claim 3, wherein each of the electrode conveying members is composed of a number of rollers or pins which are arranged on a horizontal plane.

8. The method of manufacturing a rectangular battery according to claim 3, wherein each of the positive and negative electrodes is placed into the corresponding one of the valley grooves by pressing the positive and negative electrodes on the electrode conveying members with pressing members.

9. The method of manufacturing a rectangular battery according to claim 3, wherein each of the positive and negative electrodes is inserted into the corresponding one of the valley grooves with corresponding one of the electrode conveying members.

10. The method of manufacturing a rectangular battery according to claim 9, wherein the electrode conveying members are withdrawn from the valley grooves in a state of contact a side surface of each of the electrodes at pressing members after inserting the electrodes in the valley grooves.

11. The method of manufacturing a rectangular battery according to claim 1, wherein a distance between the rows of the guide members is narrowed after insertion of both the positive and negative electrodes in the valley grooves of the continuous member in the zigzag form.

12. The method of manufacturing a rectangular battery according to claim 1, wherein both the positive and negative electrodes inserted into the valley grooves of the continuous member are pressed in an extending direction of the valley grooves.

13. The method of manufacturing a rectangular battery according to claim 1, wherein, when the guide members are withdrawn from the respective valley grooves of the continuous member, the continuous member is pressed in the zigzag direction.

14. The method of manufacturing a rectangular battery according to claim 1, wherein, after the guide members are withdrawn from the respective valley grooves of the continuous member, the positive and negative electrodes are further pushed into the respective valley grooves before the pressing of the continuous member into a flat shape.

15. The method of manufacturing a rectangular battery according to claim 1, wherein the guide members are constructed as guide rods.

16. The method of manufacturing a rectangular battery according to claim 1, wherein the guide members are withdrawn from the respective valley grooves of the continuous member, folded lines are formed to bottom portions of the respective valley grooves of the continuous member, and thereafter, the continuous member is pressed in the zigzag direction so as to make flat the continuous member.

17. The method of manufacturing a rectangular battery according to claim 16, wherein the side edges of the continuous member are pressed in the front end direction of the guide members from the time of zigzag-folding the continuous member until the time of withdrawing the guide members.

18. The method of manufacturing a rectangular battery according to claim 16, wherein a distance of the continuous member in the zigzag direction is narrowed after the withdrawal of the guide members from the respective valley grooves of the zigzag-shaped continuous member.

19. An apparatus for manufacturing an electrode assembly for a rectangular battery in which positive electrodes and negative electrodes are alternately laminated with a separator being interposed therebetween, the apparatus comprising:

a zigzag folding mechanism provided with a plurality of guide members arranged in zigzag form in a perpendicular direction, and configured to fold a continuous member of the separator into a zigzag-folded form, by intersecting rows of the guide members in a horizontal direction when the continuous member is inserted between first and second rows of the guide members;

an electrode inserting mechanism that inserts the positive electrodes and the negative electrodes in the respective valley grooves of the zigzag-folded continuous member, such that the positive electrodes are inserted into first valley grooves formed in a first surface side of the separator in a state in which the guide members are placed in the grooves on the first surface side, and such that the negative electrodes are inserted into second valley grooves formed in a second surface side of the separator in a state in which the guide members are placed in the grooves on the second surface side, the electrode inserting mechanism inserting each one of the positive electrodes into the first valley grooves concurrently with insertion of another one of the positive electrodes into another corresponding one of the first valley grooves, and inserting each one of the negative electrodes into the second valley grooves concurrently with insertion of another one of the negative electrodes into another corresponding one of the second valley grooves;

a guide member withdrawing mechanism for withdrawing the guide members from the respective valley grooves of the continuous member; and a press mechanism for pressing the continuous member in the zigzag direction so as to flatten the continuous member.

20. A method of manufacturing a rectangular battery, comprising the steps of:

arranging two vertical rows of guide members, each of the vertical rows being spaced from each other by a horizontal distance, the guide members of a first of the vertical rows arranged to be staggered with respect to the guide members of a second of the vertical rows such that the guide members of both of the first and second vertical rows form a zigzag pattern;

inserting a continuous member, having a first surface on a first side of the continuous member and an opposite facing second surface on a second side of the continuous member, into a space between the first vertical row and the second vertical row;

moving one of the first and second vertical rows in a direction toward an other of the first and second vertical rows such that the first and second vertical rows respectively come into contact with the first and second surfaces of the continuous member, and continuing to move the one of the first and second vertical rows in the direction so that the guide members of the one of the first and second vertical rows pass through gaps between the guide members of the other of the first and second vertical rows, the guide members forcing portions of the continuous member through the baps, thereby causing the continuous member to fold over itself and assume a zigzag-folded form comprising a plurality of alternating horizontal valley grooves;

prior to withdrawal of the two vertical rows of guide members from the valley grooves of the folded continuous member, inserting positive electrodes into corresponding first valley grooves formed in the first side of the folded continuous member, and negative electrodes into corresponding second valley grooves formed in the second side of the folded continuous member, each of the positive electrodes inserted into the corresponding one of the first valley grooves at a same timing that others of the positive electrodes inserted into the first valley grooves, and each of the negative electrodes inserted into the corresponding one of the second valley grooves at a same timing that others of the negative electrodes inserted into the second valley grooves;

withdrawing the guide members from the valley grooves of the folded continuous member; and subsequent the withdrawing of the guide members, pressing the folded continuous member in a vertical direction so as to compress the valley grooves of the folded continuous member.

* * * * *